(12) United States Patent
Pearson et al.

(10) Patent No.: US 10,676,992 B2
(45) Date of Patent: Jun. 9, 2020

(54) DOWNHOLE TOOLS WITH PROGRESSIVE CAVITY SECTIONS, AND RELATED METHODS OF USE AND ASSEMBLY

(71) Applicant: InFocus Energy Services Inc., Edmonton (CA)

(72) Inventors: Allan Pearson, Edmonton (CA); Mark Luchak, Edmonton (CA); Oxana Scheming, Edmonton (CA); Geoff Samuel, Edmonton (CA); Matt Osatchuk, Edmonton (CA); Erin Venables, Edmonton (CA); Peter Kjellbotn, Edmonton (CA)

(73) Assignee: Infocus Energy Services Inc., Edmonton, Alberta (*) Notice: Subject to any disclaimer, the term of this patent is extended or adjusted under 35 U.S.C. 154(b) by 13 days.

(21) Appl. No.: 15/811,664

(22) Filed: Nov. 13, 2017

(65) Prior Publication Data
US 2018/0274297 A1   Sep. 27, 2018

(30) Foreign Application Priority Data

Mar. 22, 2017   (CA) ..................................... 2961629

(51) Int. Cl.
*E21B 4/02*   (2006.01)
*E21B 10/42*   (2006.01)
(Continued)

(52) U.S. Cl.
CPC ............... *E21B 4/02* (2013.01); *E21B 4/003* (2013.01); *E21B 7/28* (2013.01); *E21B 10/42* (2013.01);
(Continued)

(58) Field of Classification Search
CPC .. E21B 4/02; E21B 10/42; E21B 4/003; E21B 17/1078; E21B 7/28; E21B 10/26; F03C 2/08; B23H 2200/00
See application file for complete search history.

(56) References Cited

U.S. PATENT DOCUMENTS

| 1,892,217 A | 12/1932 | Moineau |
| 2,084,096 A | 6/1937 | Everett |

(Continued)

FOREIGN PATENT DOCUMENTS

| CA | 2393754 | 6/2001 |
| CA | 2543423 | 5/2005 |

(Continued)

OTHER PUBLICATIONS

"Adjustable Bent Housing", Challenger Downhole Tools Inc, accessed online at <<http://challengerdownhole.com/downhole-tool-products/adjustable-bent-housingi>>, at least as early as Mar. 10, 2017 (1 page).

(Continued)

*Primary Examiner* — Wei Wang
(74) *Attorney, Agent, or Firm* — Robert A. Nissen

(57) ABSTRACT

Various downhole tools, such as drilling motors, drilling tools, reamer tools, casing reamer shoes, and related methods of installation, assembly and use. Casing reamer shoes and drilling reamers or motors may have internal impellers, progressive cavity pumps, hollow rotors and other parts, universal joints, and other features. A progressive cavity section may have a rotor and a stator. Rotor contacting surfaces of the stator, and stator contacting surfaces of the rotor, may be rigid during use. The stator contacting surfaces and the rotor contacting surfaces may be made of metal. After the casing is run, the casing is cemented and the reamer shoe drilled out.

19 Claims, 33 Drawing Sheets

(51) Int. Cl.
*E21B 4/00* (2006.01)
*F03C 2/08* (2006.01)
*E21B 17/10* (2006.01)
*E21B 7/28* (2006.01)
*E21B 10/26* (2006.01)

(52) U.S. Cl.
CPC ............ *E21B 17/1078* (2013.01); *F03C 2/08* (2013.01); *B23H 2200/00* (2013.01); *E21B 10/26* (2013.01)

(56) References Cited

U.S. PATENT DOCUMENTS

| | | |
|---|---|---|
| 2,753,941 A | 7/1956 | Hebard |
| 3,493,165 A | 2/1970 | Schonfeld |
| 3,511,539 A | 5/1970 | Schonfeld |
| 3,732,143 A | 5/1973 | joosse |
| 4,227,584 A | 10/1980 | Driver |
| 4,576,242 A | 3/1986 | Mundell |
| 4,616,719 A | 10/1986 | Dismukes |
| 4,721,172 A | 1/1988 | Brett |
| 4,764,094 A | 8/1988 | Baldenko et al. |
| 5,098,258 A | 3/1992 | Barnetche-Gonzalez |
| 5,171,138 A | 12/1992 | Forrest |
| 5,197,553 A | 3/1993 | Leturno |
| 5,221,197 A | 6/1993 | Kochnev et al. |
| 5,267,905 A | 12/1993 | Wenzel |
| 5,343,966 A | 9/1994 | Wenzel |
| 5,518,379 A | 5/1996 | Harris |
| 5,704,838 A | 1/1998 | Teale |
| 5,785,509 A | 7/1998 | Harris |
| 5,899,281 A | 5/1999 | Gynz-Rekowski |
| 6,062,326 A | 5/2000 | Strong et al. |
| 6,203,435 B1 | 3/2001 | Falgout |
| 6,241,494 B1 | 6/2001 | Pafitis et al. |
| 6,394,193 B1 | 5/2002 | Askew |
| 6,401,820 B1 | 6/2002 | Kirk et al. |
| 6,427,787 B1 | 8/2002 | Jager |
| 6,446,725 B2 | 9/2002 | Cabot |
| 6,554,083 B1 | 4/2003 | Kerstetter |
| 6,896,075 B2 | 5/2005 | Haugen et al. |
| 6,944,935 B2 | 9/2005 | Hache |
| 6,949,025 B1 | 9/2005 | Kraus |
| 6,983,811 B2 | 1/2006 | Wardley |
| 7,096,982 B2 | 8/2006 | McKay |
| 7,100,713 B2 | 9/2006 | Tulloch |
| 7,159,668 B2 | 1/2007 | Herrera |
| 7,186,182 B2 | 3/2007 | Wenzel |
| 7,192,260 B2 * | 3/2007 | Lievestro ................. B23H 3/00 205/651 |
| 7,216,729 B2 | 5/2007 | Syed et al. |
| 7,243,739 B2 | 7/2007 | Rankin |
| 7,275,605 B2 | 10/2007 | smith |
| 7,287,609 B2 | 10/2007 | Runia |
| 7,334,649 B2 | 2/2008 | Chen et al. |
| 7,378,769 B2 | 5/2008 | Head |
| 7,395,882 B2 | 7/2008 | Oldham |
| 7,396,220 B2 | 7/2008 | Delpassand |
| 7,504,752 B2 | 3/2009 | head |
| 7,624,819 B1 | 12/2009 | Leblanc |
| 7,735,584 B2 | 6/2010 | Purcell |
| 7,793,717 B2 | 9/2010 | Davison |
| 7,823,657 B2 | 11/2010 | Zeni |
| 7,836,973 B2 | 11/2010 | Belcher et al. |
| 7,849,927 B2 | 12/2010 | Herrera |
| 7,857,052 B2 | 12/2010 | Giroux |
| 7,874,368 B2 | 1/2011 | Blaquiere |
| 7,896,110 B2 | 3/2011 | Bain |
| 7,909,117 B2 | 3/2011 | Steenwyk |
| 7,938,204 B2 | 5/2011 | Buske |
| 7,963,321 B2 | 6/2011 | Kutac |
| 8,033,917 B2 | 10/2011 | Prill |
| 8,074,742 B2 | 12/2011 | Davis |
| 8,109,746 B2 | 2/2012 | Guidry |
| 8,147,228 B2 | 4/2012 | Guidry |
| 8,201,643 B2 | 6/2012 | Soby et al. |
| 8,205,689 B2 | 6/2012 | Radford |
| 8,295,665 B2 | 10/2012 | Herbst |
| 8,342,970 B2 | 1/2013 | Altimas |
| 8,870,666 B1 | 11/2014 | Leger |
| 8,888,474 B2 | 11/2014 | Hohl |
| 8,899,354 B1 | 12/2014 | Comeau |
| 8,900,062 B2 | 12/2014 | Nicol-Seto |
| 8,967,985 B2 | 3/2015 | Coghlan |
| 9,091,264 B2 | 7/2015 | Hohl |
| 9,115,540 B1 | 8/2015 | Williams |
| 9,127,508 B2 | 9/2015 | Taylor |
| 9,194,208 B2 | 11/2015 | Schultz |
| 9,206,647 B2 | 12/2015 | Prill |
| 9,334,691 B2 | 5/2016 | Jarvis |
| 9,347,269 B2 | 5/2016 | Marchand |
| 9,393,648 B2 | 7/2016 | Underwood |
| 9,404,527 B2 | 8/2016 | Marchand |
| 9,534,638 B2 | 1/2017 | Marchand |
| 9,587,436 B2 | 3/2017 | Perry |
| 9,617,790 B2 | 4/2017 | Samuel |
| 9,695,638 B2 | 7/2017 | Murray |
| 9,784,269 B2 | 10/2017 | Lehr |
| 10,161,187 B2 | 12/2018 | Gawski |
| 10,221,657 B2 | 3/2019 | Gosselin |
| 10,233,926 B2 | 3/2019 | Akbari |
| 10,301,876 B2 | 5/2019 | Savage |
| 10,309,395 B2 | 6/2019 | Ramier |
| 10,358,913 B2 | 7/2019 | Richards |
| 2005/0089429 A1 | 4/2005 | Delpassand |
| 2005/0118040 A1 | 6/2005 | Zitka |
| 2005/0133426 A1 | 9/2005 | Smith |
| 2010/0006342 A1 * | 1/2010 | Froehlich .................. E21B 4/02 175/107 |
| 2010/0032170 A1 | 2/2010 | Howett et al. |
| 2010/0038142 A1 * | 2/2010 | Snyder ...................... E21B 4/02 175/107 |
| 2011/0116961 A1 | 5/2011 | Akbari |
| 2011/0243774 A1 * | 10/2011 | Underwood .......... F04C 13/008 418/48 |
| 2012/0168228 A1 | 7/2012 | Giroux |
| 2013/0052067 A1 | 2/2013 | Hohl |
| 2016/0168912 A1 * | 6/2016 | Mitchell ................. E21B 17/14 175/107 |
| 2016/0194917 A1 | 7/2016 | Alali |
| 2017/0306700 A1 | 10/2017 | Hohl |
| 2018/0066654 A1 | 3/2018 | Cariveau |
| 2018/0258701 A1 | 9/2018 | Saurer |
| 2018/0266181 A1 | 9/2018 | Gawski |
| 2018/0274330 A1 | 9/2018 | Sim |
| 2019/0024459 A1 | 1/2019 | Sicilian |
| 2019/0145374 A1 | 5/2019 | Parhar |

FOREIGN PATENT DOCUMENTS

| | | |
|---|---|---|
| CA | 2659476 | 2/2008 |
| CA | 2738830 | 4/2010 |
| DE | 10132972 | 6/2002 |
| FR | 2349729 | 11/1977 |
| GB | 2375555 | 11/2002 |

OTHER PUBLICATIONS

"Downhole Mud Motors", accessed at <<https://sites.google.com/site/directionaldrillingclub/downhole-mud-motors>> (6 pages), available at least as early as Mar. 20, 2017.
Machine translation of FR2349729 obtained from espacenet.com (5 pages).
"Spincat SC-287 Swivel", StoneAge Waterblast Tools, SAPATENTS.COM, available at least as early as Mar. 20, 2017, (2 pages).
"The Stubby PDC Drillable", Fill Movers Inc., www.fillmovers.com, available at least as early as Mar. 20, 2017 (2 pages).
"Turbine Technology—The secrets Inside", Deep Casing Tools, accessed online at http://www.deepcasingtools.com/technology#turbocaserexpress, available at least as early as Mar. 20, 2017 (4 pages).

(56) References Cited

OTHER PUBLICATIONS

"Drilling Motor Handbook", 2015 Edition, Toro Downhole Tools, torotools.com (38 pages).
"Turborunner", Deep Casing Tools, accessed online at http://www.deepcasingtools.com/technology/turborunner, available at least as early as Mar. 20, 2017 (7 pages).
"Turborunner Tool Data Sheet", Deep Casing Tools, Sep. 17, 2015 (1 page).

* cited by examiner

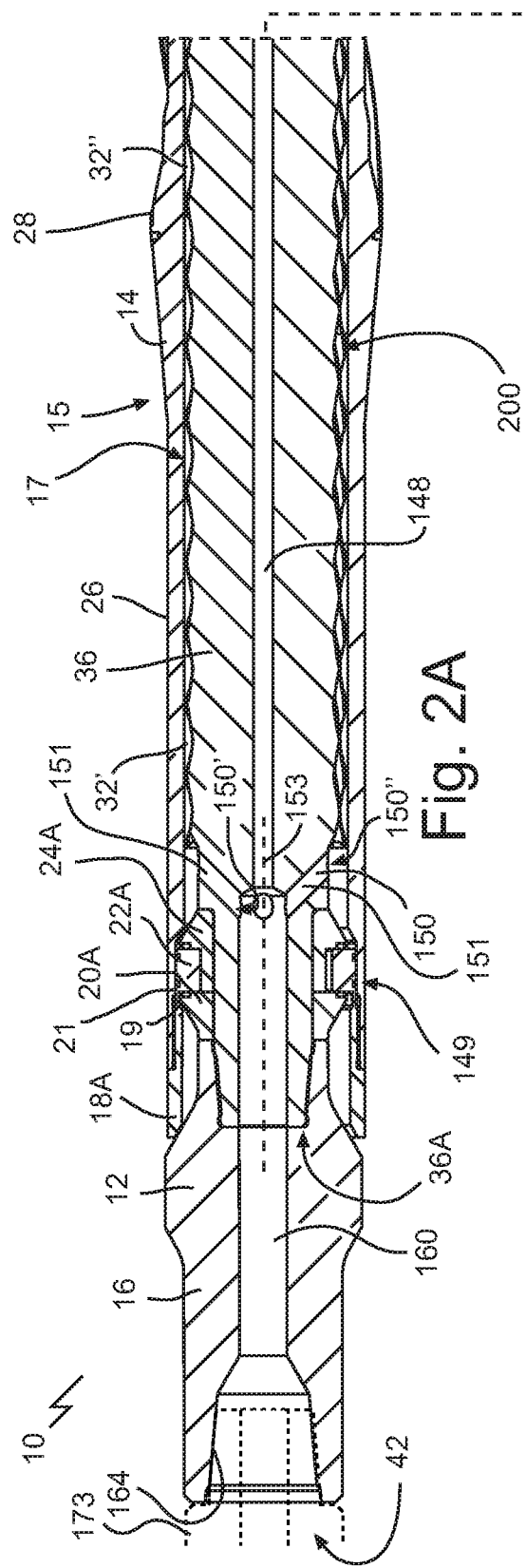
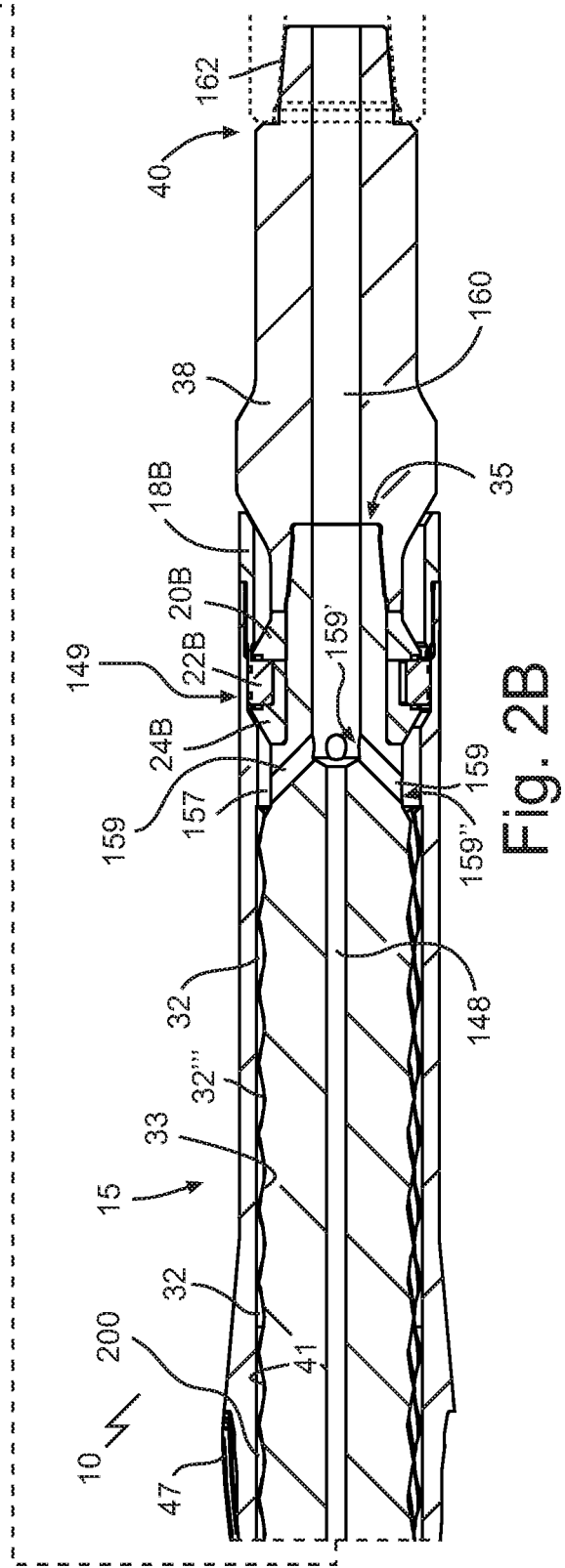
Fig. 2A
Fig. 2B

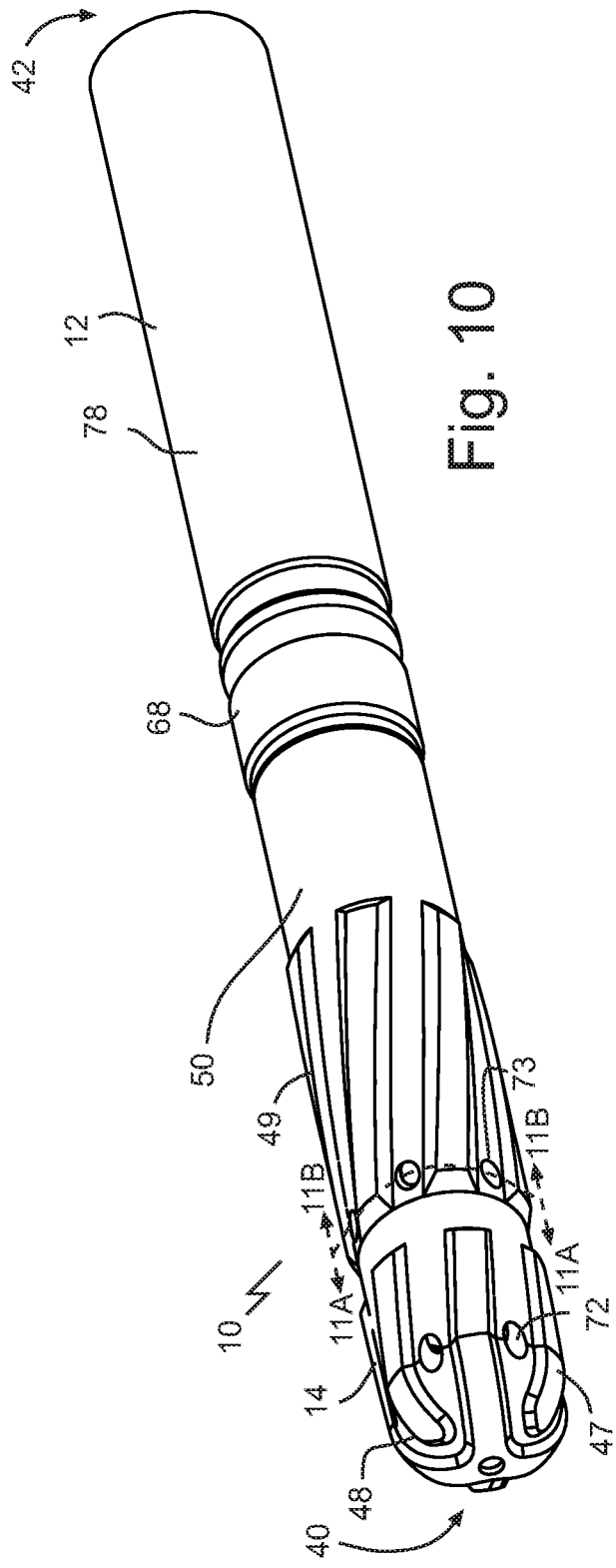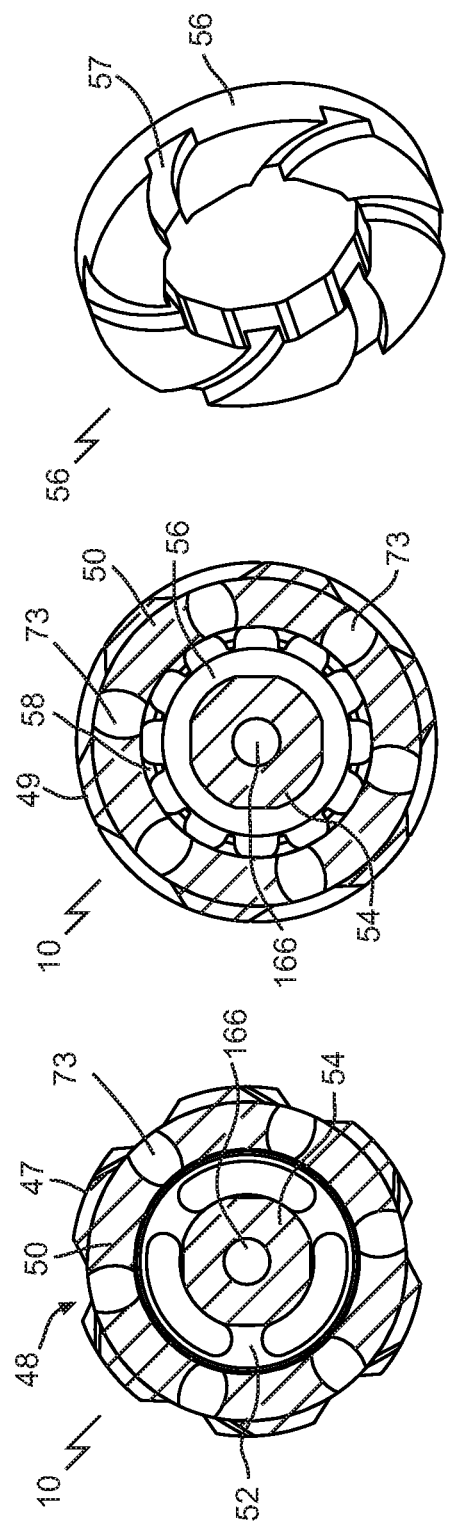
Fig. 10
Fig. 11A
Fig. 11B
Fig. 12

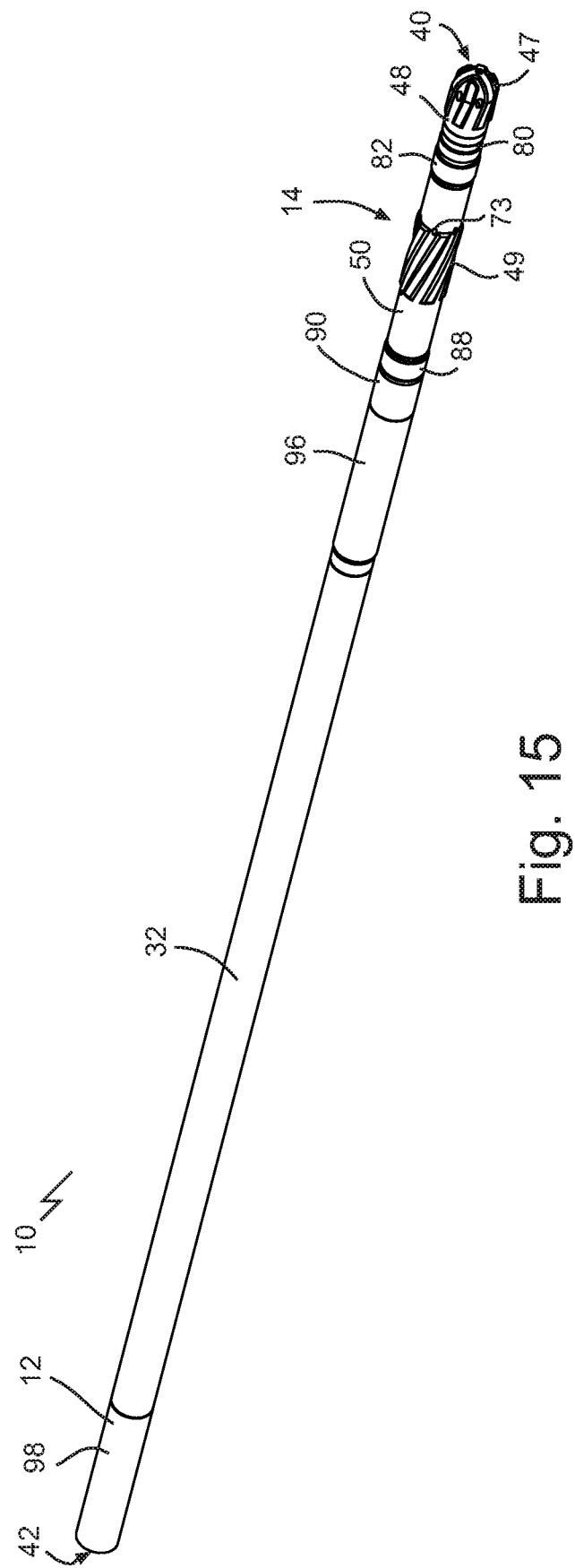

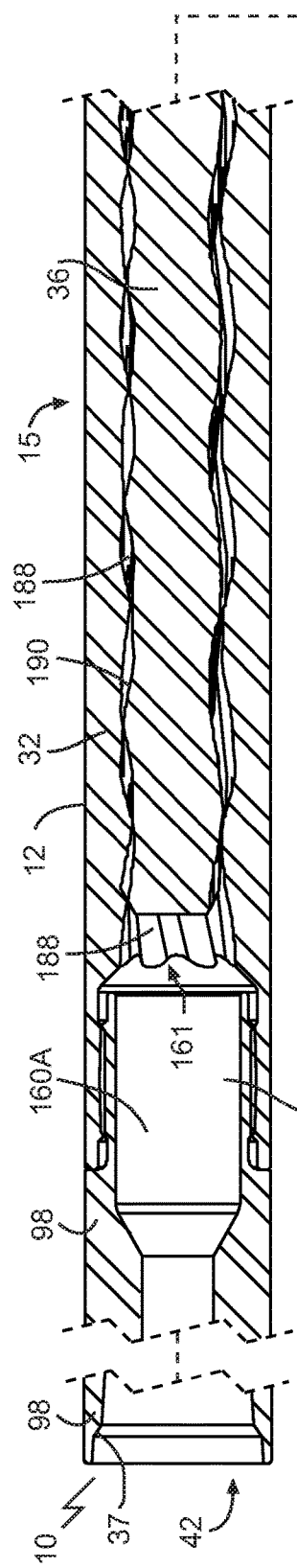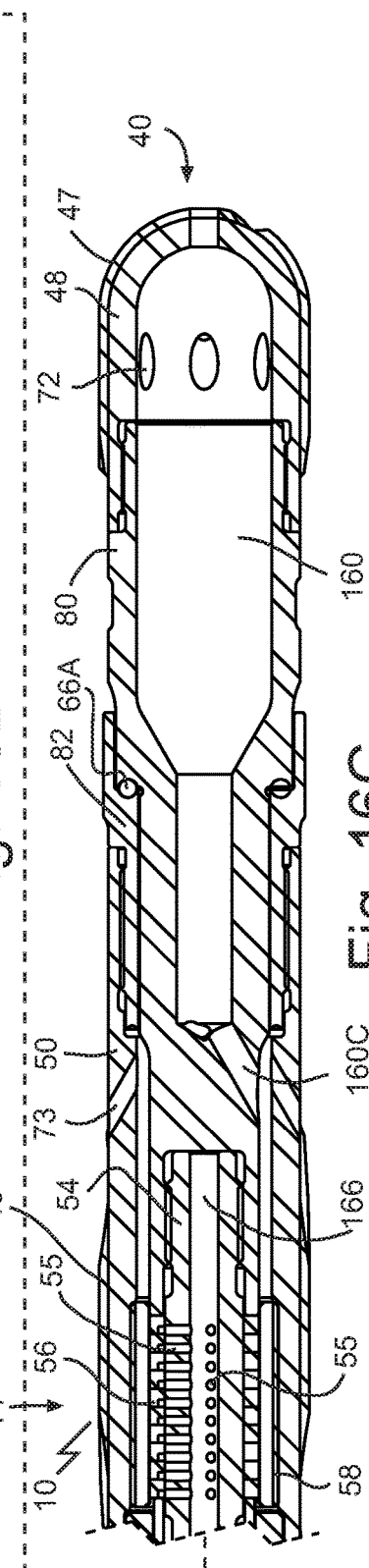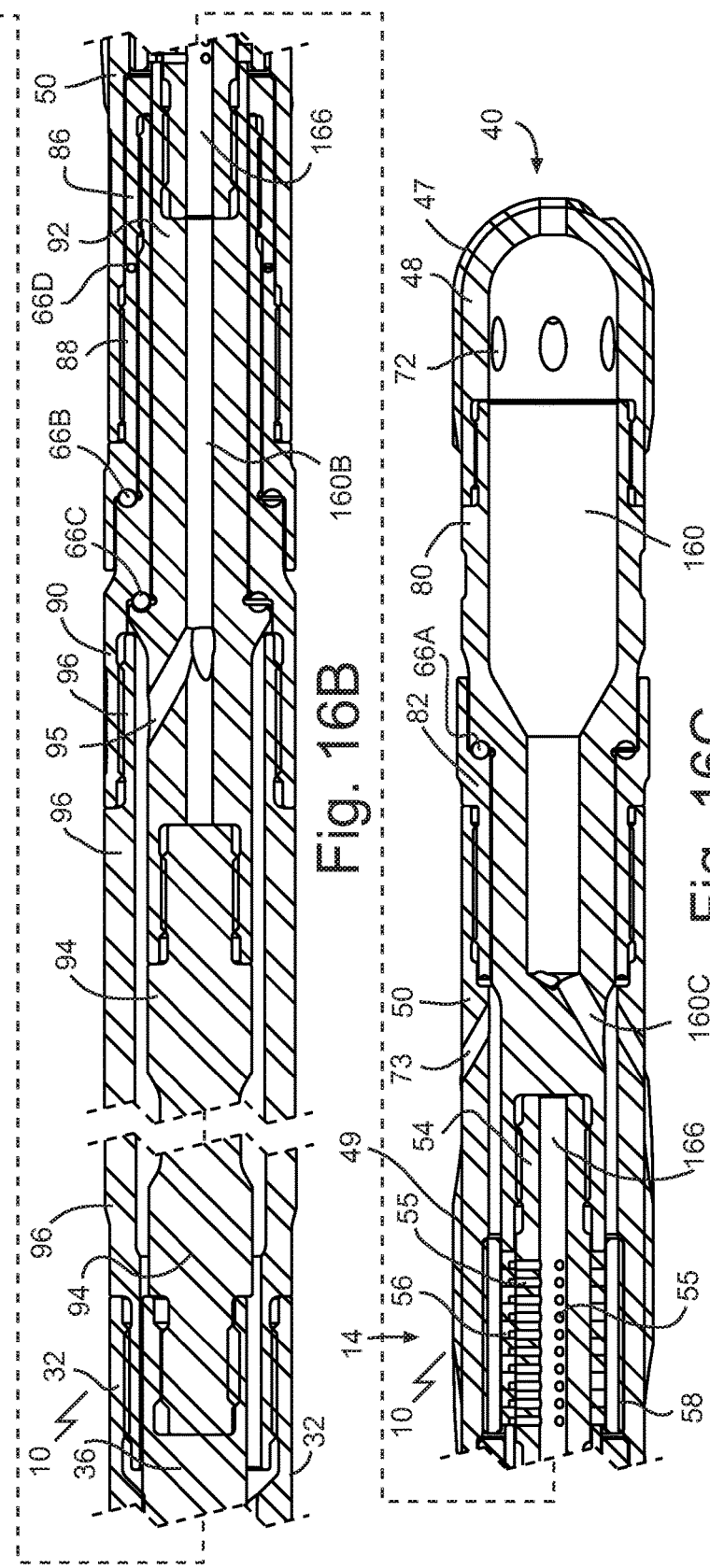

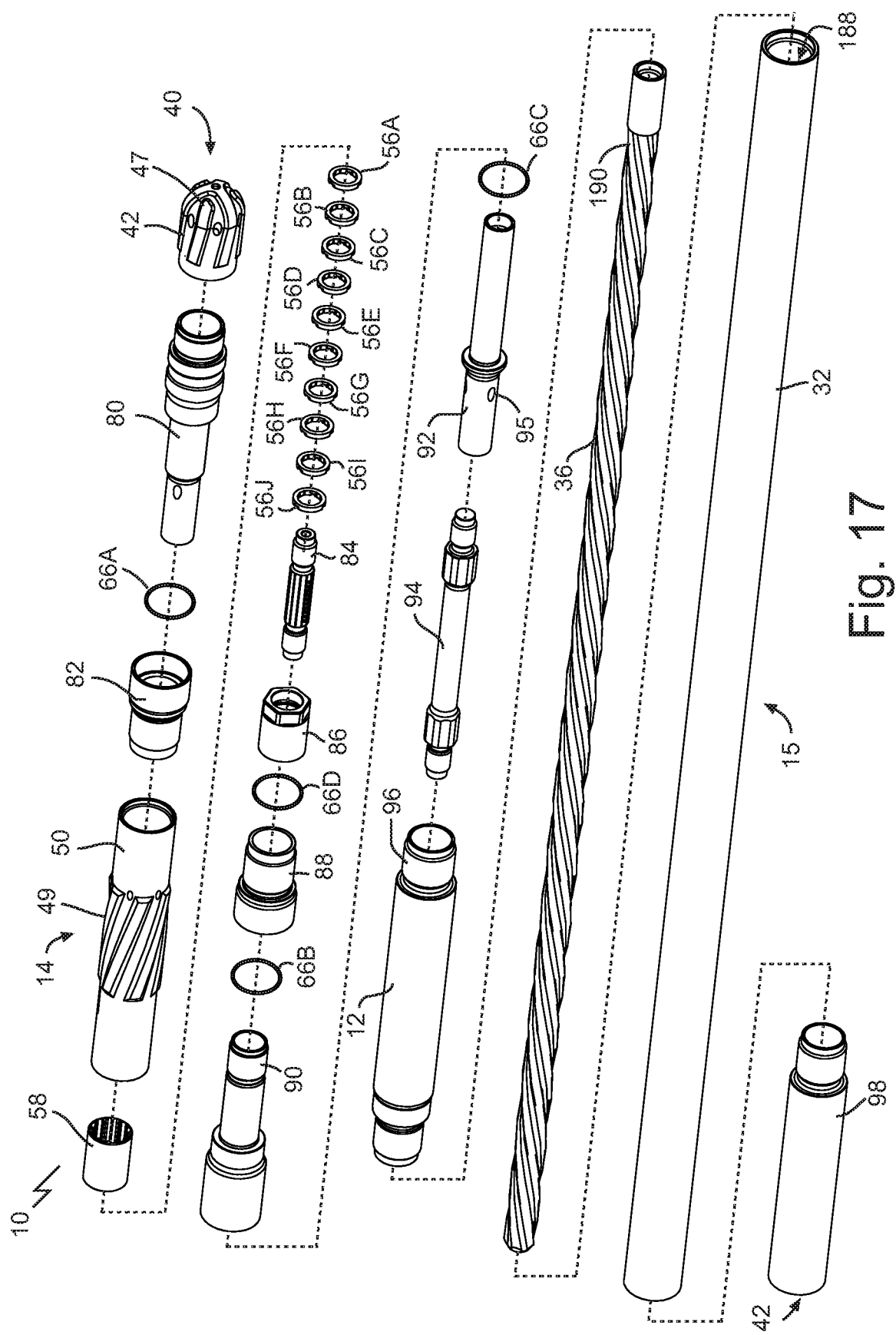

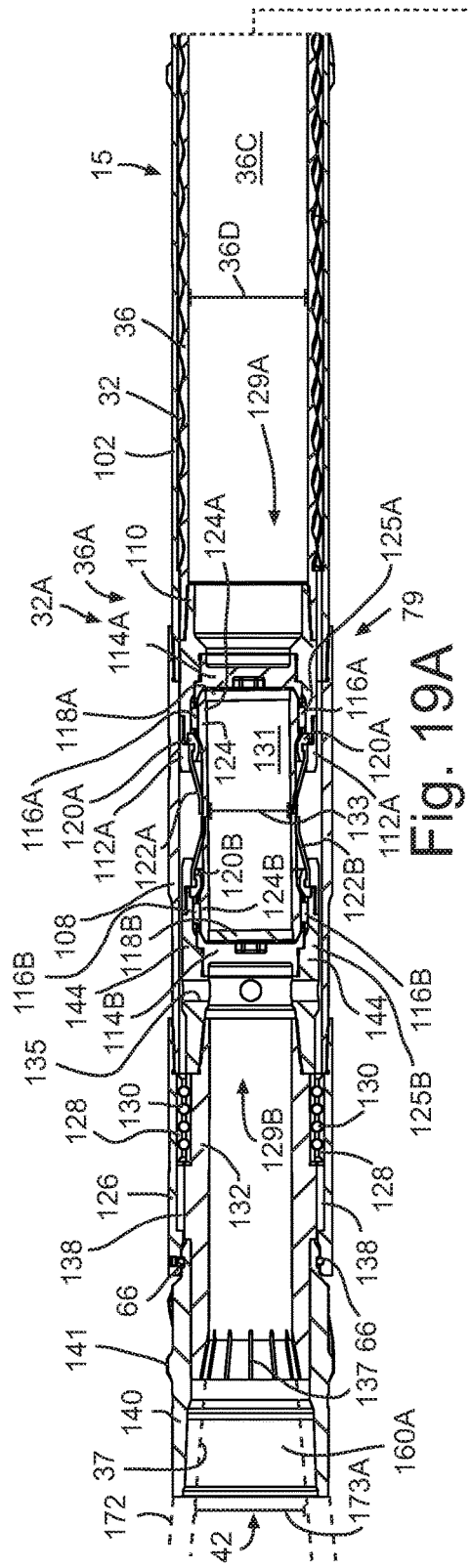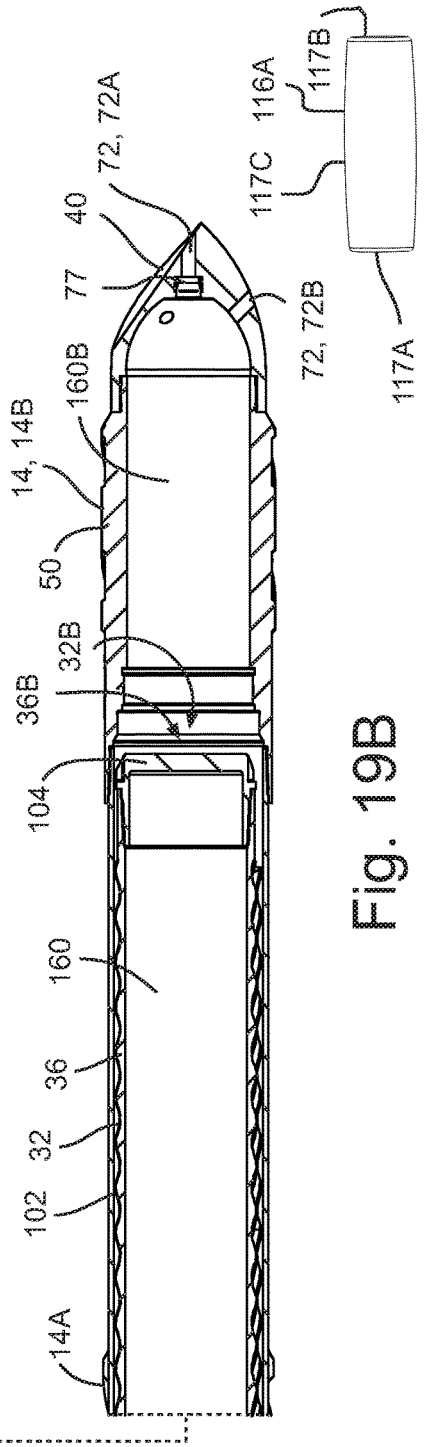

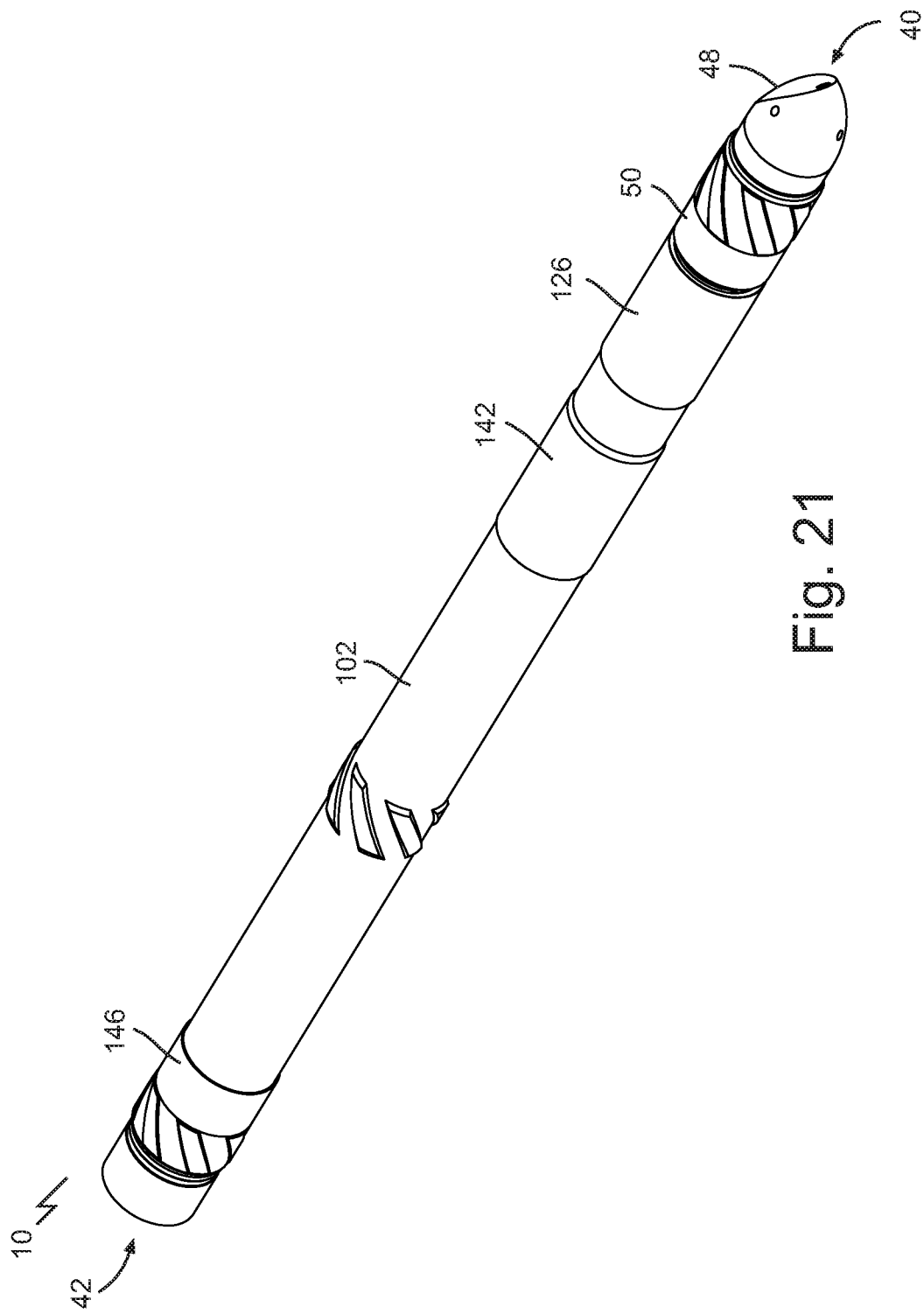

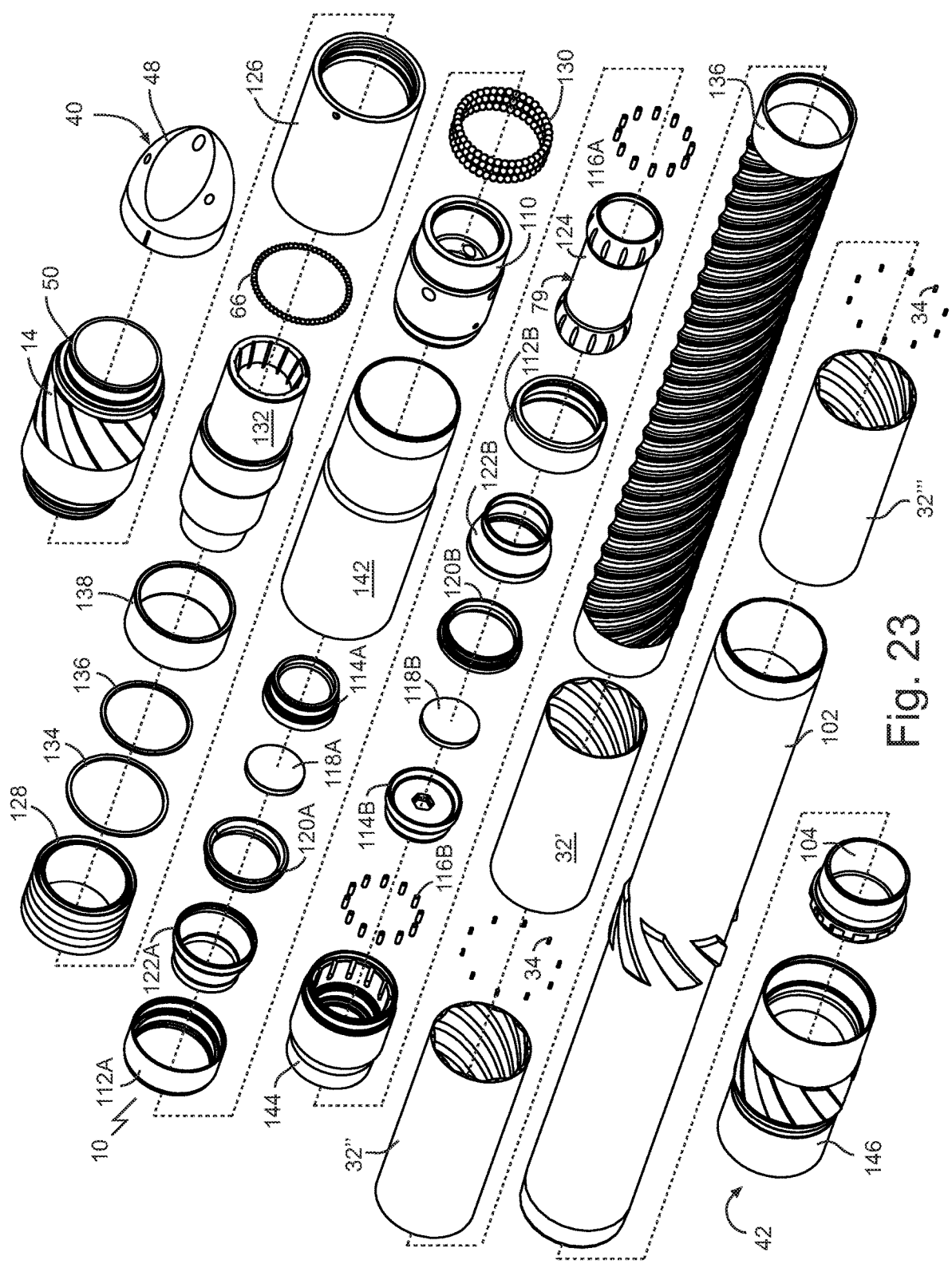

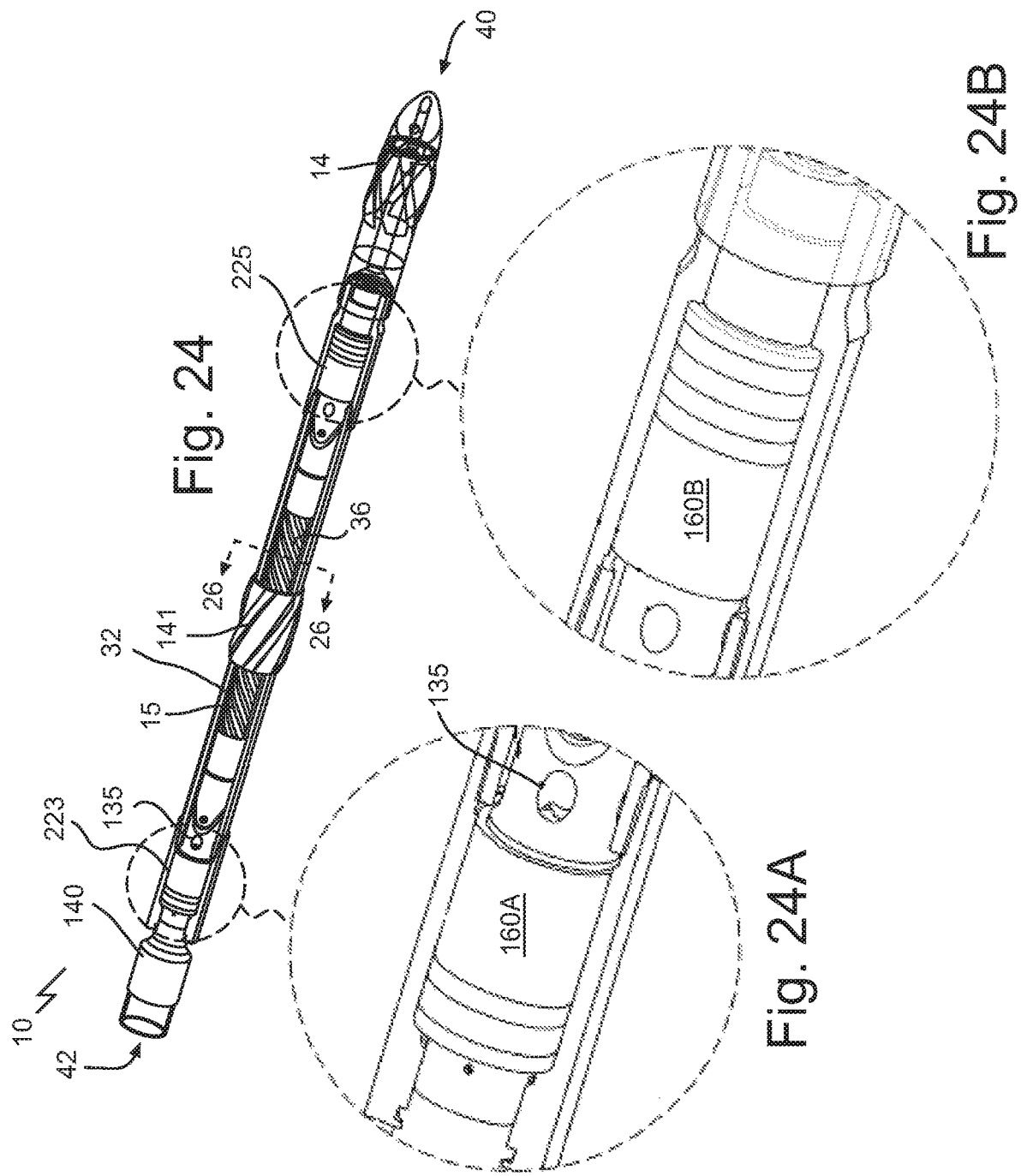

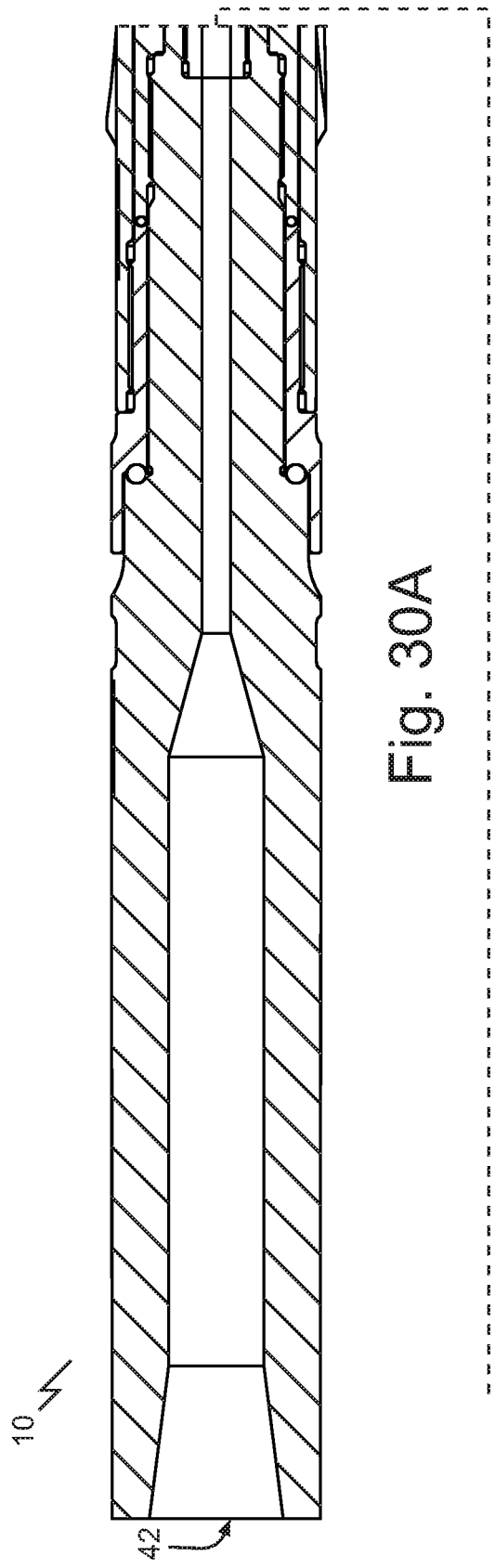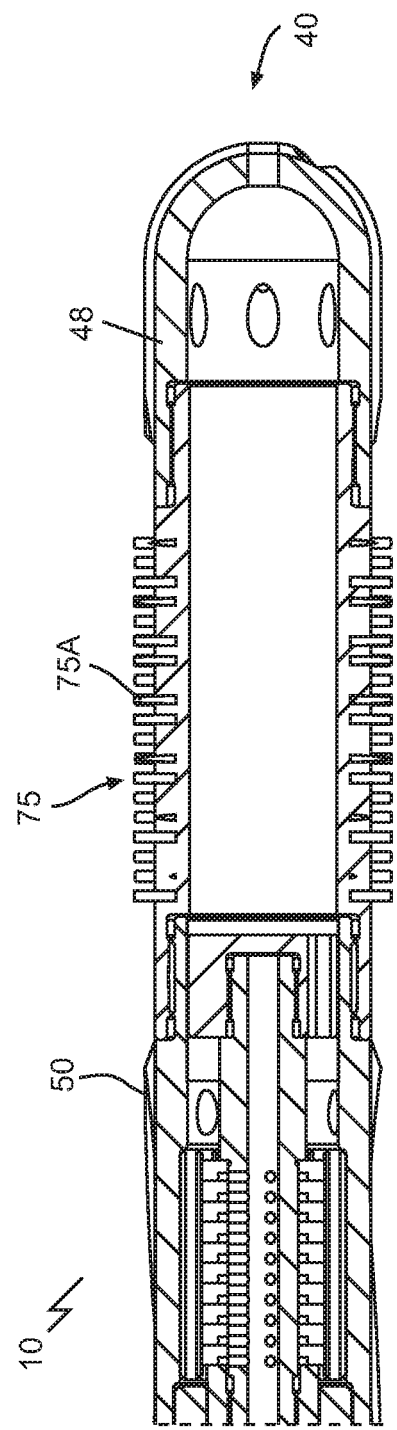

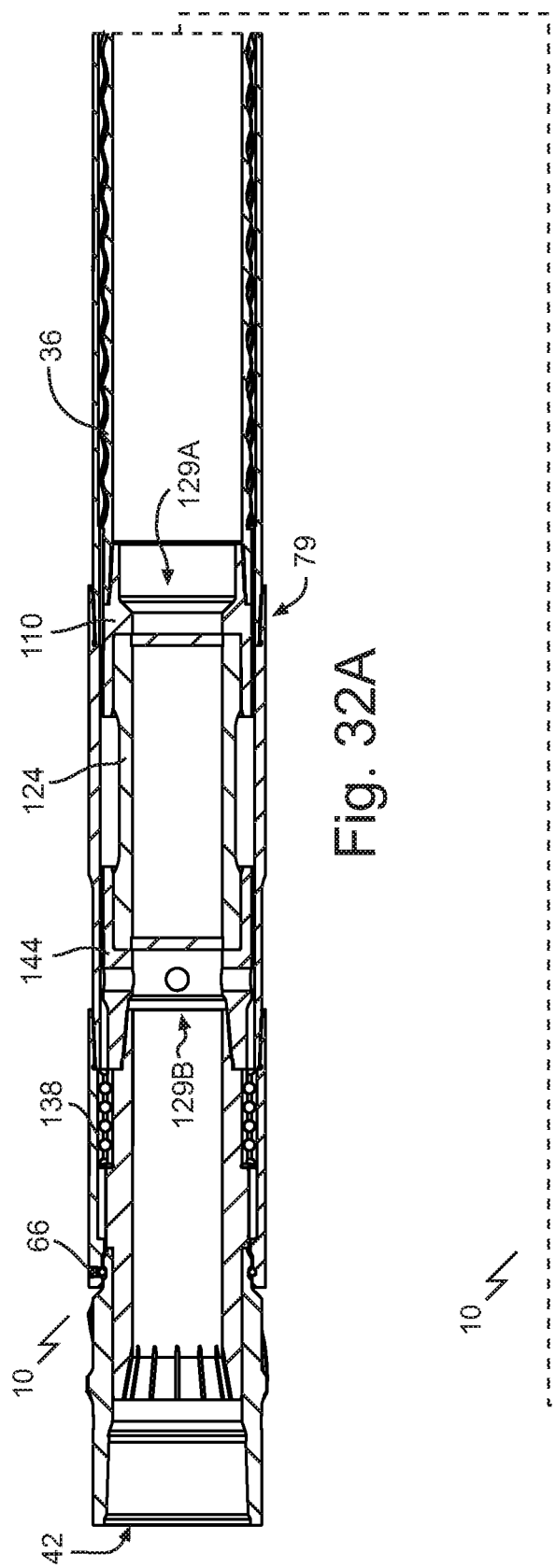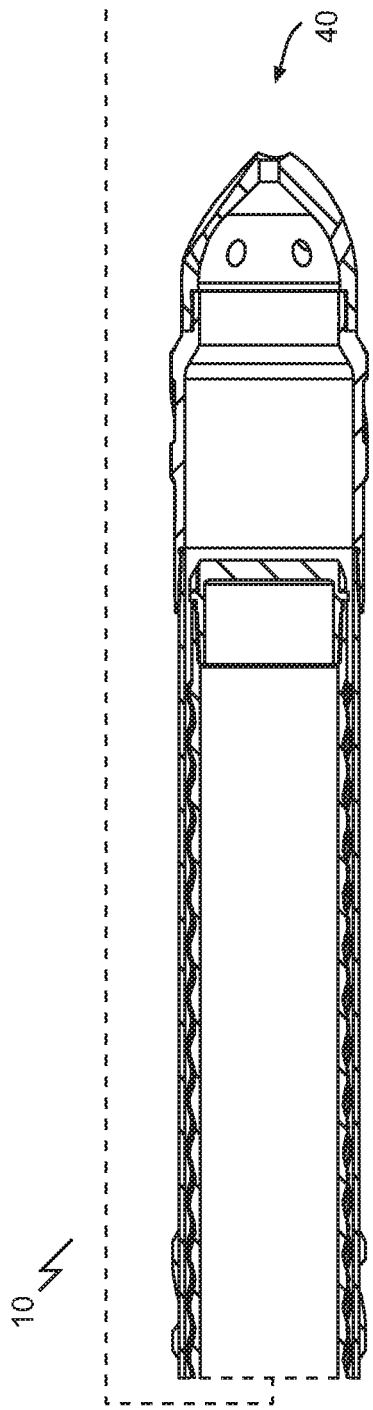
Fig. 32A
Fig. 32B

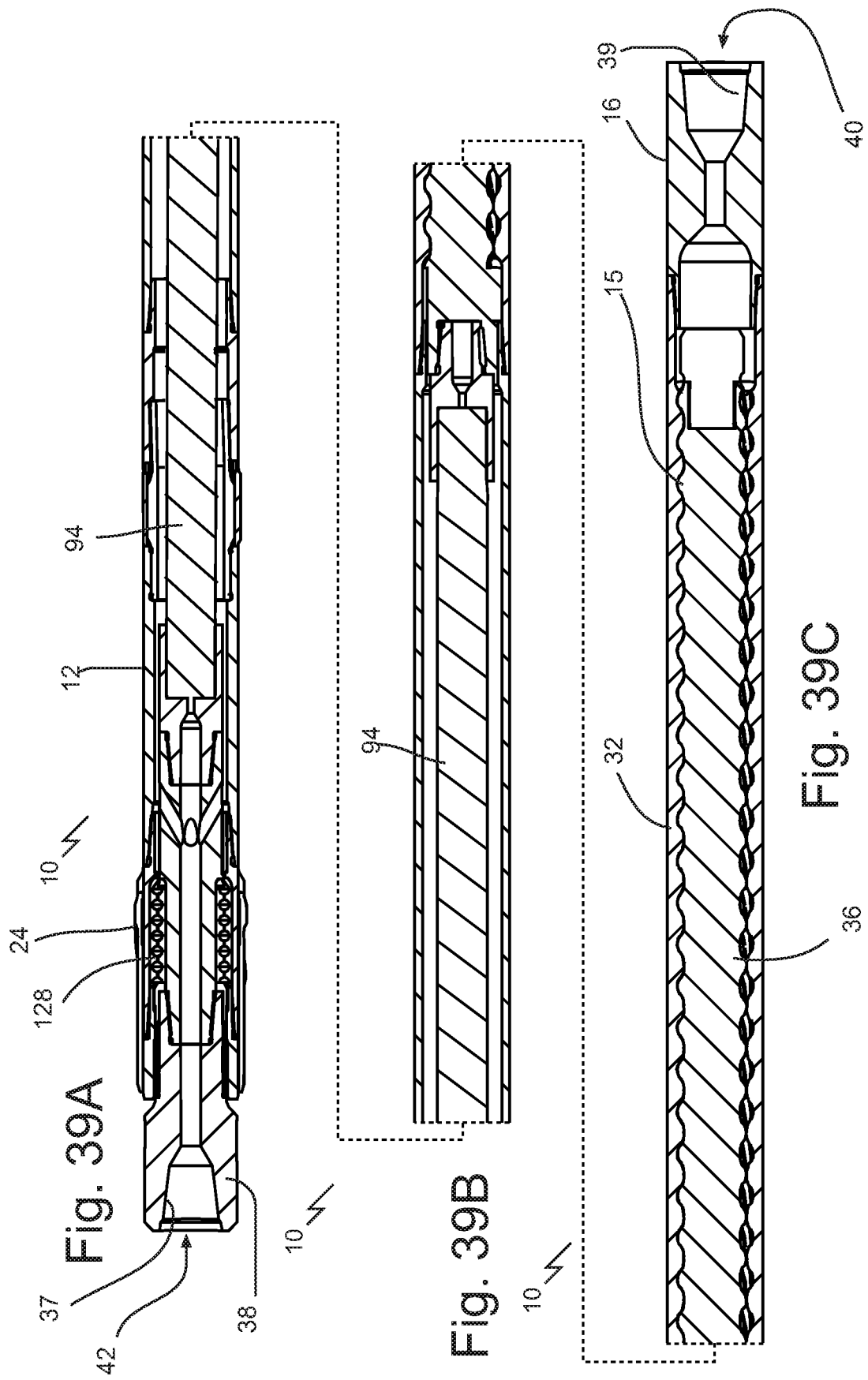

DOWNHOLE TOOLS WITH PROGRESSIVE CAVITY SECTIONS, AND RELATED METHODS OF USE AND ASSEMBLY

TECHNICAL FIELD

This document relates to downhole tools with progressive cavity sections, and related methods of use and assembly.

BACKGROUND

Progressive cavity sections, such as power sections and pumps are used in downhole tools, particularly in drilling and production applications. Casing reamer shoes have been used with a progressive cavity power section to achieve a reaming function. Multi-part stators are known, as are non-elastomeric stators. Counter-weighted, hollow stators are known. Drilling motors and other drilling tools use progressive cavity sections. U.S. Pat. Nos. 6,241,494, 4,764,094, 5,221,197, United States patent publication nos. 2010/0032170 and 2010/0038142, and French patent no. 2,349,729 provide some examples of such tools.

SUMMARY

A downhole tool is disclosed comprising: a progressive cavity section with a stator and a rotor; and in which the stator, the rotor, or the stator and the rotor are formed by electrochemical machining (ECM).

A method is disclosed comprising: forming a stator, a rotor, or the stator and the rotor by electrochemical machining (ECM); and forming a downhole tool by inserting the rotor into the stator.

A downhole tool is disclosed comprising: a progressive cavity section with a stator and a rotor; and in which the stator is formed from a single integral block of material, and the stator has a length of at least fifty inches defined between axial ends of the stator.

A method is disclosed comprising: forming a stator from a single integral block of material, in which the stator has a length of at least fifty inches defined between axial ends of the stator; and assembling a downhole tool by inserting a rotor into the stator.

A downhole tool is disclosed comprising: a progressive cavity section with a stator and a rotor; and in which the stator is formed by plural axial stator sections connected end to end, and adjacent axial stator sections, of the plural axial stator sections, are connected by dowels.

A method is disclosed comprising: forming a stator by connecting plural axial stator sections together end to end using dowels between the plural axial stator sections; and assembling a downhole tool by inserting a rotor into the stator.

A downhole tool is disclosed comprising: a progressive cavity section with a stator and a rotor; and in which the stator is formed by three dimensional printing.

A method is disclosed comprising: forming a stator by three dimensional printing; and assembling a downhole tool by inserting a rotor into the stator.

A method is disclosed comprising: forming a hollow rotor sleeve; forming a stator by three dimensional printing; and inserting the hollow rotor sleeve into the stator to form a progressive cavity section.

A downhole reamer tool is disclosed, comprising: a tubular body defining an interior passageway between an uphole end and a downhole end of the tubular body; and a reamer part mounted to the tubular body between the uphole end and the downhole end, the reamer part being mounted to rotate, relative to the tubular body, around a circumferential path about an outer-facing surface of the tubular body upon application of fluid flow within the interior passageway.

A method is also disclosed comprising: positioning a tubing string downhole in a well, the tubing string including a reamer tool; and pumping fluid through the tubing string to rotate a reamer part, of the reamer tool, relative to an uphole end tubing connector and a downhole end tubing connector of the reamer tool.

A casing reamer shoe is also disclosed comprising: a progressive cavity section with a stator and a rotor; a reamer part mounted to be rotated by the stator or the rotor; and in which the rotor is formed by a hollow helically lobed sleeve.

A method is also disclosed comprising: positioning a casing string downhole in a well, with a downhole end of the casing string mounting a casing reamer shoe; and pumping fluid through the casing string to operate a progressive cavity section of the casing reamer shoe to rotate a reamer part of the casing reamer shoe, in which a rotor of the progressive cavity section is formed by a hollow helically lobed sleeve.

A downhole reamer tool is also disclosed comprising: a progressive cavity section with a stator and a rotor, with the rotor having an uphole end tubing connector, and the stator mounted to rotate relative to the rotor upon application of fluid flow between the rotor and the stator; and a reamer part mounted to be rotated by the stator.

A casing or drill string with a downhole reamer tool is also disclosed.

A method is also disclosed comprising: positioning a tubing string downhole in a well, with the tubing string mounting a downhole reamer tool; and pumping fluid through the tubing string to operate a progressive cavity section, which has a stator and a rotor, with a reamer part connected to rotate relative to the stator, in which pumping fluid causes the stator and reamer part to rotate relative to the tubing string and the rotor.

A casing reamer shoe comprising: a tubular body with an uphole end tubing connector defining an interior passageway; a reamer part mounted to rotate relative to the tubular body at a first speed under fluid flow in the interior passageway; and a nose mounted to rotate relative to the tubular body at a second speed under fluid flow in the interior passageway, the first speed being different than the second speed.

A method is also disclosed comprising: positioning a casing string downhole in a well, with a downhole end of the casing string mounting a casing reamer shoe; and pumping fluid through the casing string to rotate a reamer part and a nose, both of the casing reamer shoe, at a first speed and a second speed, relative to an uphole end tubing connector of the casing reamer shoe, with the first speed being different than the second speed.

A casing reamer shoe is also disclosed comprising: a tubular body; the tubular body having a progressive cavity section with a stator and a rotor; a reamer part connected to be rotated by the stator or rotor; and a universal joint connected between the reamer part and the rotor, or between the rotor and a bearing on the tubular body, the universal joint being structured to convert eccentric motion of the rotor into concentric motion.

A method is also disclosed comprising: positioning a casing string downhole in a well, with a downhole end of the casing string mounting a casing reamer shoe; and pumping fluid through the casing string to operate a progressive cavity section of the casing reamer shoe to rotate a reamer part, in which a universal joint connects between the reamer part and a rotor of the progressive cavity section, or between the rotor and a bearing on the casing reamer shoe, the universal joint being structured to convert eccentric motion of the rotor into concentric motion.

A downhole reamer tool is also disclosed comprising: a tubular body with an uphole end tubing connector defining an interior passageway; a reamer part mounted to rotate relative to the tubular body; an impeller mounted within the tubular body and connected to rotate the reamer part; and the interior passageway having a plurality of radial passageways that direct fluid through the interior passageway in a radial direction against the impeller to drive the impeller and rotate the reamer part.

A method is also disclosed comprising: positioning a tubing string downhole in a well, with the tubing string mounting a downhole reamer tool; and pumping fluid through the tubing string to direct fluid through a plurality of radial passageways in a radial direction against an impeller, of the downhole reamer tool, to drive the impeller and rotate the reamer part, relative to the downhole reamer tool.

A method is also disclosed comprising: forming a hollow rotor sleeve; forming a stator by three dimensional printing; and inserting the hollow rotor sleeve into the stator to form a progressive cavity section.

A casing reamer shoe is disclosed comprising: a progressive cavity section with a stator and a rotor; a reamer part mounted to be rotated by the stator or the rotor; and in which rotor contacting surfaces of the stator, and stator contacting surfaces of the rotor, are rigid during use.

A casing reamer shoe comprising: a progressive cavity section with a stator and a rotor; a reamer part mounted to be rotated by the stator or the rotor; and in which the stator is formed by plural axial stator sections connected end to end, and adjacent axial stator sections, of the plural axial stator sections, are connected by dowels.

After drilling is completed for a particular section of a well, casing may be put down the hole to create a smooth interior bore through which additional work may be completed. However, the hole may not be perfect and often includes defects that can stop the casing from going all the way down. Accordingly, a reamer tool, the operating tip of which is usually called a shoe, may be put towards the bottom to ream out the hole as the casing slides down. In one non-limiting embodiment, there is a reamer system, device, and/or mandrel assembly that is, advantageously, a low-cost system that attaches to any of a great variety of shoes (e.g. float shoe, reamer shoe, guide shoe) from a variety of manufacturers. Such a system may include an internal/central axle that rotates inside a housing and/or includes a pin-down connection (e.g. pin to pin, box-pin) to couple to a shoe so it can connect to any tool/shoe. The internal axle may spin when fluid is pumped through the mandrel assembly and spins a sub that is connected to the shoe which therefore also spins. The internal axle and/or other centrally positioned parts may comprise of an aluminum and/or zinc alloy (or other material that may be drilled through rather easily, since the mandrel assembly is generally left at a bottom of the hole when the casing is finished being installed). There may be a power section, such as an internal corkscrew shaped set of blades/lobes that cause the internal axle to rotate and thus cause the tool to rotate when fluid is pumped through the housing that contains the corkscrew.

A reaming power assembly is disclosed, comprising: a) an inner mandrel having spiral lobes disposed on an outer surface thereof; b) an outer mandrel disposed around the inner mandrel and having spiral lobes disposed on an inner surface of the outer mandrel; and c) a spacing between the outer surface of the inner mandrel and the inner surface of the outer mandrel through which fluid may be pumped to generate torque therebetween; wherein at least one of the inner and outer mandrel is free to rotate.

A reaming tool is disclosed functionally coupled to an end of the assembly such that torque therefrom may be used to rotate the reaming tool.

A reaming device is disclosed comprising: a) a hollow inner mandrel having spiral lobes disposed on an outer surface thereof; b) an outer mandrel disposed around the inner mandrel and having spiral lobes disposed on an inner surface of the outer mandrel; and c) a spacing between the outer surface of the inner mandrel and the inner surface of the outer mandrel through which fluid may be pumped to generate torque therebetween; wherein at least one of the inner and outer mandrel is free to rotate; wherein the outer mandrel has a number of spiral lobes equal to the number of spiral lobes of the inner mandrel plus one.

A stabilized accentuated reamer is disclosed, comprising: a) a power section having a rotor and a stator; b) a stator outer housing having a bladed profile; and c) a drill string.

A reaming system is disclosed, comprising: a) an inner mandrel having spiral lobes disposed on an outer surface thereof; wherein the inner mandrel is hollow; wherein the hollow of the inner mandrel is sized large enough to freely pass a standard drill bit therethrough; b) an outer mandrel disposed around the inner mandrel and having spiral lobes disposed on an inner surface of the outer mandrel; c) a spacing between the outer surface of the inner mandrel and the inner surface of the outer mandrel through which fluid may be pumped to generate torque therebetween; wherein at least one of the inner and outer mandrel is free to rotate; wherein the outer mandrel has a number of spiral lobes equal to the number of spiral lobes of the inner mandrel plus one; wherein one of the inner and outer mandrel is nonrotatably coupled to an end of a casing and the other is non-rotatably coupled to a bit or shoe; d) an upper flow diverter that diverts fluid flow from a center region of the reaming assembly to the spacing between the inner and outer mandrels; e) a lower flow diverter that diverts fluid flow from the spacing between the inner and outer mandrels to a center region of the reaming assembly; f) an upper and lower bearing assemblies rotatably coupled between the inner and outer mandrels; g) an elongated tubular housing, including: g1) a first end having a fluid inlet aperture; g2) a second end, opposite the first end, having a fluid outlet aperture; and g3) a coupling structure at the first end of the housing that selectably mates with a bottom end of a casing tube; h) a first bearing pack disposed circumferentially about the first end of the housing; i) a reaming tool functionally coupled to the inner mandrel or outer mandrel such that torque therefrom rotates the reaming tool; and j) a casing tube coupled to the housing.

In various embodiments, there may be included any one or more of the following features: Rotor contacting surfaces of the stator, and stator contacting surfaces of the rotor, are rigid. The stator contacting surfaces and the rotor contacting surfaces are made of metal. Rotor contacting surfaces of the stator are defined by an elastomeric coating within the stator. The progressive cavity section is connected to rotate a reamer part of a casing reamer shoe. The progressive cavity section is connected to rotate a drill bit. The drill bit may be a polycrystalline diamond compact (PDC) or rotary drill bit. The stator has a length of at least fifty inches defined between axial ends of the stator. The stator has a length of at least fifty inches defined between axial ends of the stator.

The stator has a length of at least eighty inches defined between axial ends of the stator. The stator has a length of at least one hundred and fifty inches defined between axial ends of the stator. The stator has a length of at least three hundred inches defined between axial ends of the stator. The stator is formed by ECM. Forming the stator, rotor, or the stator and the rotor by ECM further comprises advancing a cutting tool into or over a workpiece along an axis of the workpiece, with a sidewall of the cutting tool having a helically lobed profile, in which advancing is carried out while: an electrical field is established across a gap defined by the sidewall of the cutting tool and a sidewall of the workpiece; an electrolytic solution flows through the gap; and the cutting tool rotates about the axis such that the sidewall of the workpiece takes on a shape that is the inverse of the helically lobed profile of the sidewall of the cutting tool. Securing the dowels between adjacent plural axial stator sections using adhesive. Sliding an outer sleeve around the stator to form an interference fit between the stator and the outer sleeve. A progressive cavity power section with a stator and a rotor, with the progressive cavity power section connected to rotate the reamer part. The reamer part is mounted or formed on an external part of the stator, and the stator is connected to rotate relative to the tubular body. The rotor is fixed in relation to the uphole end and the downhole end of the tubular body. The interior passageway is connected to a fluid inlet of the progressive cavity section; and the interior passageway includes a power section bypass between an uphole end and a downhole end of the progressive cavity power section. The power section bypass is coaxial with the tubular body. The fluid inlet comprises a plurality of radial passageways that direct fluid through the interior passageway in a radial direction. The plurality of radial passageways comprise a plurality of diverter ports, which are angularly spaced from one another about a reamer tool axis, in which the diverter ports are oriented to have decreasing distance from the downhole end of the tubular body when moving from an entry to an exit of each of the plurality of diverter ports. The interior passageway is connected to a fluid outlet of the progressive cavity section. The fluid outlet and the fluid inlet are defined through the rotor. The reamer part is mounted on respective bearings at an uphole end and a downhole end of the reamer part. The respective bearings comprise bearing packs. The respective bearings are exposed to fluid within the interior passageway during use. Rotor contacting surfaces of the stator, and stator contacting surfaces of the rotor, are rigid during use. The stator contacting surfaces and the rotor contacting surfaces are made of metal. The stator is formed by plural axial stator sections connected end to end. Adjacent axial stator sections, of the plural axial stator sections, are connected by dowels. Adhesive securing the dowels between adjacent axial stator sections. The plural axial stator sections are held together within an outer sleeve, with an interference fit between the plural axial stator sections and the outer sleeve. The stator is formed as a single piece by three dimensional printing. Respective tubing connectors at the uphole end and the downhole end of the tubular body. The reamer part comprises one or more of reamer blades and polycrystalline diamond cutters. The reamer part comprises reamer blades configured to act as stabilizer blades to center the downhole reamer tool within a well. The reamer part comprises a sleeve mounted coaxial with the tubular body. A casing or drill string comprising the reamer tool. The tubing string is a drilling string or a casing string. The tubing string is a drilling string. The drilling string comprises a fluid-actuated drilling motor and a drill bit, both located in a downhole direction relative to the reamer tool, and in which pumping fluid through the tubing string causes the fluid-actuated drilling motor to rotate the drill bit relative to the reamer tool. The tubing string remains angularly stationary while pumping fluid to rotate the reamer part. A hollow interior, defined by the hollow helically lobed sleeve, is closed. A wall within the hollow interior. Opposed axial ends of the hollow helically lobed sleeve are blocked by respective end walls. An uphole facing surface of the wall is striated. Rotor contacting surfaces of the stator, and stator contacting surfaces of the rotor, are rigid during use. The stator contacting surfaces and the rotor contacting surfaces are made of metal. The stator is formed by plural axial stator sections connected end to end. Adjacent axial stator sections, of the plural axial stator sections, are connected by dowels. Adhesive securing the dowels between adjacent axial stator sections. The plural axial stator sections are held together within an outer sleeve, with an interference fit between the plural axial stator sections and the outer sleeve. An inner diameter of the hollow helically lobed sleeve is sized to be commensurate with an inner diameter of the casing. A hollow interior, defined by the hollow helically lobed sleeve, is closed. Pumping cement through the casing reamer shoe and up an annulus defined between the well and the casing string. Drilling out the casing reamer shoe. An uphole facing surface of the tool is striated. A stator of the progressive cavity section is formed by plural axial stator sections connected end to end. Prior to positioning the casing string downhole, assembling the casing reamer shoe by connecting adjacent axial stator sections, of the plural axial stator sections, with dowels. Assembling further comprises using an adhesive to glue the dowels between adjacent axial stator sections. Assembling further comprises sliding an outer sleeve around the plural axial stator sections, to form an interference fit between the plural axial stator sections and the outer sleeve. Sliding is carried out while one or both of a) the plural axial stator sections are cooled below, and b) the outer sleeve is heated above, room temperature. An inner diameter of the hollow helically lobed sleeve is sized to be commensurate with an inner diameter of casing of the casing string. Forming a casing reamer shoe, and further comprising a nose forming a downhole end of the casing reamer shoe, in which the stator is connected to rotate the nose. The casing reamer shoe defines an interior passageway that supplies fluid to the progressive cavity section and to outlet ports within the nose. The outlet ports include outlet ports directed in one or both of axial and radial directions. A tubular body defining the uphole end tubing connector and mounting the rotor; and a stabilizer mounted to the tubular body. A universal joint connected between the rotor and a bearing on the tubular body, the universal joint being structured to convert eccentric motion of the rotor into concentric motion. A first motor connected to rotate the nose relative to the tubular body; and a second motor connected to rotate the reamer part relative to the tubular body. The first motor comprises a progressive cavity section with a stator and a rotor; and the second motor comprises an impeller. The stator is connected to the tubular body, and the rotor is connected to rotate the nose. The interior passageway has a plurality of radial passageways that direct fluid in a radial direction against the impeller to drive the impeller and rotate the reamer part. A progressive cavity section with a stator and a rotor, in which the stator or the rotor is connected to rotate the reamer part or the nose. An impeller connected to rotate the reamer part or the nose. The first speed is faster than the second speed. The nose is structured as one or both a drill bit or a reamer. The interior passageway is connected to supply fluid to outlet ports within the nose. The outlet ports include outlet ports directed in one or both of axial and radial directions. Pumping fluid to operate a progressive cavity section of the casing reamer shoe to rotate one or both the reamer part and the nose. Pumping fluid further comprises pumping fluid to operate an impeller to rotate one or both the reamer part and the nose. Pumping fluid further comprises supplying fluid to outlet ports within the nose to spray jets of fluid into the well from the nose. The first speed is faster than the second speed. The cooperating circumferential arrays of splines mesh via a circumferential array of pins. Each pin, of the circumferential array of pins, is tapered with decreasing radius from a central portion to each axial end of the pin. The cooperating circumferential arrays of splines comprise a radially-outward facing array of splines and a radially-inward facing array of splines. The cooperating circumferential arrays of splines are located at or near a first axial end of the shaft; and the shaft connects to the reaming part, or to a bearing on the tubular body, via a second set of cooperating circumferential arrays of splines, which are located at or near a second axial end of the shaft. The shaft is a hollow shaft sleeve. A hollow interior, defined by the hollow shaft sleeve, is closed. The universal joint is connected between the reamer part and the rotor. The universal joint is connected between the rotor and a bearing on the tubular body. The rotor is formed by a hollow helically lobed sleeve. The impeller comprises a circumferential array of fins on a radially inward facing surface of a sleeve that mounts the impeller to the tubular body. The circumferential array of fins are oriented parallel with an axis of the downhole reamer tool. The plurality of radial passageways are defined by slots in respective axial faces of each of a plurality of ring plates stacked axially one on the other. Each slot is curved or angled to eject fluid at non-zero angles relative to a radius defined by the respective ring plate and passing through a fluid exit end of the slot. The plurality of ring plates are stacked around a cylindrical wall of and coaxial with a collar, in which the plurality of radial passageways are defined from a central bore of the collar through the cylindrical wall of the collar. A pair of flanges, secured to or formed by the collar, compress the plurality of ring plates on the collar. An uphole flange of the pair of flanges connects to the tubular body. The cylindrical wall has an out-of-round circumferential profile that meshes with a corresponding inner circumferential profile of the plurality of ring plates. The out-of-round circumferential profile is polygonal. The impeller is connected to rotate the nose. The nose comprises one or more of blades and polycrystalline diamond cutters. The tubular body further comprises a progressive cavity section connected to rotate the nose independent of the rotation of the reamer part by the impeller. A wire brush scraper on an external surface of the downhole reamer tool. The progressive cavity section is connected to rotate a reamer part of a casing reamer shoe. The outer mandrel has a number of spiral lobes equal to the number of spiral lobes of the inner mandrel plus one. One of the inner and outer mandrel is non-rotatably coupled to an end of a casing and the other is non-rotatably coupled to a bit or shoe. An upper flow diverter that diverts fluid flow from a center region of the reaming assembly to the spacing between the inner and outer mandrels. A lower flow diverter that diverts fluid flow from the spacing between the inner and outer mandrels to a center region of the reaming assembly. The inner mandrel is hollow. The hollow of the inner mandrel is sized large enough to freely pass a standard drill bit therethrough. Upper and lower bearing assemblies rotatably coupled between the inner and outer mandrels. A) an elongated tubular housing, including: a1) a first end having a fluid inlet aperture; a2) a second end, opposite the first end, having a fluid outlet aperture; and a3) a coupling structure at the first end of the housing that selectably mates with a bottom end of a casing tube. A casing tube coupled to the housing. One of the inner and outer mandrel is non-rotatably coupled to an end of a casing and the other is non-rotatably coupled to a bit or shoe. An upper flow diverter that diverts fluid flow from a center region of the reaming assembly to the spacing between the inner and outer mandrels. A lower flow diverter that diverts fluid flow from the spacing between the inner and outer mandrels to a center region of the reaming assembly. The hollow of the inner mandrel is sized large enough to freely pass a standard drill bit therethrough. Upper and lower bearing assemblies rotatably coupled between the inner and outer mandrels. A) an elongated tubular housing, including: a1) a first end having a fluid inlet aperture; a2) a second end, opposite the first end, having a fluid outlet aperture; and a3) a coupling structure at the first end of the housing that selectably mates with a bottom end of a casing tube; b) a first bearing pack disposed circumferentially about the first end of the housing; and c) a reaming tool functionally coupled to the motor. A casing tube coupled to the housing.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIGS. 2A and 2B collectively form a cross-section view of the downhole reamer tool of FIG. 1.

FIG. 10 is a perspective view of a further embodiment of a casing reamer shoe an impeller-powered reamer.

FIG. 11A is a section view taken along section lines 11A-11A of FIG. 10.

FIG. 11B is a section view taken along section lines 11B-11B of FIG. 10.

FIG. 12 is a perspective view of a discharge ring plate of the casing reamer shoe in FIG. 10.

FIG. 15 is a perspective view of a further embodiment of a casing reamer shoe with a progressive cavity power section and an impeller-powered reamer.

FIGS. 16A, 16B and 16C collectively form a cross-section view of casing reamer shoe of FIG. 15.

FIG. 17 is an exploded perspective view of the casing reamer shoe of FIG. 15.

FIGS. 19A and 19B collectively form a cross-section view of the casing reamer shoe of FIG. 18.

FIG. 19C is close up side elevation view of a drive pin from the universal joint of the embodiment of FIG. 19A.

FIG. 21 is a perspective view of a further embodiment of a casing reamer shoe with a progressive cavity power section.

FIG. 23 is an exploded perspective view of the casing reamer shoe of FIG. 21 with a progressive cavity power section.

FIG. 24 is a perspective view of a further embodiment of a casing reamer shoe with a progressive cavity power section.

FIGS. 24A and 24B are enlarged detail perspective views of portions, circled in dashed lines, of the illustration of casing reamer shoe of FIG. 24.

FIGS. 30A and 30B collectively form a cross-section view of the casing reamer shoe of FIG. 29.

FIGS. 32A and 32B collectively form a cross-section view of the casing reamer shoe of FIG. 31.

FIGS. 39A-C collectively form a cross-section view of the drilling motor of FIG. 38.

DETAILED DESCRIPTION

Figure 1:
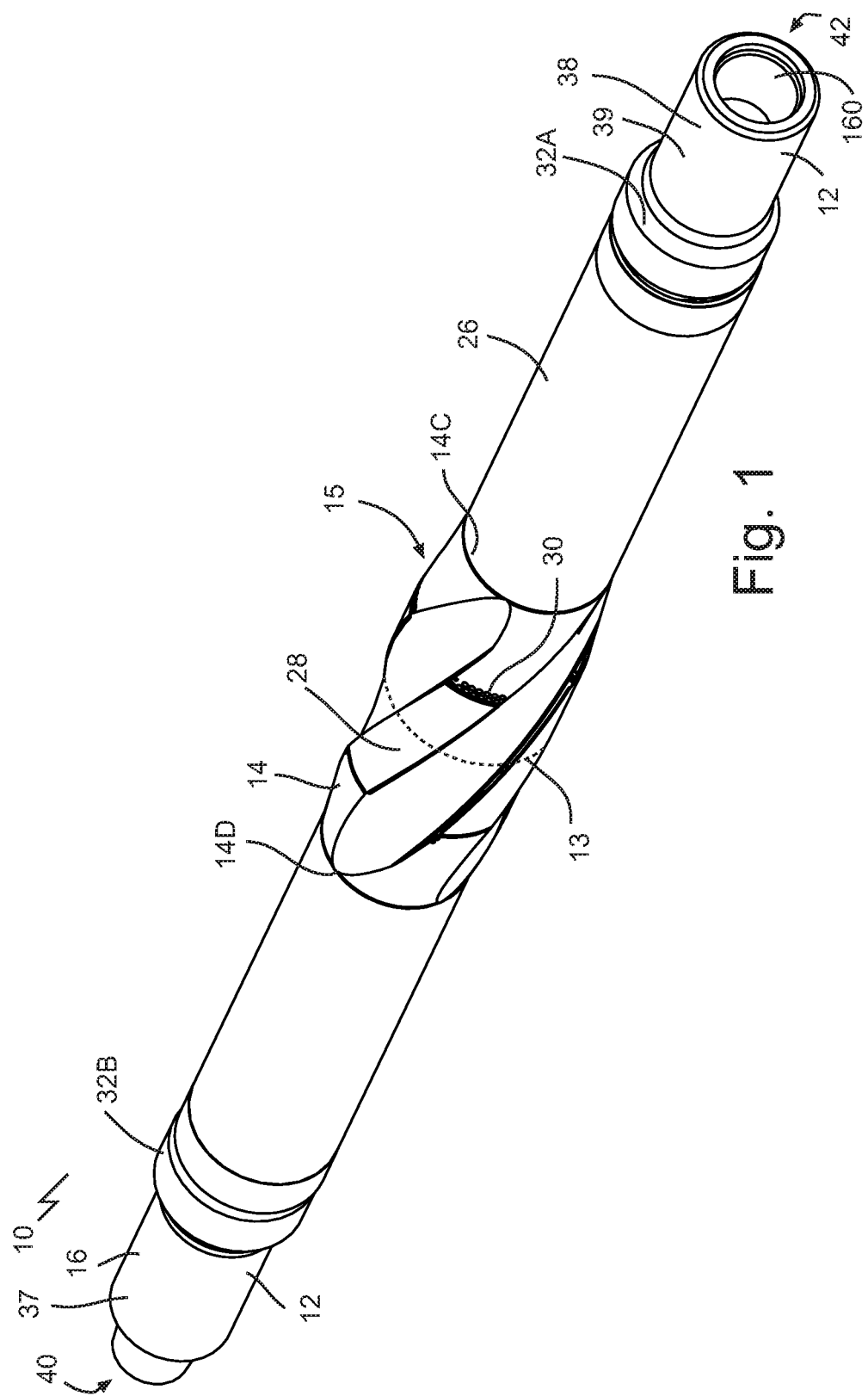
FIG. 1 is a perspective view of a downhole reamer tool with a progressive cavity power section.

Immaterial modifications may be made to the embodiments described here without departing from what is covered by the claims.

In a typical power section of a positive displacement fluid motor used in drilling a wellbore that traverses subterranean hydrocarbon bearing formations, power generation is based upon the Moineau pump principle. In this type of motor design, a stator and rotor assembly converts the hydraulic energy of a pressurized circulating fluid to the mechanical energy of a rotating shaft. The rotor and stator are typically of a helically lobed design, with the rotor and stator having a corresponding helically lobed profile with plural helical lobes. The rotor is generally formed from steel or another suitable metal having one less lobe than the stator, which is typically lined with an elastomer layer.

In general, the power section may be categorized based upon the number of lobes and effective stages. The rotor and stator lobes may have a helical configuration defining plural stages, with each stage equating to the linear distance of a full wrap of the stator helix. The rotor and stator lobes and helix angles may be selected such that the rotor and stator seal at discrete intervals, which results in the creation of axial fluid chambers or cavities that are filled by the pressurized circulating fluid. The action of the pressurized circulating fluid causes the rotor to rotate and precess within the stator. Motor power characteristics are generally a function of the number of lobes, lobe geometry, helix angle and number of effective stages. Motor output torque is directly proportional to the differential pressure developed across the rotor and stator. In drilling operations, bit rotation speed is directly proportional to the circulating fluid flow rate between the rotor and stator.

Progressive cavity sections, such as pumps or motors, or used in downhole contexts other than drilling. For example, a progressive cavity pump may be used at the end of a sucker rod string in a production well. Similarly, cutting and servicing tools, as well as well perforating and stimulation tools may incorporate progressive cavity sections.

A reamer is a type of rotary cutting tool used to clean and in some cases enlarge the size of a previously formed hole, generally to leave the sides of the hole sufficiently smooth for later purposes. The process of cleaning or enlarging the hole may be called reaming. Reamers take many forms and may be designed for use as a hand tool or in a machine tool, such as a milling machine or drill press, in drilling system for drilling for oil, and/or in other earth drilling contexts, and others. In the context of drilling for oil, immediately after a hole is drilled, the hole may lack a clean, smooth profile suitable for casing.

Drilling may alter the characteristics of the surrounding formation and produce a void with respect to pressure, and water content. In some cases chemical interactions may occur by exposure of materials surrounding the hole to the air. Further, natural layering, fissures, and fracture lines may react differently to the hole than the surrounding material. Accordingly, such newly-drilled holes may end up with discontinuities that make it difficult to operate the hole as desired. Reamer systems may be used in such and other contexts to make the sides of the hole sufficiently smooth for continued operation. Also, in completion operations reaming is followed with installation of a casing string that prevents further distortion of the surrounding material from intruding on the working portion of the hole.

Casing may refer to steel pipe that is landed within the well and cemented in place during wellbore construction in order to stabilize the wellbore. The casing string may be made up of a plurality of casing sections, which are threaded together and collectively extend from the surface to a landing point within an open hole. The base of the casing string may contain a shoe, which may operate as one or more of a reamer, guide, or float shoe. Once in position the casing may be cemented in place. Once casing is installed, the wellbore may be further extended by drilling through the casing shoe using a drill bit of a relatively smaller inner diameter than the diameter of the casing that is drilled through. Once drilling is complete, a subsequent casing string is run from surface to extend from the bottom of the previous casing string to the bottom of the further drilled open hole. Once installed, the subsequent casing string is cemented in place. The process can be repeated to further extend the wellbore, leading to a situation where the wellbore thus comprises a series of concentric casing strings of gradually decreasing inner diameter extending to great depths and distances within the formation.

Casing is usually selected to have an outer diameter that is commensurate with an open hole diameter. A float shoe may be used to guide the casing toward the center of the hole to minimize the impact of rock ledges or washouts in obstructing the travel of the casing string as the casing is run into the wellbore. The float shoe functions to assist in cementing operations, and may be constructed of a drillable material to permit the float shoe to be drilled through if the well is to be deepened beyond the casing landing point. If a casing string gets snagged on an obstruction in the well, the entire string may become jammed, holding up the completion operation and requiring extensive and expensive intervention operations. A reamer thus works synergistically with the running of a casing string to obliterate and remove obstructions in the wellbore, improving ease of casing travel through the well, reducing the chance of a stuck casing string, and all the while cleaning and polishing the wellbore to prepare same for cementing and completion. The nature of a reamer shoe as a reamer usually means that the reamer is wider than or equal to the outer diameter (OD) of the casing string, and thus difficult or impossible to remove from the well if run into the well with a casing string. Thus, a casing reamer shoe may be left at the bottom of the hole and drilled out if required.

Reaming a deviated well, such as a horizontal well, may present additional challenges relative to a vertical well. For example, it may be a challenge to slide a string of mandrels, pipes and others, inside the dogleg or toe part of the hole, as the weight of such units may rest against the side of the hole, creating friction. Such friction may increase the difficulty to advance a drill or reamer during horizontal operation, and may increase the chance of a casing string getting stuck or otherwise hung up prior to landing.

Figure 28:
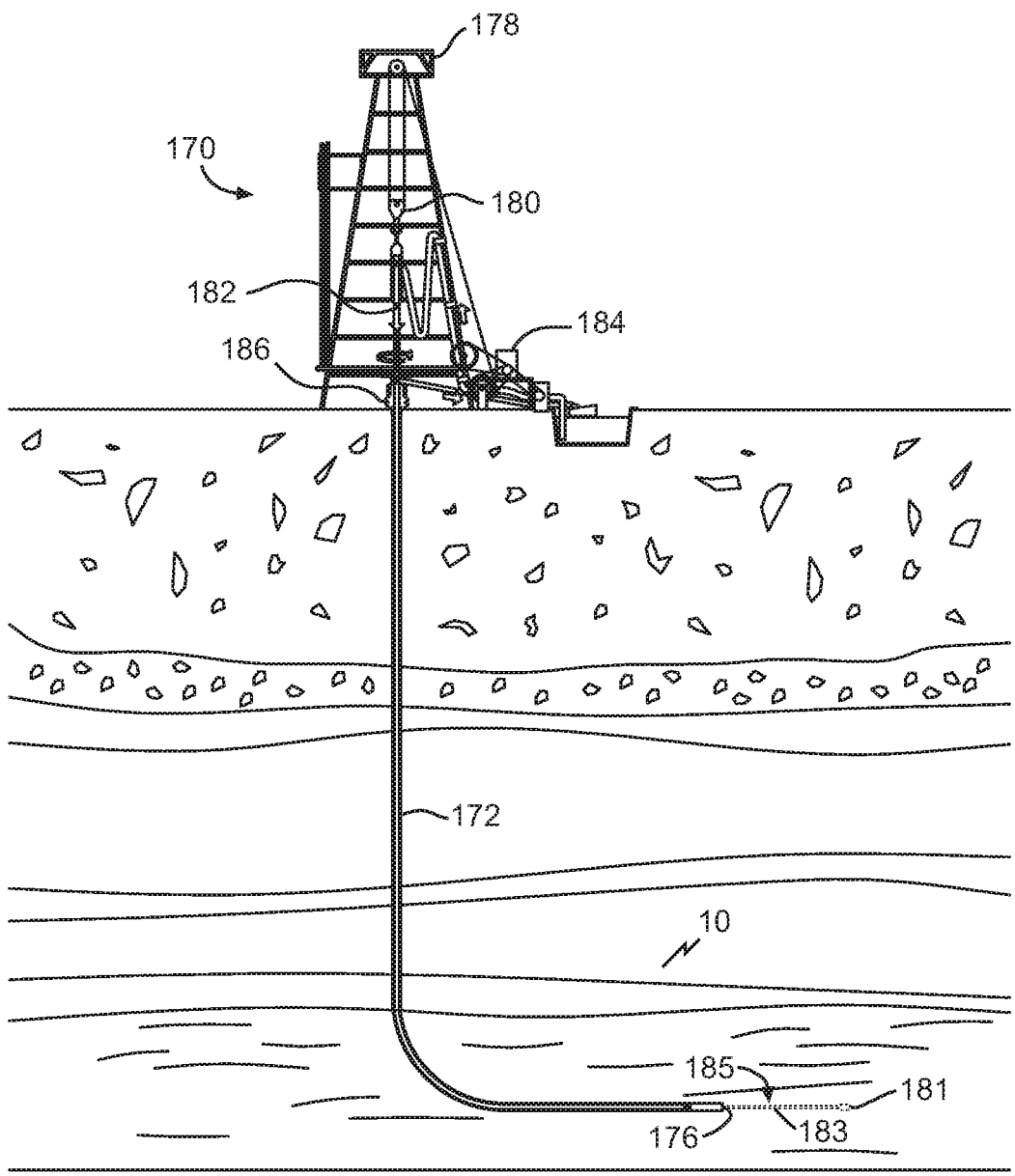
FIG. 28 is a side elevation view of a casing reamer shoe in use in horizontal well.

Referring to FIG. 28, a method of using a downhole tool 10, such as a reamer tool as shown, to cut the final size and finish of a horizontal drill hole is illustrated. Generally, a reamer tool will not make the original hole, but instead, will enlarge and/or clean or otherwise smooth the interior wall of a previously drilled or bored hole. In some cases, the reamer tools disclosed here may be used as part of a drilling operation, however. The illustrated reamer tool 10 may be supported at a downhole end of a casing 172, which is supported by a suitable rig structure such as a derrick 170. The reamer tool 10 may be disposed within a well bore 176. The derrick 170 may include suitable structure and devices to operate the reamer tool 10 and to permit the incremental addition of casing sections to the casing string as the reamer tool 10 works its way in a downhole direction through the wellbore 176. The reamer tool 10 may advantageously allow for the wellbore 176 to be reamed and lined with a casing 172 for future production and stimulation operations.

Referring to FIG. 28, derrick 170 may comprise a lifting device such as a guyed mast, for example a gin pole, which may be articulated over a load by adjusting its guys. The term derrick may include the framework supporting a drilling apparatus in an oil well drilling or completion rig. The illustrated derrick comprises a crown block 178. The illustrated crown block 178 may be functionally coupled to a traveling block 180 that travels vertically within the derrick 170. A crown block may form a stationary section of a block and tackle system that contains a set of pulleys or sheaves through which the drill line 182 (wire rope) may be threaded and positioned opposite and above traveling block 180. Traveling block 180 is the freely moving section of a block and tackle system that contains a set of pulleys or sheaves through which the drill line (wire rope) may be threaded and positioned opposite (and under) the crown block (the stationary section). The combination of the traveling block 180, crown block 178 and wire rope drill line 182 may produce the ability to lift string weights in the hundreds of thousands of pounds. On larger drilling rigs, when raising and lowering derrick 170, line tensions over a million pounds are not unusual.

Referring to FIG. 28, the rig may comprise sufficient surface pumping equipment to operate the fluid-actuated reamer tool 10. Derrick 170 may comprise a motor 184 or other power source that may be used to operate one or more pumps, winches, drills, and/or the like and combinations thereof. The motor 184 may be used to pump fluid through the casing 172 and through reamer tool 10 to cause the reamer tool 10 to rotate at high speeds and with sufficient torque to effectively ream the hole or wellbore 176.

Derrick 170 may also include a blowout preventer 186 functionally coupled around a top of the wellbore 176. The blowout preventer 186 may comprise a large, specialized valve or similar mechanical device, usually installed redundantly in stacks, used to seal, control and monitor an oil and gas well. Blowout preventers were developed to cope with extreme erratic pressures and uncontrolled flow (formation kick) emanating from a well reservoir during drilling. A kick may lead to a potentially catastrophic event known as a blowout. In addition to controlling the down hole (occurring in the drilled hole) pressure and the flow of oil and gas, s blowout preventer is intended to prevent tubing (e.g. drill pipe and well casing), tools and drilling fluid from being blown out of the wellbore (also known as the bore hole, the hole leading to the reservoir) when a blowout threatens. A blowout preventer improves the safety of crew, rig (the equipment system used to drill a wellbore) and environment, and are used in the monitoring and maintenance of well integrity. Blowout preventers are intended to provide fail-safety to the systems that include them.

Referring to FIG. 28, the reamer tool 10 may be coupled to the bottom or downhole end of the casing 172 in a variety of suitable manners, including but not limited to mating threads, snap-fits, friction fitting, adhesives, bolts, and the like and combinations thereof. The reamer tool 10 may function with or as a shoe, which is the operating component that interfaces with the interior of the hole to be reamed and abrades away material, thereby reaming the hole. The shoe may include protrusions that, when the shoe spins, impact with non-cylindrical regions of the interior of the hole and thereby abrade the same making such regions smoother and increasing the effective interior diameter of the same so that the casing can follow behind the shoe without getting stuck.

The STAR—Stabilized Accentuated Reamer

Referring to FIGS. 1 and 2A-B, a downhole reamer tool 10 is depicted comprising a reamer part 14 and a tubular body 12. An interior passageway 160 may be defined between a downhole end 40 and an uphole end 42 of tubular body 12. Reamer part 14 may mount to tubular body 12 between the uphole end 42 and the downhole end 40, for example at a location where axial ends 14C, 14D, of the reamer part 14, and in the example shown axial ends 32A, 32B of the stator 32, are spaced from both ends 40 and 42 of body 12. Referring to FIGS. 1, 2A-B, and 3, reamer part 14 may be mounted to rotate, relative to the tubular body 12, for example around an outer circumferential path, such as path 13 (FIG. 1), about an outer-facing surface 200 of the tubular body 12. FIGS. 2A-B, reamer part 14 may rotate upon application of fluid flow within interior passageway 160 of the tubular body 12. Fluid flow may comprise the flow of drilling fluid or other suitable fluids, such as water or invert, through at least a portion of tool 10 from uphole end 42 to downhole end 40.

Referring to FIG. 1, reamer part 14 may be mounted in a suitable fashion to rotate relative to tubular body 12. Reamer part 14 may be mounted to rotate via a suitable mechanism such as bearings (for example ball bearings, slide bearings, thrust bearings, or bearing surfaces), parts comprising sacrificial material, and others. Tubular body 12 may comprise tubing connectors 37 and 39 at the downhole end 40 and the uphole end 42, respectively. Tubing connectors 37 and 39, such as threaded pin and box ends as shown, may connect to part of the tubing string, such as casing string 173 or drilling string, including tools that make up the string. During use, body 12 may remain angularly stationary, while reamer part 14 may rotate relative to body 12, under fluid flow. In cases where body 12 is rotating, for example if the tubing string is rotating, body 12 may rotate at a relatively faster rate relative to tubular body 12 than the tubing string. Reamer part 24 may mount to a motor housing sleeve 26 and in the example shown housing sleeve 26 rotates with reamer part 24.

Referring to FIG. 1, the exterior of tool 10 may comprise a suitable reamer part 14. For example, a bladed profile with helical reamer blades 28 extending radially outwardly from a maximum outer diameter (OD) of the casing, tool or drill string may be used. The relative rotation caused by the fluid pumped through the interior passageway 160 may cause the reamer blades 28 to rotate and thereby ream the hole about the location of the tool within the drill hole. Reamer blades 28 may be configured to act as stabilizer blades when the reamer part 14 is not rotating, to center tool 10 within the drill hole or well.

Referring to FIG. 2A, a motor 15, such as a mud motor or progressive cavity power section (PC motor), may be connected to rotate the reamer part 14. PC motor 15 may use fluid flow to create rotational motion, in the power section 17, and such motion may be transferred to the reamer part 14. The power section 17 of PC motor 15 may comprise an outer mandrel such as a stator 32 and an inner mandrel such as rotor 36.

Figure 3:
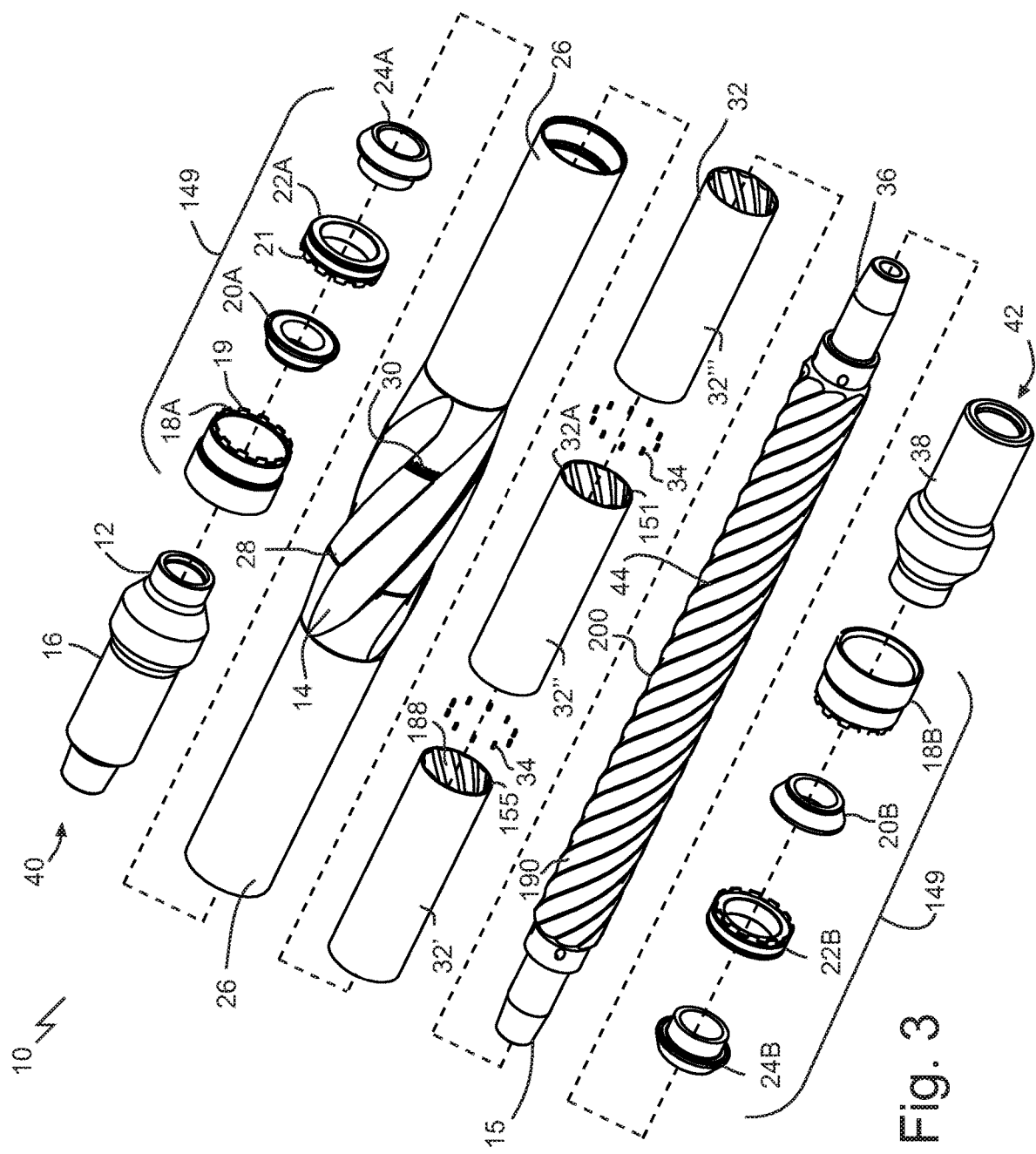
FIG. 3 is an exploded perspective view of the downhole reamer tool of FIG. 1.

Referring to FIGS. 2A and 3, in some cases, the outer mandrel comprises a stator 32, and the inner mandrel comprises a rotor 36. Rotor 36 may comprise helical lobes 41 that extend from an exterior surface of rotor 36. Stator 32 may comprise opposing helical lobes 33 that extend from an interior surface of stator 32 that faces helical lobes 41 of the rotor 36 after assembly. There may be a region between the rotor 36 and the stator 32 that is spaced and shaped to permit fluid to flow between from one axial end of the PC motor 15 to the other. The spiral lobes 33, 41 may be mismatched such that they rotate against each other when fluid is pumped through the space between them and generate vibration (notation) as one rotates past the other. When the number of nodes on the rotor is one less than the number of nodes on the stator, the rotation may induce a vibration to reamer tool 10 and may help tool 10 overcome frictional forces and assist the blades 28 on an exterior of the stator 32 to cut through earth or rock. Motor 15 may comprise any suitable fluid-moving motor or pump. In some cases, PC motor 15 operates by rotating the outer mandrel relative to the inner mandrel, while in other cases, PC motor 15 rotates the inner mandrel relative to the outer mandrel. Lobe differentials, such as two or more lobes on the stator than on the rotor, may be used.

Referring to FIGS. 2 and 3, stator 32 may have a suitable shape. Stator 32 may be formed by plural axial stator sections connected end to end. Stator 32 may comprise adjacent stator housing sections 32'-32". Stator housings 32'-32''' may comprise an aperture or plurality of apertures 155 each sized to fit a single dowel 34. Dowels 34 may connect and fix one stator housing sections 32'-32''' to one or more of adjacent stator housing sections 32'-32'''. The plural axial housing sections 32'-32'''. Dowels may be secured to stator housing sections 32'-32''' by adhesive, such as LOCTITE™ or another suitable adhesive.

Referring to FIG. 3, the plural axial housing sections 32'-32''' may be connected end to end. The plural axial stator sections 32-32''' may be held together within an outer sleeve 46, which holds the sections by a suitable mechanism, such as an interference fit between the plural axial stator sections 32'-32''' and the outer motor sleeve 46. The interference fit may be sufficiently tight to transmit torque during use between stator 32 and reamer part 14. In some cases a zero or positive interference fit may be used. Assembly of stator sections 32'-32''' may comprise sliding the outer motor sleeve 46 around the plural axial stator sections 32'-32''', to form the interference fit. Sliding may be carried out while one or both of a) the plural axial stator sections are cooled below, and b) the outer motor sleeve is heated above, room temperature. For example, dry ice may be loaded within sections 32'-32''' after connection by dowels, and the sleeve 46 may be heated with a torch or other suitable mechanism. Next, the stator 32 may be hoisted in the air by a lifting mechanism such as a crane, and lowered into the sleeve 46. Upon returning to room temperature, the parts contract and expand and grip one another. At room temperature it may be impossible to physically separate the stator 32 and sleeve 46.

Referring to FIG. 3, rotor contacting surfaces 188 of the stator 32, and stator contacting surfaces 190 of the rotor 36, may comprise rigid material, such as metal. Rigid includes non-elastomeric materials, and materials that do not flex when in use at downhole temperatures. Sealing may be achieved by carefully machining the surfaces 188 and 190 to achieve a sufficiently narrow clearance/negative interference fit to form an efficient pumping seal without seizing the unit. In some cases one or more of surfaces 188 and 190 are treated or coated to protect and increase the longevity of the tool 10. The coating may be a bearing material with a coefficient of kinetic friction that is less than or equal to 0.2 in relation to steel. The bearing material may have a coefficient of kinetic friction that is less than 0.1, in relation to steel. Other bearing materials with higher coefficients of friction may be used. The bearing material may comprise a non-metal. The bearing material may comprise one or both nylon or ultra-high-molecular-weight polyethylene. The coating on one or more surfaces 188 and 190 may be applied to a thickness that will not change the rigid characteristics of each surface, so that the surfaces 188 and 190 still act as a metal on metal seal. An appropriate thickness, for example a thin coating with a diameter of 1/100 thousandth of an inch may be used, although thicknesses greater or smaller may be used. The coating may be applied by spraying on one or more surfaces 188 and 190. The coating may be cured in an oven to set. The coating may reduce or prevent corrosion, for example if an anti-corrosion agent is used. In some cases, anti-corrosion paint, such as a polytetrafluoroethylene-based paint, may be applied either alone or in combination with the coating. The coating may act as lubrication during operation of stator 32 and rotor 36. In some cases, surface 188 and/or surface 190 comprise an elastomeric material, such as rubber.

Referring to FIGS. 2A-B, during use, fluid, such as drilling fluid, may be pumped from an uphole end 42 through the motor 15 to and out the downhole end 40. Motor 15 may comprise a fluid inlet 150 connected to the interior passageway 160. Fluid may pass through interior passageway 160, which in some cases extends from uphole end 42 through the uphole facing end 36A of rotor 36 to the fluid inlet 150. Fluid inlet 150 may provide an access point for fluid to travel to the helical lobes 33 and 41 of the motor 15. Fluid inlet 150 may comprise a plurality of diverter ports 151. Diverter ports 151 may be angularly spaced from one another about a reamer tool axis 153. Diverter ports 151 may be oriented to have decreasing distance from downhole end 42 when moving from an entry 151' to an exit 151" of each of the plurality of diverter ports 151. Interior passageway 160 may comprise a motor bypass 148 that diverts a portion of the fluid from traveling to fluid inlet 150 and onto the power section 177. Motor bypass 148 may be defined by rotor 36. In some cases motor bypass 148 is coaxial with the tubular body 12. Fluid may exit from the power section 17 via a fluid outlet 15 of the motor 15. Fluid outlet 157 may direct fluid flow from the space between the stator 32 and rotor 36 to the interior passageway 160. Fluid outlet 157 may comprise a plurality of diverter ports 159, that are angularly spaced from one another about axis 153, in which ports 159 are oriented to have increasing distance from downhole end 42 when moving from an entry 159' to an exit 159" of each of the plurality of diverter ports 159.

Referring to FIGS. 2A-B and 3, reamer part 14 may mount to the tubular body 12 via suitable bearings, such as bearing pack 149, roller or slide bearings. Rotor 36 may comprise bearing packs 149 that rotatably couple the rotor 36 to the stator 32. Bearing packs 149 may be replaced with any coupling structure that allows for rotational coupling, including but not limited to: ball bearings, roller bearings, ball thrust bearings, roller thrust bearings, tapered roller bearings, magnetic bearings, linear bearings, anti-friction bearings, rotary bearings, telescopic bearings, rotary unions, and the like and combinations thereof tool 10 may be completely sealed from wellbore fluids and pressure, such that fluid does not exit the exterior of the tool 10, but instead is restricted to flow-through. Bearing pack 149 may comprise sealing ring 22A that seals between the rotor and the stator. Sealing ring 22A may provide a dynamic seal, which is a seal that maintains a seal during rotation of stator 32 and reamer housing sleeve 26. During rotation, pack 149 may be exposed to circulated fluid within the interior passageway 160. Circulated fluid may be used to cool the bearings by the sealing mechanism. Sealing ring may define teeth or fins 21 that interlock with opposing, complimentary teeth 19 defined by an end cap 18A. End cap 18A and seal ring 22A may rotate with the stator 32. A corresponding bearing pack 149 may be located on either end of the motor 15. Pack 149 may comprise outer load collar 20A and inner load collar 24A that distribute the load from a tubing string, such as a casing string or drill string, to the rotor 36. Pack 149 may be a plurality of bearing assemblies that secure axial ends of rotor 36 to the uphole end 42 and downhole end 40 of the tubular body 12. The plurality of bearing assemblies may have matching parts, such as end caps 18A, 18B, seal rings 22A, 22B, outer load collars 20A, 20B, inner load collars 24A, 24B and others. Other mechanisms of securing rotor 36 to uphole end 42 and downhole end 40 may be used, such as an induced fit between complimentary features, adhesive, such as LOCTITE™, and others.

Referring to FIG. 3, reamer part 14 may be mounted or formed on an external part of stator 32. Reamer part 14 may comprise a sleeve, such as a sleeve formed by reamer housing sleeve 26. Reamer housing sleeve 26 may be mounted coaxial with the tubular body 12. Reamer part 14 and reamer housing sleeve 26 may be secured to rotate with stator 32 during operation of PC motor 15.

Referring to FIG. 1, reamer tool 10 may be configured for use in an oilfield application, for example as a drilling enhancement or for drilling applications. Reamer tool 10 may be used in drilling through unstable ground conditions. In the process of drilling, reamer tool 10 may be carried down casing pipe to the hole to protect the wall to achieve drilling work. Reamer part 14 may comprise one or more of reamer blades 28 and polycrystalline diamond cutters 30. Reamer tool 10 may include a rotor and a stator rotatably coupled to each other (e.g. by operation of the illustrated pair of bearing packs disposed between the rotor and stator near opposite ends of tool 10), wherein the stator envelopes the rotor. As used herein, neither "rotor" nor "stator" implies rotational movement or fixed positioning.

Tool 10 may be coupled to a drill string used to drill earth/rock, such as but not limited to for drilling oil wells. Tool 10 may couple between sections of a tubing string, such as a casing or drilling string, such that fluid that is pumped through the string goes through tool 10 as well. The rotor 36 may be fixedly coupled to coupling subs 38, 16 at each ends 40, 42, respectively to allow the tool 10 to couple to the tubing string between segments of such. The tubing string, including tool 10, may be positioned downhole in a well and fluid may be pumped through the tubing string to rotate the reamer part 14. The drilling string may comprise a fluid-actuated drilling motor 15 and a drill bit (not pictured), both located in a downhole direction relative to the tool 10. Pumping fluid through the tubing string may cause motor 15 to rotate the drill bit relative to tool 10. While pumping fluid, the tubing string may remain angularly stationary to rotate the reamer part. Toole 10 may be used in a casing application as well.

The fluid may be diverted from the core of the drill string to a region between the rotor 36 and stator 32 of tool 10. In such a region, the fluid causes the rotor 36 and stator 32 to rotate relative to each other (generally only one will rotate and the other stays in fixed angular relation to the rest of the string). The rotor 36 and stator 32 are attached to the string in such a way as to cause the rotational force created by the pumped drilling fluid to be applied only to the stator 32, thereby causing it to rotate. The stator housing sections 32'-32''' may comprise a bladed profile that may be beveled unto the base pipe OD to ensure that the leading edge is less aggressive and the ensuing cutting action and torque generated is gradual. This profile is both upward directional and downward directional since it is designed to be used to ream both downwards and upwards (forwards and backwards, for horizontal drilling/reaming).

Tool 10 may be used for horizontal drilling, as the friction between the drill string and the bottom arc of the drill hole (where the drill string rests because of gravity) may be a tremendous friction force to overcome. This may make the horizontal well more difficult to drill, especially when the hole shifts, swells, cracks, fills-in, etc. Rotating the reamer tool 10 without having to rotate the whole drill string may improve the efficiency and utility of tool 10 in horizontal wells.

The illustrated tools 10 may be suited for rigs with sufficient hydraulic power to drill but where torque limitations on either surface equipment or string components or both, limit string rotation to combat hole problems. Example hole problems include tight spots, swelling shales and/or wellbore collapse, where traditionally, the solution would have required backreaming. The illustrated tools 10 may allow the drilling team to ream regions having such problems without requiring. The reamer tools 10 disclosed here may be used to ream a hole as it is being drilled.

The STAR Stabilized accentuated reamer tool 10 may actuate with circulation. When fluid is circulated up to the threshold flow rate, the external sleeve starts to rotate clockwise looking downwards. Such rotation is irrespective of the rotation of the drill string. The stabilized accentuated reamer is self torque-generating due to the associated hydraulic power section that generates both torque and rotation. This family of tools may enable a drilling team to ream in and out of hole without string rotation making it a suitable reaming solution for tight spots, hole pack-offs, swelling shales, and all manner of wellbore instability related issues. Due to its unique internal power generation this tool may contribute lesser torque to the string in drilling mode that regular reamers or stabilizers.

String rotation may be used to increase the available torque at the stabilized accentuated reamer for rock destruction and deformation. Due to its offset dynamics and harmonics (i.e. vibration during operation) tool 10 is expected to reduce stick slip or drill string vibrations. The stabilized accentuated reamer may be bored in the centre (i.e. include a narrowed core between the two diversion channels that allows fluid to pass either through the core or the diversion channels) to ensure better signal transfer for telemetry systems that require to communicate using the internal fluid medium in the drill string.

Tool 10 may act as a conventional stabilizer as well as a reamer. According to one embodiment of the invention, there is a tool 10 stabilizer with reaming functions for drilling applications. The reaming stabilizer may be hydraulically powered without a need for the string to rotate. The stabilizer allows a user to ream out the hole as the user goes down. In addition, if the casing or drilling string gets stuck, the user may activate the stabilizer to back up and ream along the way up. The stabilizer may be cheaper, doesn't lose the drill string, faster, more convenient, is easier to use, and less likely to get stuck. According to one embodiment of the invention, there is a tool 10 stabilizing accentuated reamer including a sealed motor section (i.e. no fluid going in or out of the string), a reaming stabilizer having an outer surface with multiple bearing packs, a flow diversion channel, a lobe (allows for the rotation), a stator with one more lobe than the rotor (stator is the outside component and the rotor is the internal component, even though the rotor would typically be the one that moves and in this case the rotor does not move at all), and a narrowed central bore.

According to one embodiment of the invention, there is a tool 10 stabilizing accentuated reamer that fits between sections of the drilling string and attaches to them the same way the drilling string sections attached to each other. The rotor attaches to the string adapters. The stator may be coupled to the rotor via sealed bearing packs and is disposed around the rotor. The flow diversion channels do not block flow of the fluid through the center but instead allow for flow to also go between the stator and rotor and thereby interact to cause rotation of the stator. The exterior surface of the stator has stabilizing geometry and reaming geometry so that it simultaneously performs both functions. According to one embodiment of the invention, there is a tool 10 stabilizing accentuated reamer including a sealed motor section (i.e. no fluid going in or out of the string) (may have sealable ports), a reaming stabilizer including an outer surface (e.g. hard facing, tungsten carbide inserts, any cutting surface, laser cladding, diamond impregnated, etc.), a plurality of multiple bearing packs (e.g. 2, 3, 4, 5, 6+, sealed, upward and downward acting bearings, ball bearings, radial bearings, friction, etc.), a plurality of flow diversion channels (e.g. multiple, center bore is there to allow for telemetry signals, center bore is narrowed), a plurality of lobes that allow for the rotation (e.g. wherein the external array of lobes has one more lobe than the internal), and a stator with one more lobes than the rotor.

In operation, the drill team assembles the drill string as drilling occurs, and in doing so includes the tool 10 between two segments of the drill string. The tool 10 reams the hole as it is drilled and the drill string may be pushed/pulled as desired to engage the drill bit and the tool 10 in positions as needed and as appropriate. Telemetry signals may be transmitted through the drilling fluid through the drill string and may pass through the tool 10 without interference from the tool 10.

The Hydra

Figure 4:
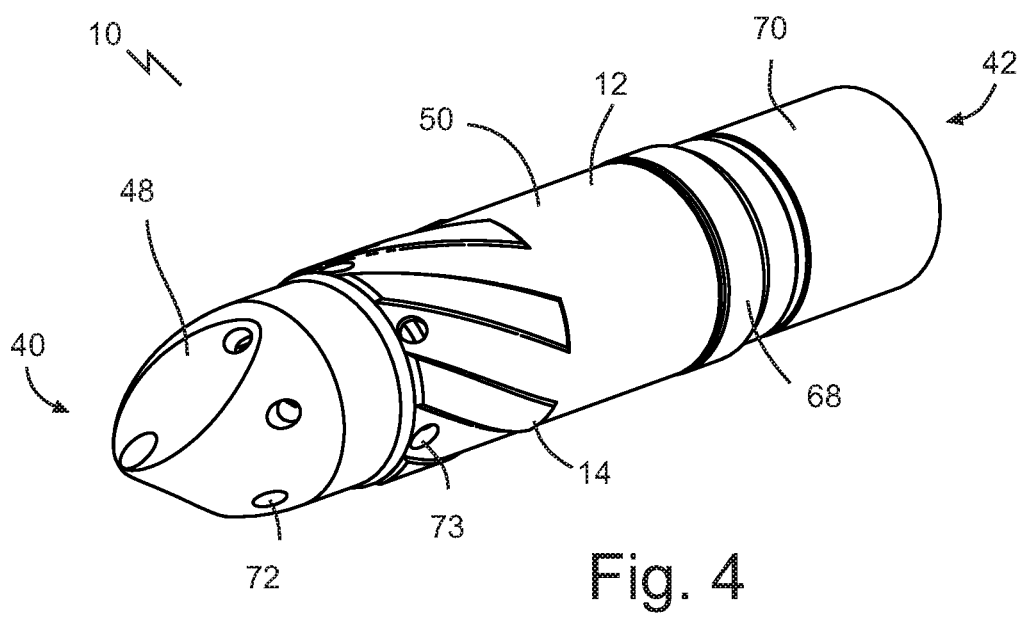
FIG. 4 is a perspective view of a casing reamer shoe with an impeller-powered reamer.
Figures 5A, 5B:
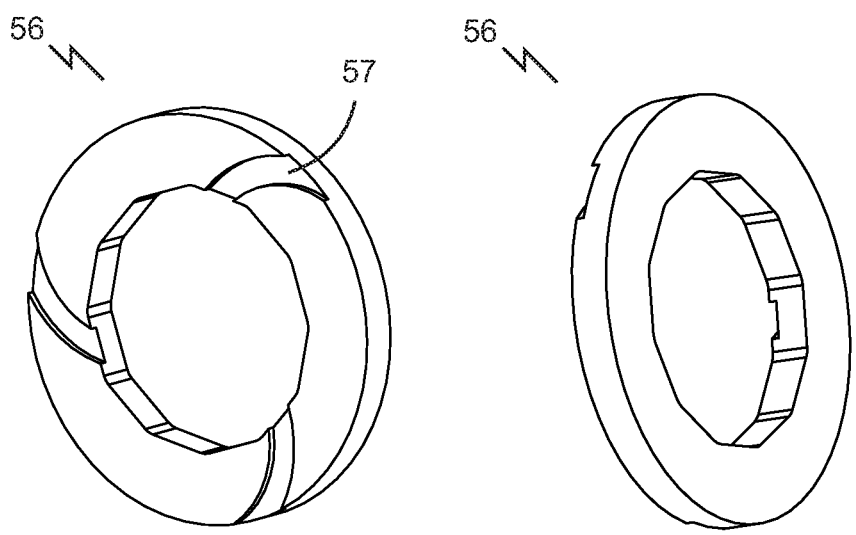
FIGS. 5A and 5B are front and rear perspective views, respectively, of a discharge ring plate of the casing reamer shoe of FIG. 4.
Figure 6:
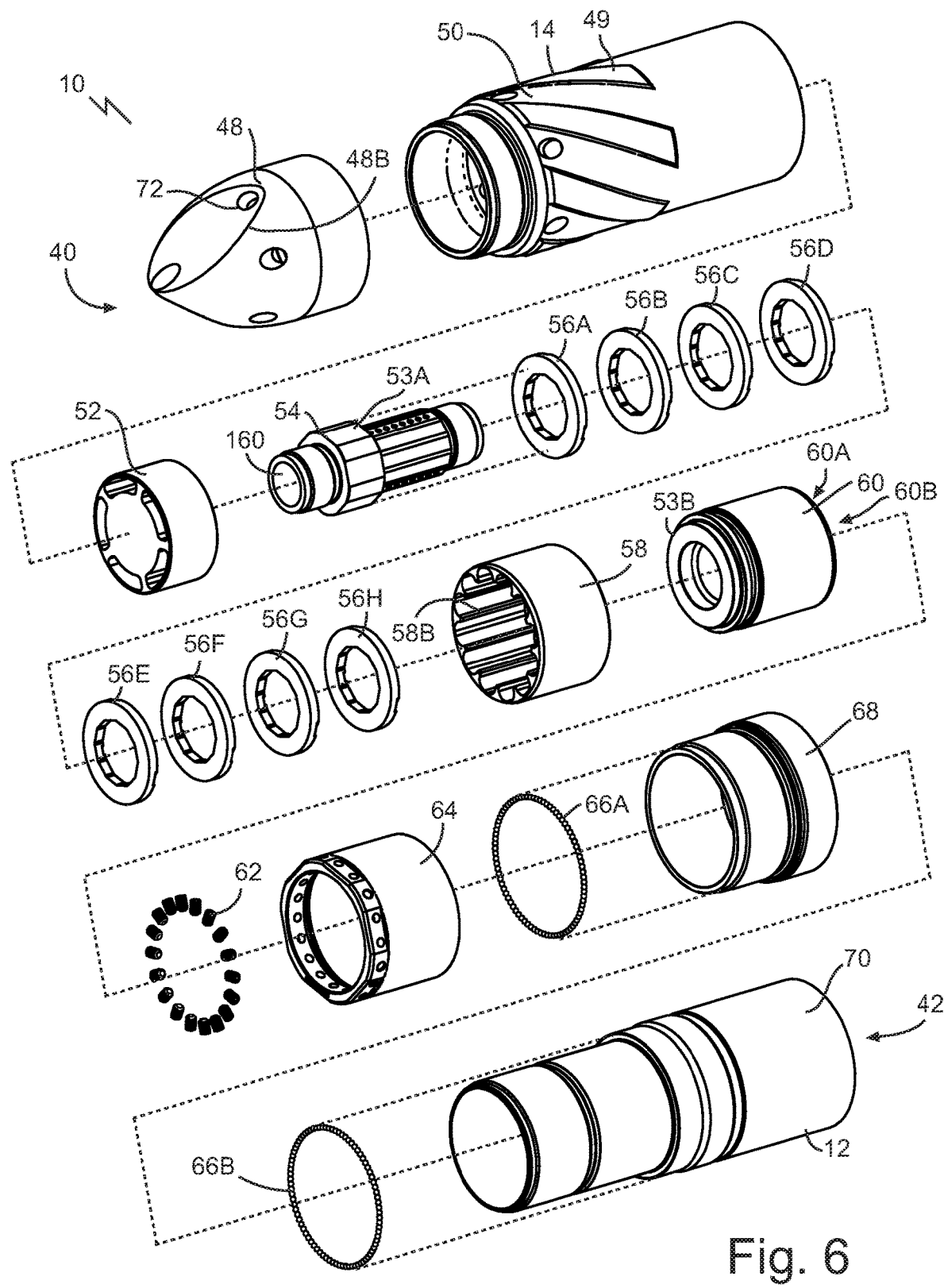
FIG. 6 is an exploded perspective view of the casing reamer shoe of FIG. 4.
Figure 7:
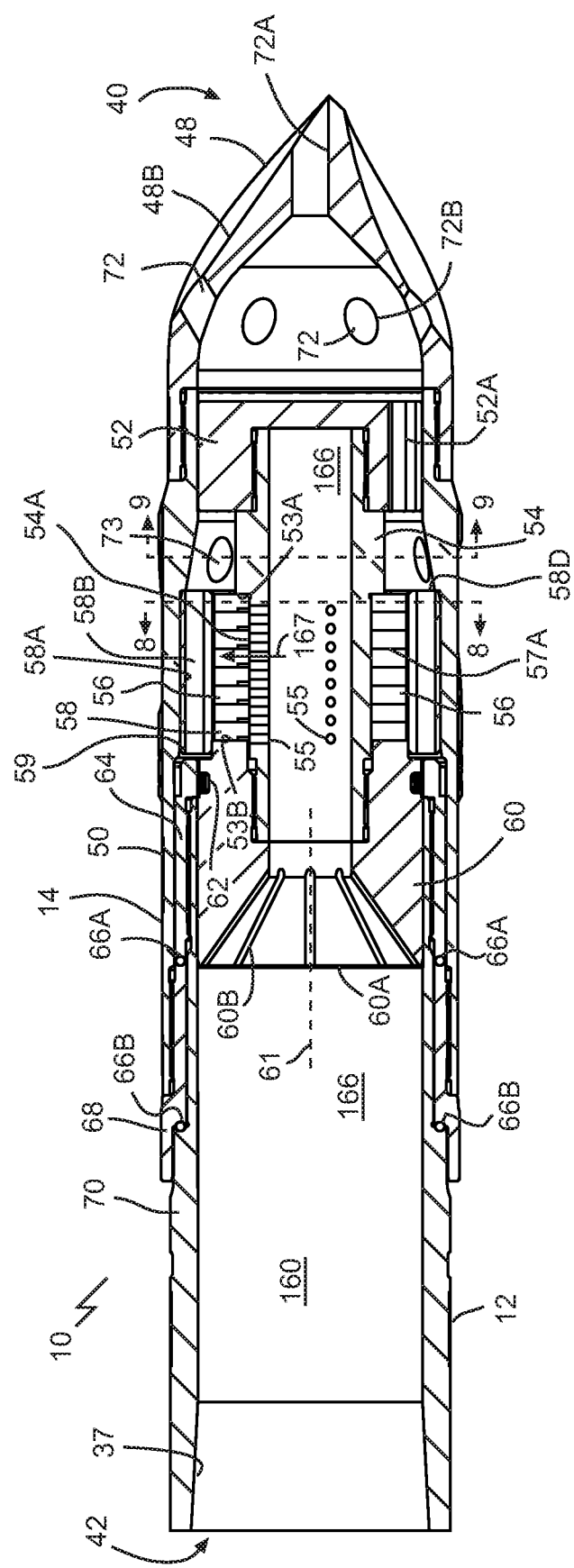
FIG. 7 is a cross-section view of the casing reamer shoe of FIG. 4.

Referring to FIGS. 4 and 7, a downhole reamer tool 10 is illustrated having a tubular body 12, a reamer part 14, and an impeller 58. The reamer part 14 may be mounted to rotate relative to the body 12. The impeller 58 may be mounted within the tubular body 12 and connected to rotate the reamer part 14. Referring to FIGS. 6 and 7, the interior passageway 160 may have a plurality of radial passageways, such as apertures 55, that direct fluid through the interior passageway 160 in a radial direction 167 (FIG. 7) against the impeller 58 to drive the impeller 58 and rotate the reamer part 14.

Figure 8:
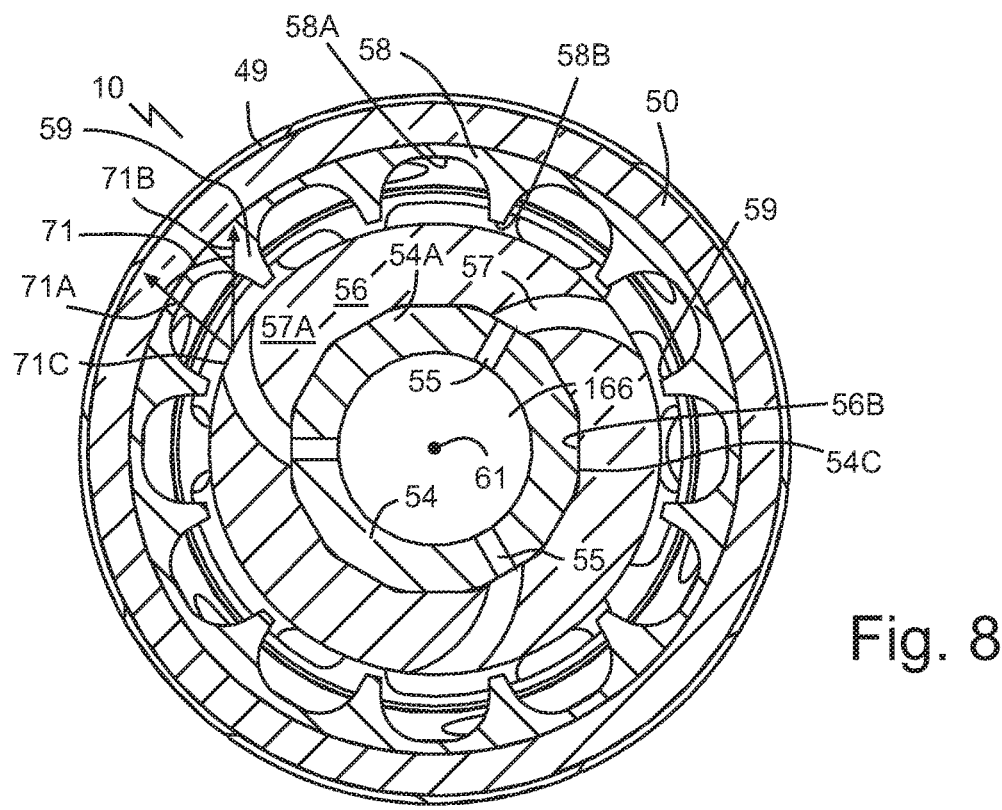
FIG. 8 is a section view taken along the 8-8 section lines of FIG. 7.

Referring to FIGS. 6-8, the impeller 58 may take a suitable shape. Referring to FIGS. 7-8, a radially-inward facing surface 58A of a sleeve 59 of the impeller 58 may comprise a circumferential array of fins 58B. The sleeve 59 may mount the impeller 58 to the tubular body 12. The circumferential array of fins 58B may be oriented parallel with an axis 61 of the downhole reamer tool 10. Other orientations may be used, including orientations where fins 58B form a helix that wraps at least partially around surface 58A. In the example shown, with fins 58B parallel to axis 61, fluid flow expelled in radial directions against fins 58B imparts a circumferential torque upon fins 58B, causing fins 58B to spin.

Referring to FIGS. 7-8, the radial passageways to impeller 58 may be formed by slots 57 in plates 56. The plurality of radial passageways may be at least partially defined by slots 57 in respective axial faces 57A of each of a plurality of ring plates 56 that are stacked axially one on the other. In the example shown, slots 57 are formed on one axial face 57A per plate 56, although in other cases slots 57 may be formed on opposing faces 57A. Each slot may have a suitable shape, for example slots 57 may be curved or angled to eject fluid along an ejection path 71B at a nonzero angle 71 relative to a radius 71A, which is defined by the respective ring plate 56 and passes through a fluid exit end 71C of the slot 57. In the example shown, the orientation, size, and number of slots 57 in each plate 56 is selected to balance fluid momentum and ejection direction, to minimize vibration inducement by operation of impeller 58. In the example shown, all slots 57 are identical to provide symmetry and to maximize torque imparted upon impeller 58. Each slot 57 may align to receive fluid flow from a respective aperture 55 from an inner mandrel collar 54. The use of a plurality of plates 56 with slots 57 stacked one on the other creates a structural that acts as a single unit but without the demands of machining same if such were machined from a single block of material. Each plate 56 may be individually machined or otherwise fabricated with complex slots that may be impossible to form within a solid block.

Referring to FIGS. 7 and 8, the plates 56 may be mounted in a suitable fashion within the tool 10. In the example shown the plurality of ring plates 56 are stacked around a cylindrical wall 54A of and coaxial with a collar 54. The plurality of radial passageways, including apertures 55, may be defined from a central bore 166 of the collar 54 through the cylindrical wall 54A of the collar 54. Referring to FIG. 8, the cylindrical wall 54A may have an out-of-round circumferential profile, such as a polygonal profile 54C, that meshes with a corresponding inner circumferential profile, such as a polygonal profile 56B, of the plurality of ring plates 56. Matching torque transfer profiles permit the parts to rotate together, and facilitate drill out.

Referring to FIGS. 6 and 7, the plates 56 may mount on the collar 54 via a suitable mechanism. For example, a pair of flanges, 53A and 53B, secured to or formed by the collar 54, may compress the plurality of ring plates 56 on the collar 54. In the example shown, flange 53A is formed as part of collar 54, while flange 54B is part of a static mandrel 60 that is threaded or press fit to an uphole end of collar 54. The flange 54B effectively forms an uphole flange of the pair of flanges 53A, 53B, and connects to the tubular body 12, in this case indirectly via mandrel 60.

Figure 9:
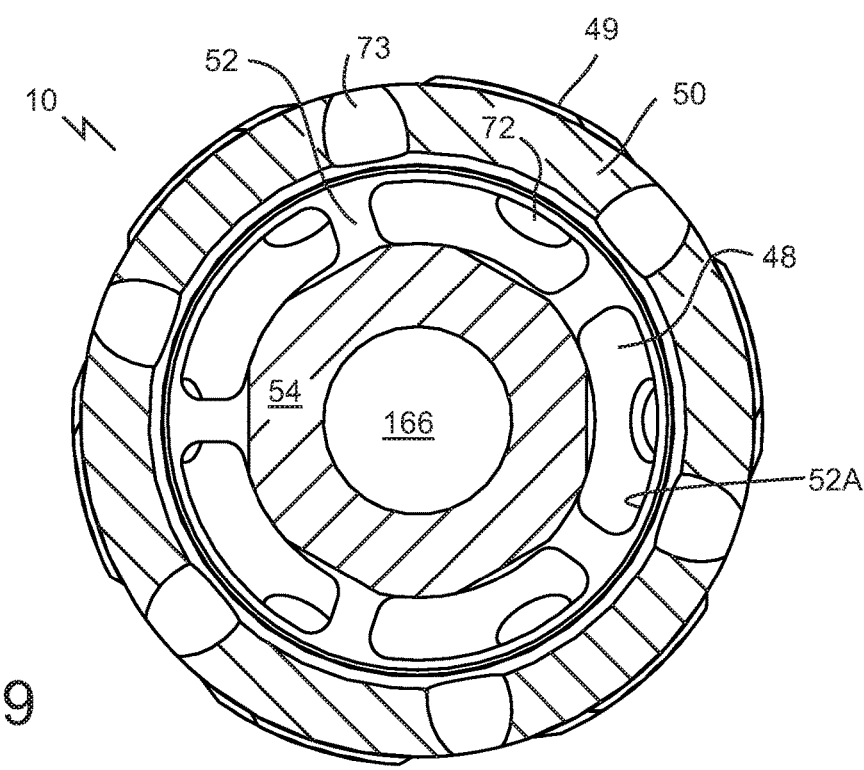
FIG. 9 is a section view taken along the 9-9 section lines of FIG. 7.
Figure 13:
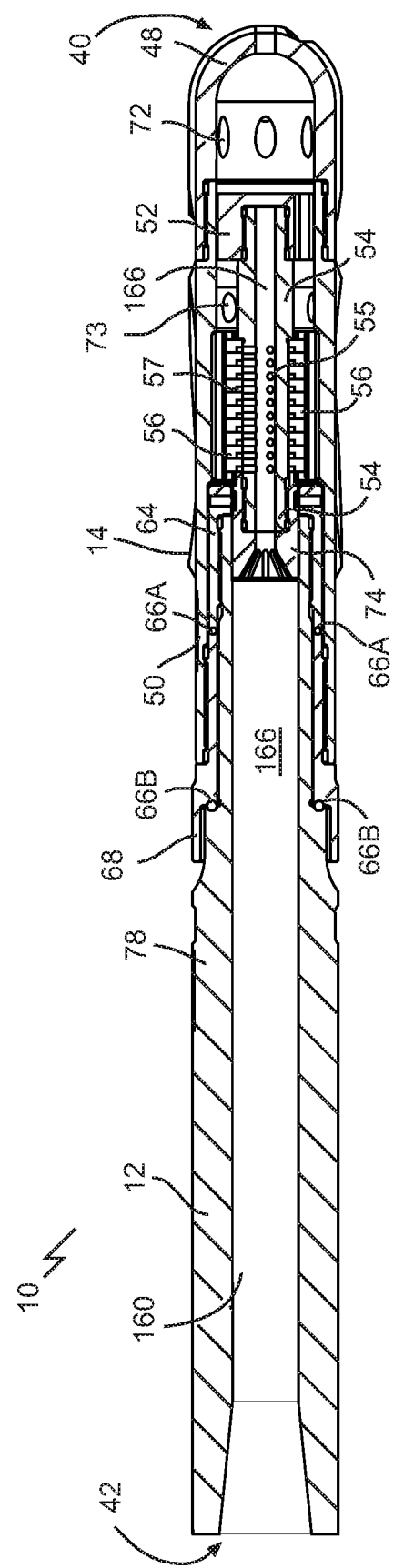
FIG. 13 is a cross-section view of the casing reamer shoe of FIG. 10.
Figure 14:
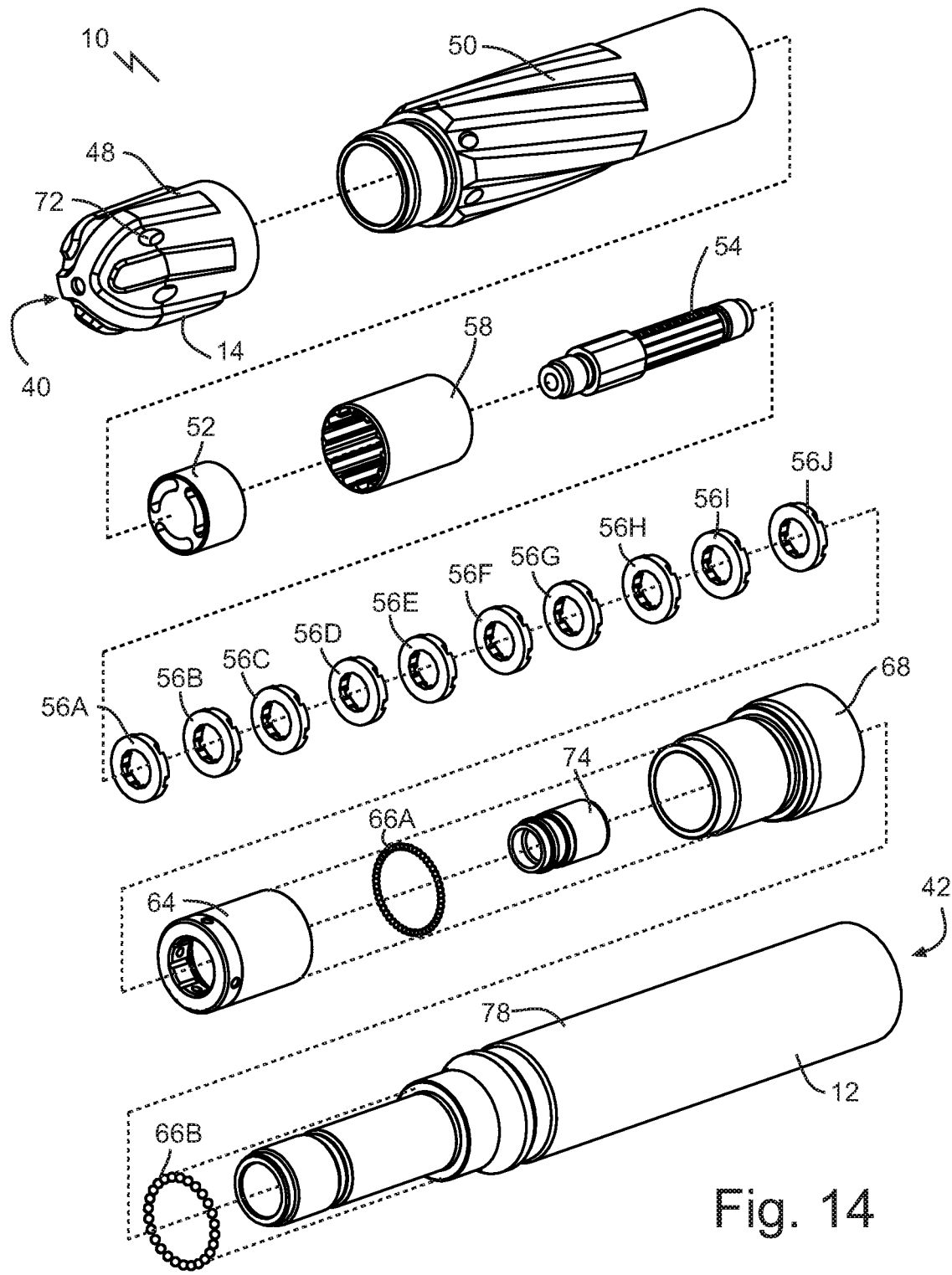
FIG. 14 is an exploded perspective view of the casing reamer shoe of FIG. 10.

Referring to FIGS. 6, 7, and 9, the reamer tool 10 may form a casing shoe reamer, with a nose 48. The nose 48 may be structured as one or both a drill bit or a reamer. In the example shown, the nose 48 functions in a drill bit capacity. For example, the lipstick-style nose 48 defines one or more blades or bladed edges 48B that are positioned to act upon debris directly axially in the path of the nose 48 to pulverize and clear same out of the path of the tool 10. In other cases a reaming blade or other device may by mounted to a peripheral part of nose 48.

Referring to FIGS. 6 and 7, drilling and cleaning action may also be achieved using outlet ports 72 in the nose 48. Interior passageway 160 may connect from the impeller 58 to the outlet ports 72, to produce fluid jets during use that act to remove, pulverize, and wash out debris in the wellbore. Referring to FIG. 7, the outlet ports 72 may include outlet ports directed in one or both of axial direction, in the case of port 72A, and radial directions, in the case of port 72B.

Referring to FIGS. 6 and 7, the impeller 58 may be connected to rotate the nose 48, for example if nose 48 is threaded or press fitted to radial bearing 52, which threads or is press fit to reamer housing 50, which is mounted to rotate with impeller 58 relative to tubular body 12, in this case top sub 70. Top sub 70 may define an uphole tubing connector 37, and may mount via bearings 66A and 66B to a dynamic sleeve 68, which threads or is press fit to reamer housing 50. The top sub 70 may thread or press fit to a static sleeve 64, which connects via radial set screws 62 to static mandrel 60. In some cases, instead of or in addition to set screws 62, one or more locking split rings may be used within grooves that align during make up between sleeves 64 and 60. In one case during assembly the sleeve 60 is press fit into sub 70, sleeves 68 and 64 are then connected to sub 70, and as sleeve 64 is connected to sub 70, sleeve 64 positions the split ring or rings within the aligned grooves to mate sleeves 60 and 64. An uphole facing surface of the tool 10, for example surface 60A of static mandrel 60, may be striated, with striations 60B, or may be otherwise contoured to improve drillability. Reaming part 14 may be mounted to reamer housing 50.

Referring to FIG. 7, in use, the tool 10, which may be a casing shoe reamer as shown, may connect to a downhole end of a casing string. Fluid may pass down the casing string bore, and into passageway 160, passing into central bore 166 of collar 54, where the fluid is then diverted radially outward through apertures 55. From apertures 55, the fluid passes into slots 57, and is channeled radially outward to strike against fins 58B of impeller 58, causing impeller 58 to rotate. The rotation of the impeller 58 causes housing 50, reamer part 14, and nose 48 to rotate. Referring to FIGS. 7 and 9, fluid that exits a downhole end 58D of impeller 58 passes radially outward via outlet ports 73 into the wellbore, and radially inward into nose 48 via axial ports 52A in radial bearing 52. Fluid entering the hollow nose 48 is then ejected outward into the wellbore via ports 72. Fluid ejected out into the wellbore acts to pulverize and entrain debris, creating a swirling vortex along with the rotation of the nose 48 and reamer part 14, to lift debris up off the well bottom and carry same to surface. The reaming action of the reamer part 14 acts to smooth and enlarge the wellbore, preparing same for installation of the casing string. An impeller may permit the tool 10 to achieve high rpm in a relatively axially short span of space.

Figure 29:
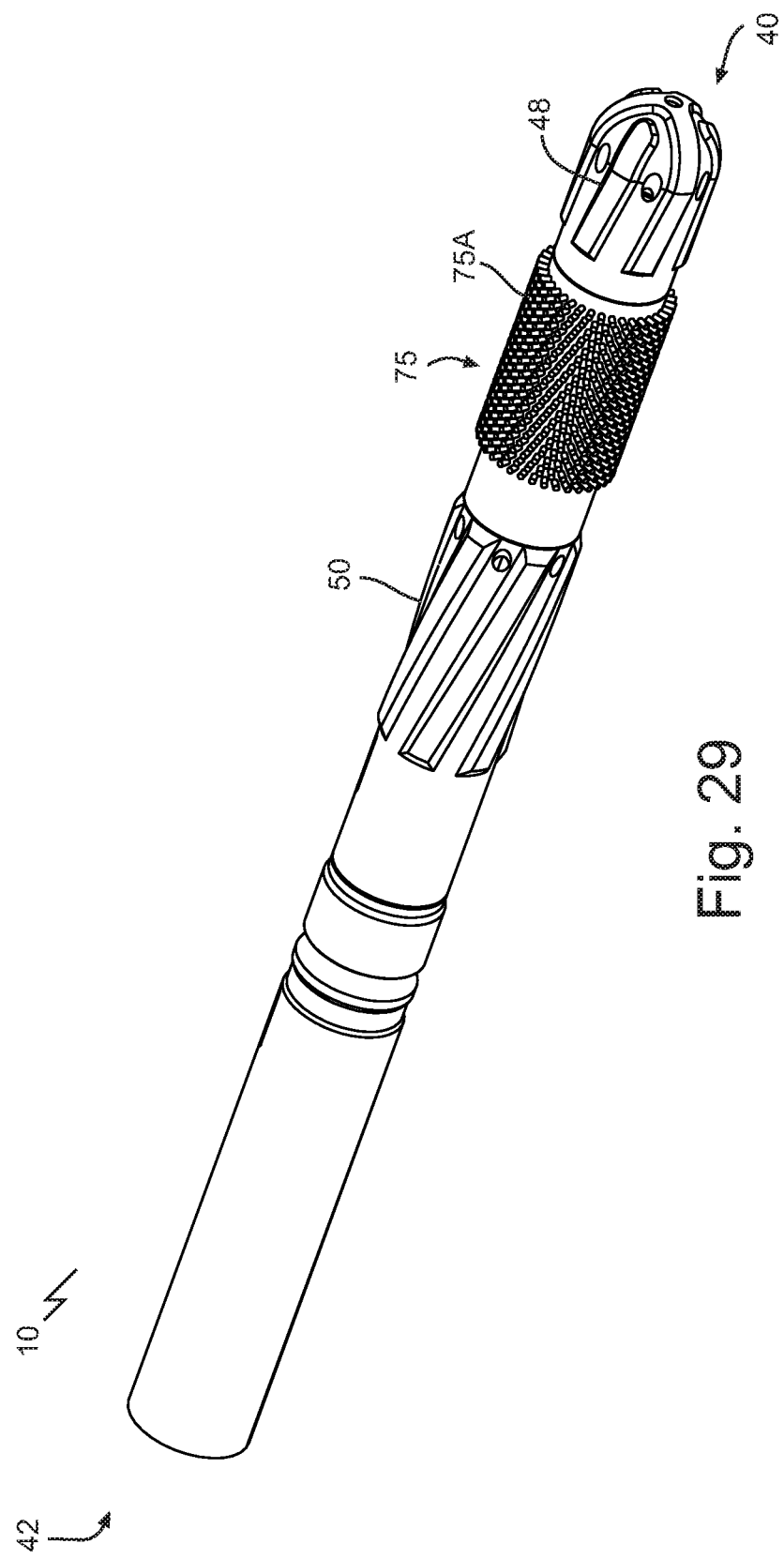
FIG. 29 is a perspective view of a further embodiment of a casing reamer shoe with an impeller-powered reamer and a casing scraper wire brush.

Referring to FIGS. 10-13 and 29, 30A, and 30B, two other embodiments of impeller-powered reamer tools 10 are illustrated. Referring to FIG. 10, the tool 10 illustrated has many of the same features as tool 10 from FIG. 4. However, the nose 48 is configured to act as a reamer, with reamer blades 47. In addition, the reamer part 14 comprises relatively long, straight blades 49. Referring to FIG. 12, each plate 56 has six slots 57 instead of the three slots 57 found on the plates 56 of the embodiment of FIG. 4. Referring to FIGS. 29, 30A, and 30B, the embodiment of FIG. 10 is illustrated with the addition of a wire brush scraper sub 75 between the nose 48 and the reamer housing 50. The scraper sub 75 acts as a casing scraper to polish the wellbore, and may include a plurality of brushes 75A on an external surface of the sub 75.

The Hydra Hybrid

Referring to FIG. 15, a further embodiment of a downhole reamer tool 10 is illustrated. The tool 10 has the ability to rotate the reamer part 14 and the nose 48 at different speed relative to the tubular body 12. Referring to FIGS. 16A-C and 17, the tool 10 also comprises a progressive cavity power section 15 connected to rotate the nose 48, the reamer part 14, or both. In the example shown the motor 15 is connected to rotate the nose 48 independent of the rotation of the reamer part 14 by the impeller 58.

Referring to FIGS. 16A-C, reamer part 14 and nose 48 may be mounted to rotate at different speeds relative to the tubular body 12, in this case top sub 98 and stator 32. The reamer part 14 may be mounted to rotate relative to the tubular body 12 at a first speed under fluid flow in the interior passageway 160. The nose 48 may be mounted to rotate relative to the tubular body 12 at a second speed under fluid flow in the interior passageway 160. The first speed may be different, for example faster, than the second speed. The example shown provides relatively higher torque and rpm than the embodiments of FIGS. 4 and 10.

Referring to FIGS. 16A-C and 17, the tool 10 may incorporate plural motors to plural parts. For example, a first motor, such as PC motor 15, may be connected to rotate the nose 48 relative to the tubular body 12. Also, a second motor, such as impeller 58, may be connected to rotate the reamer part 14 relative to the tubular body 12. The PC motor 15 may comprise a stator 32 and a rotor 36. The stator 32 may be connected to the tubular body 12, for example rotationally fixed to the tubular body 12 as shown. The rotor 36 may be connected to rotate the nose 48. In other cases the stator 32 may rotate the reamer part 14 and the rotor 36 may be rotationally fixed to body 12. In some cases the PC motor 15 is connected to rotate the reamer part 14, while the impeller 58 is connected to rotate the nose 48. The nose 48 may comprise one or more of blades 47 and polycrystalline diamond cutters (not shown).

Referring to FIGS. 16A-C and 17, the tool 10 may have various parts. A top sub 98 may define an uphole tubing connector 37 at uphole end 42. The top sub 98 may be threaded or press fitted to the stator 32, which may be made of plural or a single stator sections (a single piece is illustrated). The stator 32 is threaded or press fitted to a drive housing 96, which houses a drive shaft 94, which transfers torque from rotor 36 to a mandrel such as a drive adapter 92. Drive housing 96 may thread or press fit to a drive adapter sub 90, which mounts the drive adapter 92 via bearings 66B and 66C, and threads or is press fit to static sleeve 86. Bearings 66D and 66B mount dynamic sleeve 88, which connects via threading or press fit to reamer housing 50.

Referring to FIGS. 16A, 16B and 17, rotor contacting surfaces 188 of the stator 32, and stator contacting surfaces 190 of the rotor 36, may comprise rigid material, such as metal. In some cases one or more of surfaces 188 and 190 may be treated or coated. An example treating method includes laser treatment. The coating may be a bearing material with a coefficient of kinetic friction that is less than or equal to 0.2 in relation to steel. The bearing material may have a coefficient of kinetic friction that is less than 0.1, in relation to steel. The bearing material may comprise a non-metal. The bearing material may comprise one or both nylon or ultra-high-molecular-weight polyethylene. In other cases, surface 188 and/or surface 190 comprise an elastomeric material, such as rubber.

In use, when the casing string is downhole in a well, fluid is pumped through the casing string into an uphole portion 160A of the interior passageway 160. Fluid enters a fluid inlet 161 at an uphole end of the motor 15, travelling in a downhole direction through the motor 15 while imparting torque upon the rotor 36. The rotation of rotor 36 causes the nose 48 to rotate. Fluid travels around drive shaft 94, and passes via radially inward ports 95 into central bore 160B in drive adapter 92. Fluid then travels through bore 166 in collar 54, passing through apertures 55 and slots 57 to strike and rotate the impeller 58, causing reamer part 14 to rotate for reaming action. Fluid then travels into the wellbore via exit ports 73 in reamer housing 50, and while some fluid passes radially inward into nose 48 via ports 160C, Once in the rotating nose 48, fluid may exit via a variety of fluid outlet ports 72, jetting out at various angles to assist in drilling, reaming, and debris clean out to surface.

MRS—Motorized Reamer Shoe

Referring to FIGS. 18-27, several embodiments of a reamer tool 10 are illustrated, with reamer parts 14 powered by a PC motor 15. Referring to FIGS. 19A and 24, embodiments are shown where the stator 32 rotates relative to a stationary rotor 36, thereby rotating the reamer part 14. Referring to FIGS. 19A, 22A, and 24, all embodiments incorporate a universal joint to convert eccentric rotor 36 motion into concentric motion to reduce vibration and increase tool 10 effectiveness. Referring to FIGS. 19A and 22A, embodiments are shown with a hollow helically lobed sleeve rotor 36. Tools 10 may be used in suitable applications, such as deep water or deep well applications, as well as conventional wells.

Figure 20:
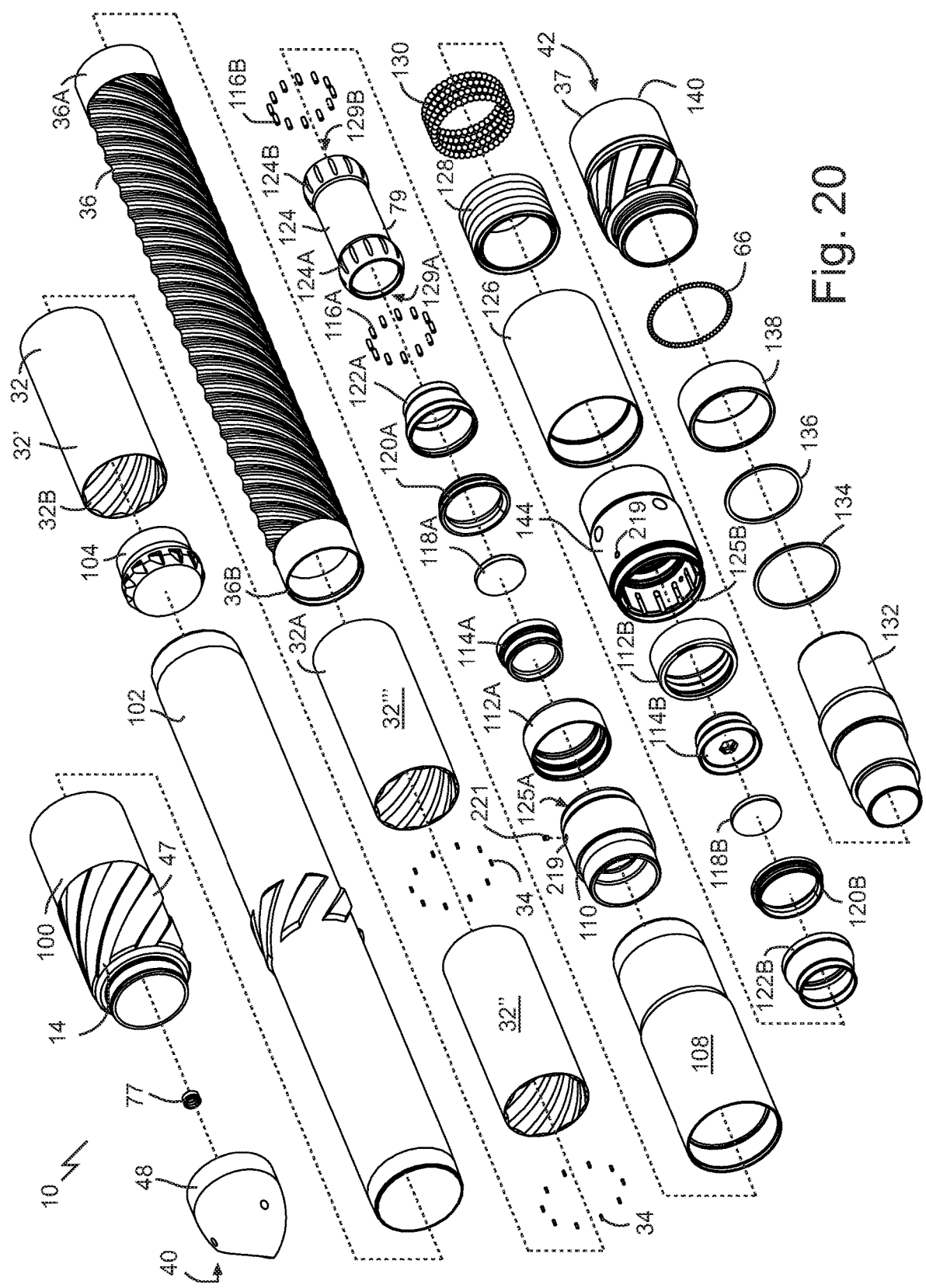
FIG. 20 is an exploded perspective view of the casing reamer shoe of FIG. 18.

Referring to FIGS. 19A-19B, and 20 an embodiment is shown where the stator 32 rotates relative to the rotor 36. The stator 32 may be mounted to rotate relative to the rotor 36 upon application of fluid flow between the rotor 36 and the stator 32. The reamer part 14 may be mounted to be rotated by the stator 32. The rotor 36 may be connected, for example rotationally fixed to the tubular body 12, for example by press fit or an uphole end 36A of rotor 36 threading to a rotor adapter 110, which mates with a drive shaft 124, which mates with a drive adapter 144, which threads or press fits to a bearing shaft 132, which threads or press fits to a casing adapter/top sub 140. A downhole end 36B of the rotor 36 may form a free cantilevered end. The stator 32 may be mounted to rotate relative to top sub 140, which defines an uphole tubing connector 37, by an uphole end 32A of stator 32 threading or press fitting to a stator adapter 108, which threads or press fits to an end cap 128, which mounts upon bearing shaft 132 via bearings 66 and 130. A downhole end 32B of stator 32 threads or press fits to reamer housing 50, which mounts reamer part 14 and reamer blades 47.

Referring to FIGS. 19A-B, the tool 10 may form a casing reamer shoe. A nose 48 may form a downhole end 40 of the casing reamer shoe, and the stator 32 may be connected to rotate the nose 48. In use the tubing or casing string may be positioned downhole in a well. Fluid may be pumped through the casing string to operate the progressive cavity power section 15, in which pumping fluid causes the stator 32 and reamer parts 14A and 14B to rotate relative to the string and the rotor 36. In use, fluid enters a portion 160A of the interior passageway 160 via connector 37, is redirected through the PC motor 15, where the stator 32 is actuated to rotate, and the fluid exits the downhole end 32B of the PC motor 15 into a central bore 160B of the reamer housing 50, where the fluid then exits the reamer tool 10 via one or outlet ports 72 within the nose 48, for example ports 72A pointed in an axial direction, and ports 72B pointed in a radial direction. One or more outlet ports 72 may comprise a nozzle 77 fitted and rated to create a fluid jet of controlled characteristics upon exit. A stabilizer 141, which includes a centralizer, may be present on top sub 140.

Figure 22A:
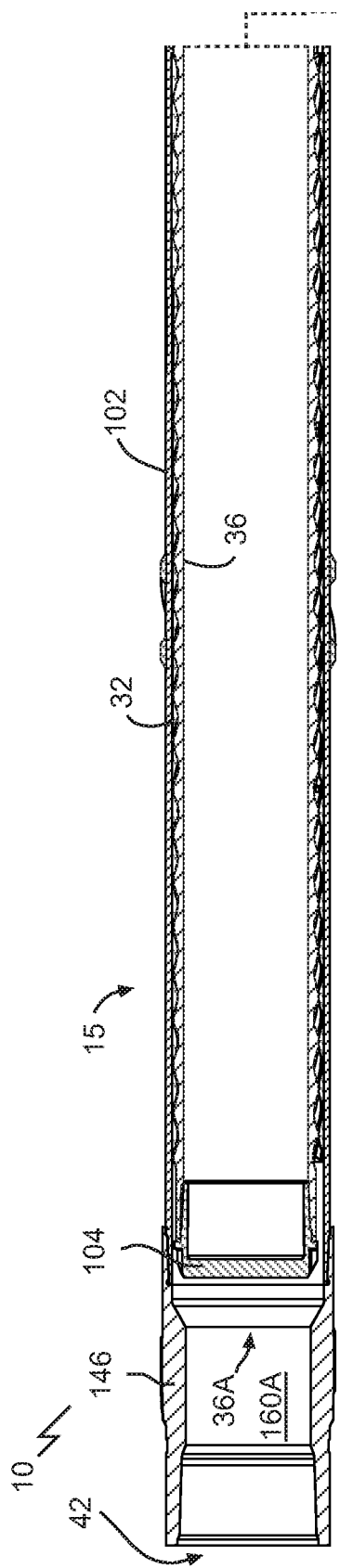
FIGS. 22A and 22B collectively form a cross-section view of the casing reamer shoe of FIG. 21.
Figure 22B:
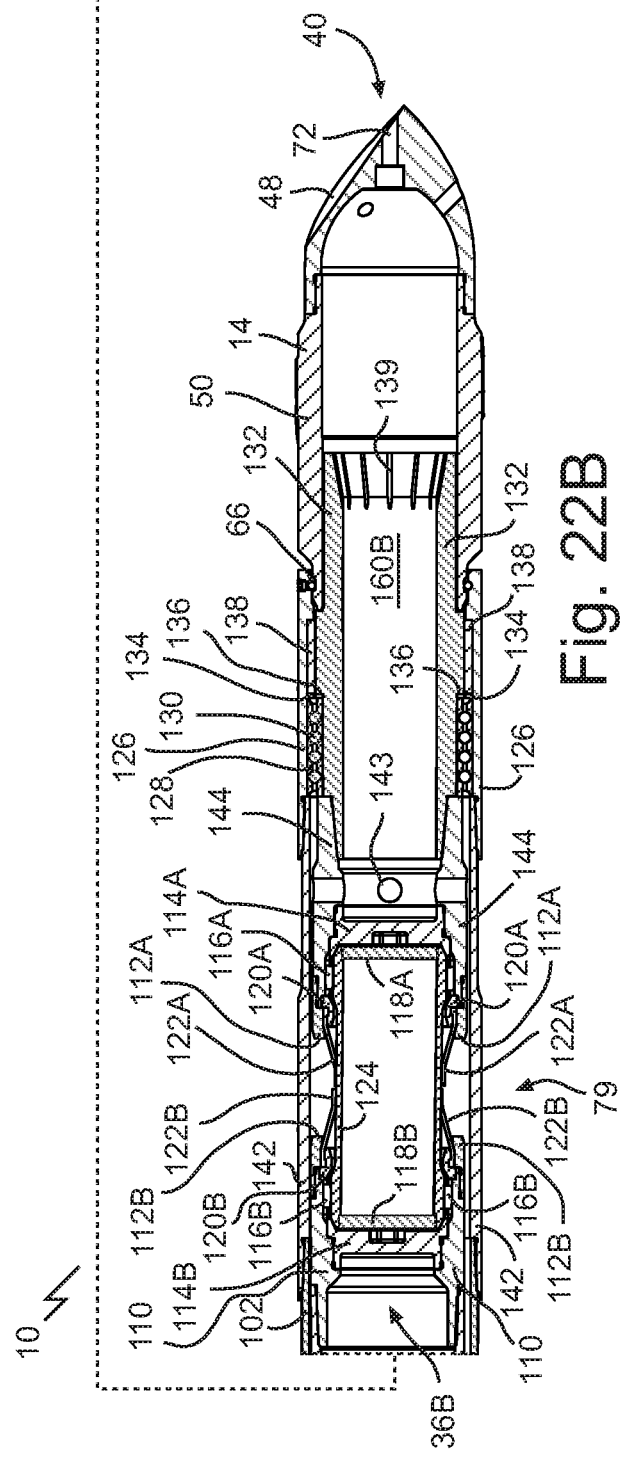
Figure 25:
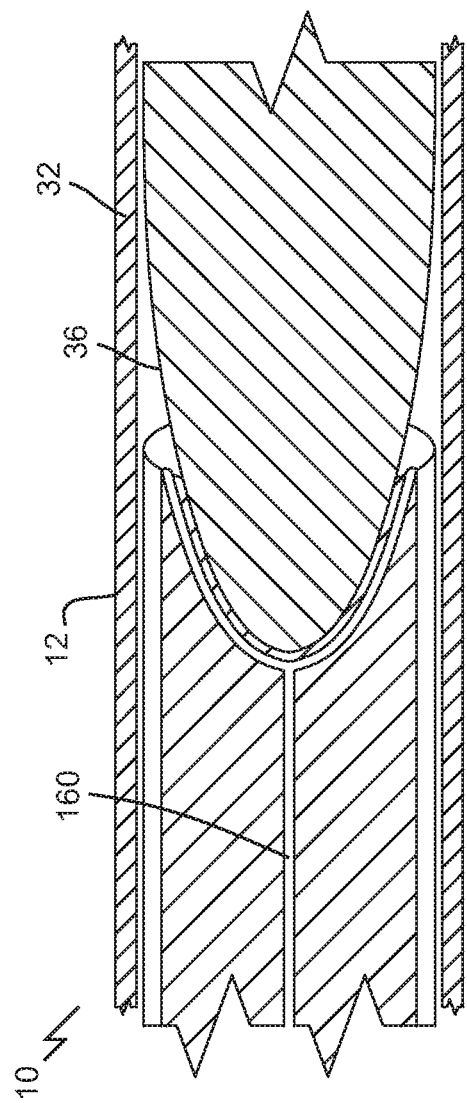
FIG. 25 is a cross-section view through the upper flow diverter of the casing reamer shoe of FIG. 24.
Figure 26:
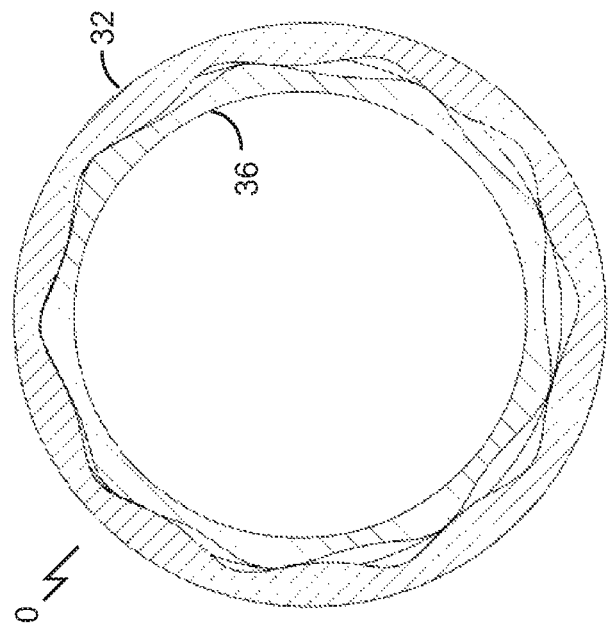
FIG. 26 is a section view taken along the 26-26 section lines of FIG. 24.
Figure 27:
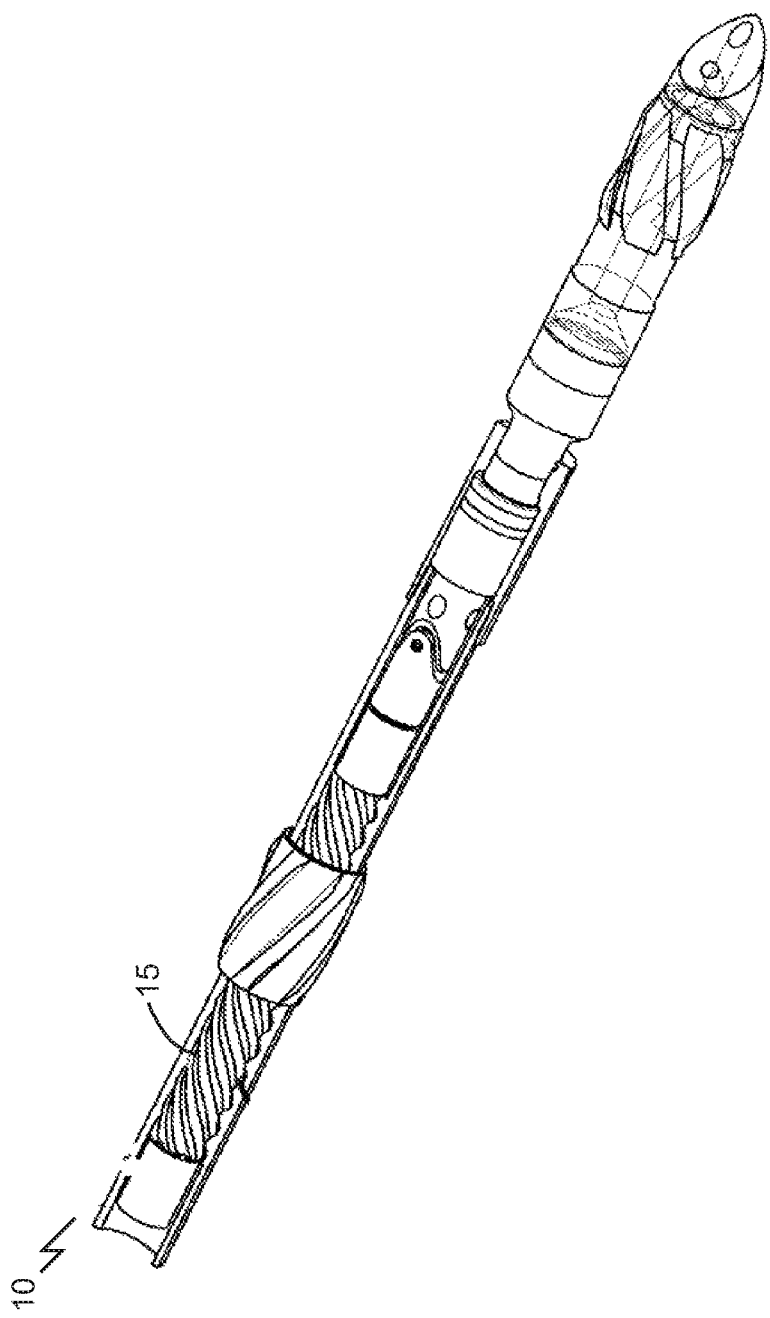
FIG. 27 is a perspective view of a further embodiment of a casing reamer shoe.

Referring to FIGS. 19A-B and 20, the rotor 36 may be mounted to a universal joint for correcting eccentricity of rotation of rotor 36. A universal joint includes a coupling that can transmit rotary motion by a shaft over a range of angles. The universal joint 79 may be connected between the rotor 36 and a bearing, such as bearing shaft 132 mounted on ball bearings 130 and 66, on the tubular body, in this case top sub 140. The universal joint 79 may be structured to convert eccentric motion of the rotor 36 into concentric motion. Referring to FIGS. 22A-B, an example is shown where the universal joint 79 is connected between the reamer part 14 and the rotor 36.

Referring to FIGS. 19A-B and 20, the universal joint 79 may comprise a drive shaft 124. The shaft 124 may be mounted for rotation within the tubular body 12. The shaft 124 and the rotor 36 may mate via cooperating circumferential arrays of splines 124A and 125A, for example which mesh via a circumferential array of pins 116A. The cooperating circumferential arrays of splines may comprise a radially-outward facing array of splines 124B, for example mounted on the drive shaft 124, and a radially-inward facing array of splines 125A, for example mounted on the rotor 36, or in this case on a rotor adapter 110 that threads or press fits to an uphole end 36A of the rotor 36.

A pin and splined connection can be tailored to provide the required degree of conversion from eccentricity to concentricity. Referring to FIG. 19C, each pin 116A, of the circumferential array of pins 116A, may be tapered with decreasing radius from a central portion 117C to each axial end 117A and 117B of the pin 116A. In the example shown the pin 116A is beveled at each end 117A, and 117B. The shape used permits the pin 116A to tip axially forward and backward, while still retaining a meshing connection with the splines. Such allows the shaft 124 and adapter 110 to translate radially and pivot relative to one another. Pins 116A may be made of rigid material that does not deform under the relatively high temperatures experienced downhole. Rubberless or other metal on metal embodiments of the progressive cavity sections disclosed here may be used in high temperature downhole applications.

Referring to FIGS. 19A-B and 20, a second set of splines and pins may be present. The cooperating circumferential arrays of splines 124A, 125A may be located at or near a first axial end 129A of the shaft 124. The shaft 124 may connect to a bearing, in this case bearing shaft 132 mounted to ball bearings 130 and 66, on the tubular body 12, via a second set of cooperating circumferential arrays of splines 124B, 125B. The second set of splines may be located at or near a second axial end 129B of the shaft 124. A second array of pins 116B may cooperate with splines 124B, 125B. Splines 124B, 125B, and pins 116B may have the same characteristics as splines 124A, 125A, and pins 116A, respectively.

Referring to FIG. 22A-B, an example is shown where the drive shaft 124 and spline-pin universal joint 79 is located between the rotor 36, in this case a downhole end 36B of rotor 36, and the reaming part 14. Specifically, the downhole end 36B threads or press fits to a rotor adapter 110, which mates with drive shaft 124 via a spline and pin connection as above, and drive shaft 124 mates with a drive adapter 144 via a second spline and pin connection. Adapter 144 threads or press fits to bearing shaft 132, which threads or press fits into reamer housing 50, which mounts reamer part 14 and nose 48.

Referring to FIGS. 19A-B and 20, each set of splines may be protected by a respective drive boot, in this case boots 122A and 122B, which mount via split rings 120A and 120B, and thrust seat caps 112A, 112B, to the rotor adapter 110 and the drive adapter 144, respectively. The thrust seat caps 112A, 112B form caps that secure the split rings 120A and 120B and keep the boots 122A and 122B in position around shaft 124 to protection the spline and pin connections clean from fluids. Such structures also help to contain lubricating fluid, such as grease from washing out of the spline and pin connections. A port 219 and an NPT threaded plug 221 may be used for grease injection in each of adaptors 110 and 144. Each of adaptors 110 and 144 may have a pair of plugs 221 and ports 219, one to permit venting while the other is filled.

Figure 31:
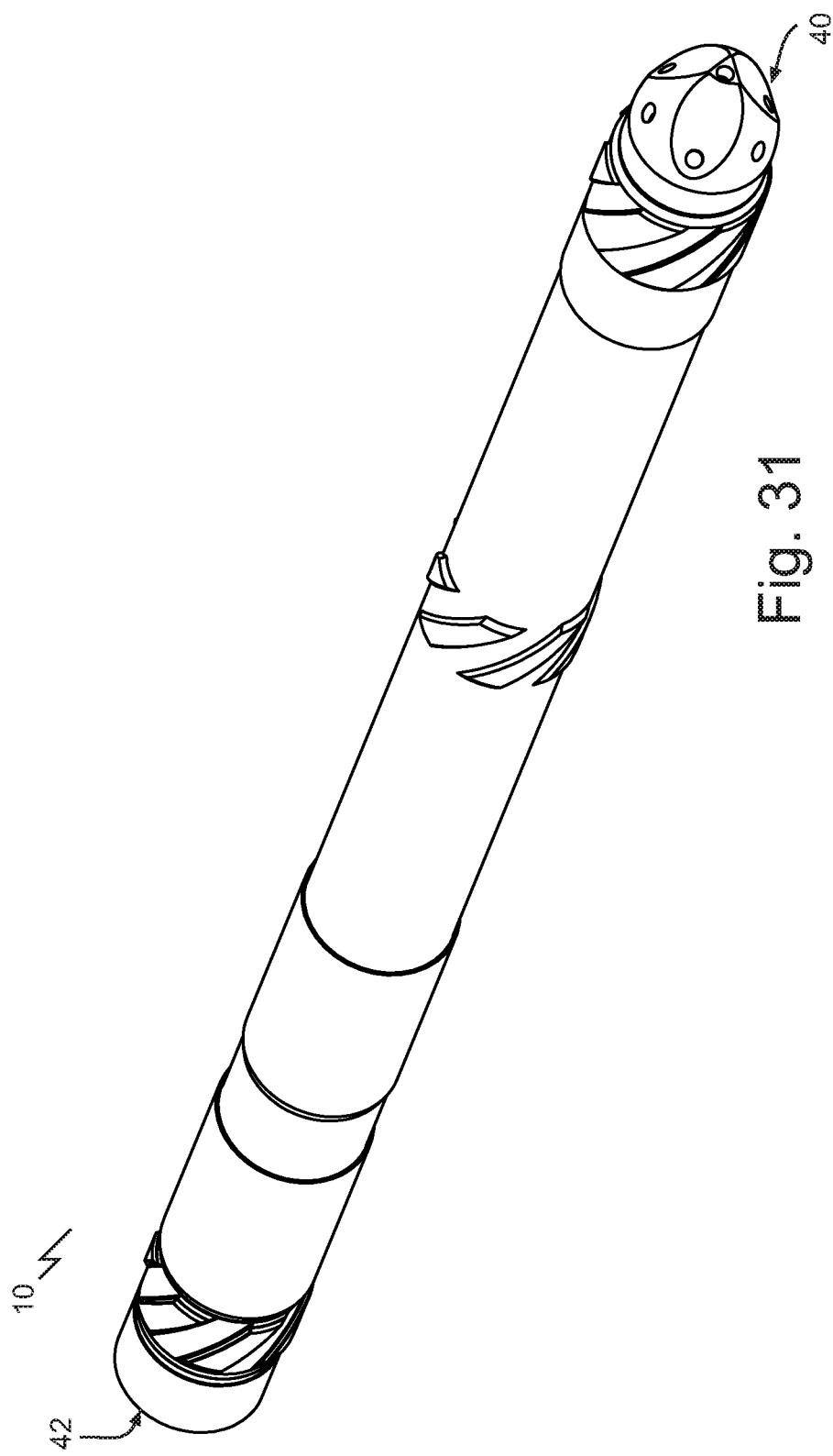
FIG. 31 is a perspective view of a further embodiment of a casing reamer shoe with a progressive cavity power section.
Figure 33:
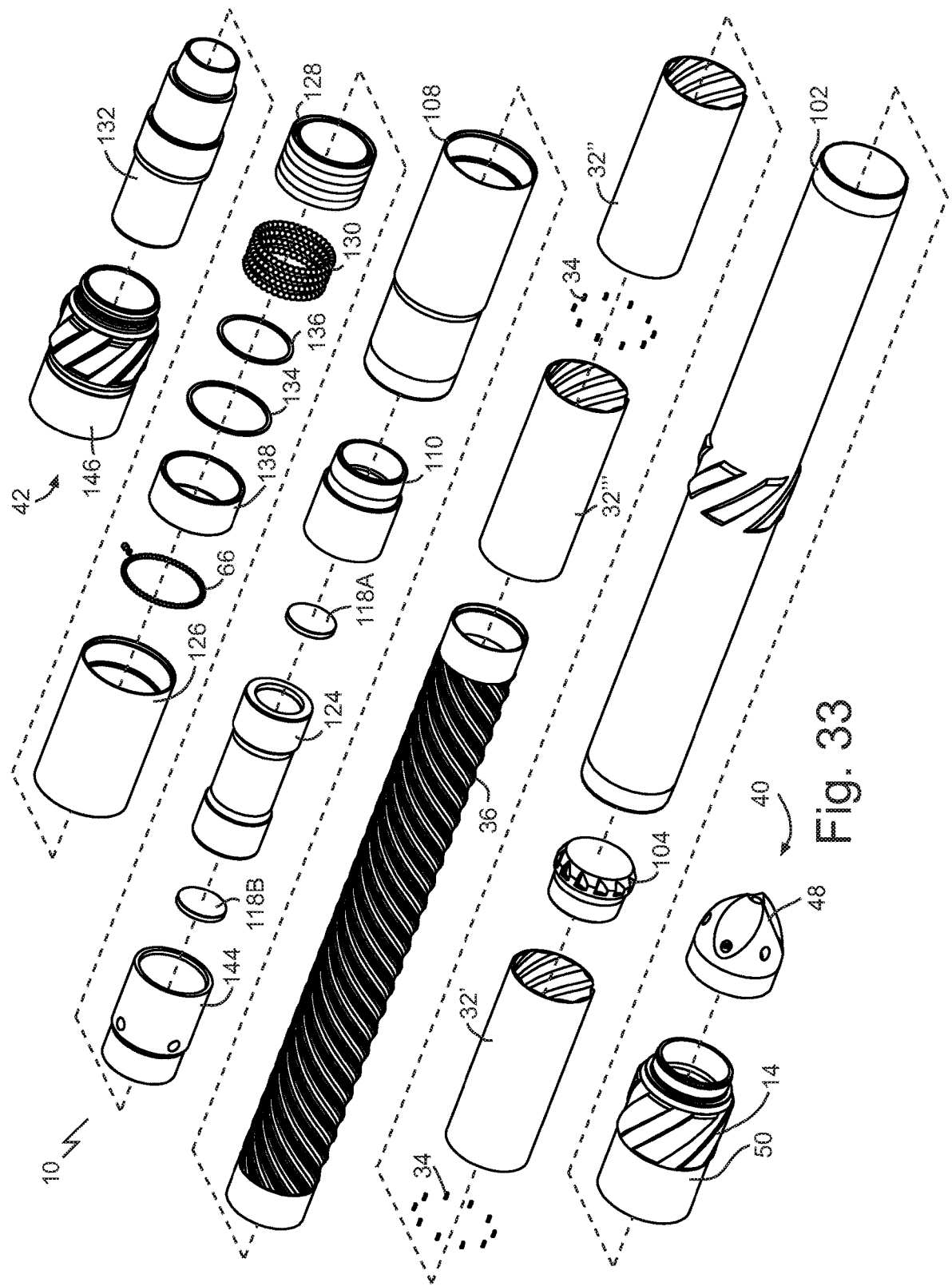
FIG. 33 is an exploded perspective view of the casing reamer shoe of FIG. 31 with a progressive cavity power section.

Referring to FIGS. 31-33, a further embodiment of a reamer tool 10 is illustrated. In the example shown, a drive shaft 124 is used to act as a universal joint 79 between the rotor 36 and the bearings 138 and 66. The drive shaft 124 may also be used on the downhole end of the rotor 36 similar to the embodiment of FIG. 21. The axial ends 129A and 129B of the shaft 124 may be press fit with rotor adapter 110 and drive adapter 144. The drive shaft 124 may be made of a resilient metal, which bends elastically during use to convert eccentricity to concentricity, for example titanium and other suitable metals. The drive shaft 124 may thus form a flex-shaft.

Figure 34A:
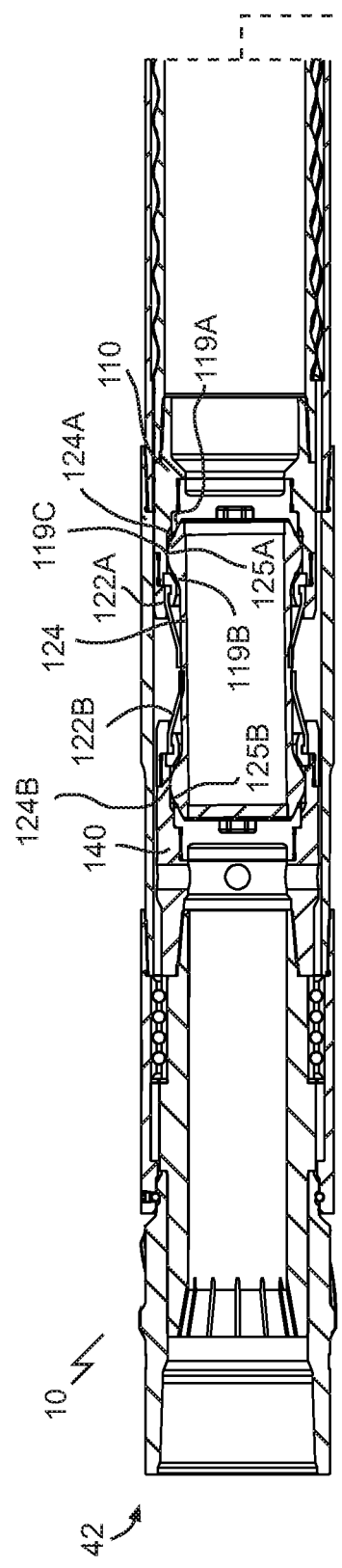
FIGS. 34A and 34B collectively form a cross-section view of the casing reamer shoe of FIG. 35.
Figure 34B:
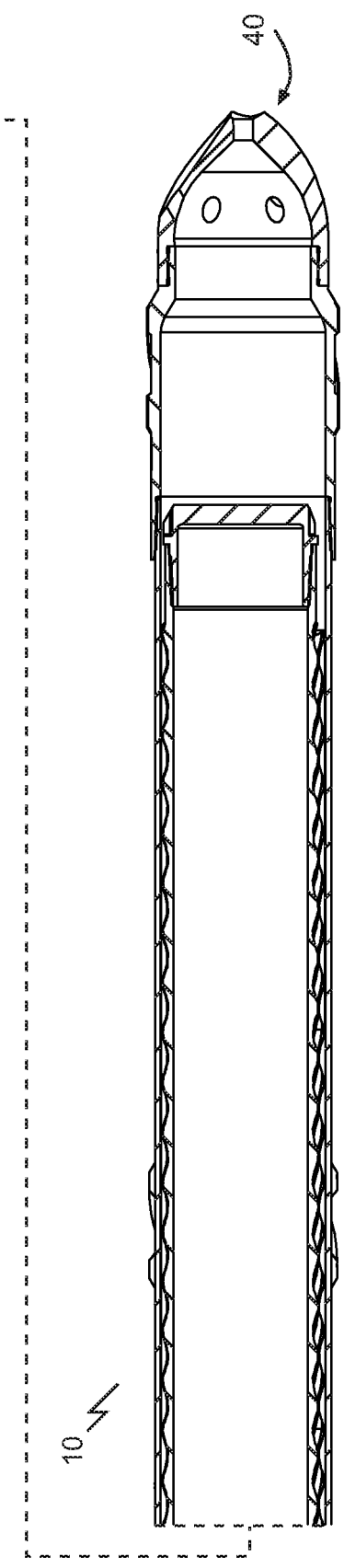
Figure 35:
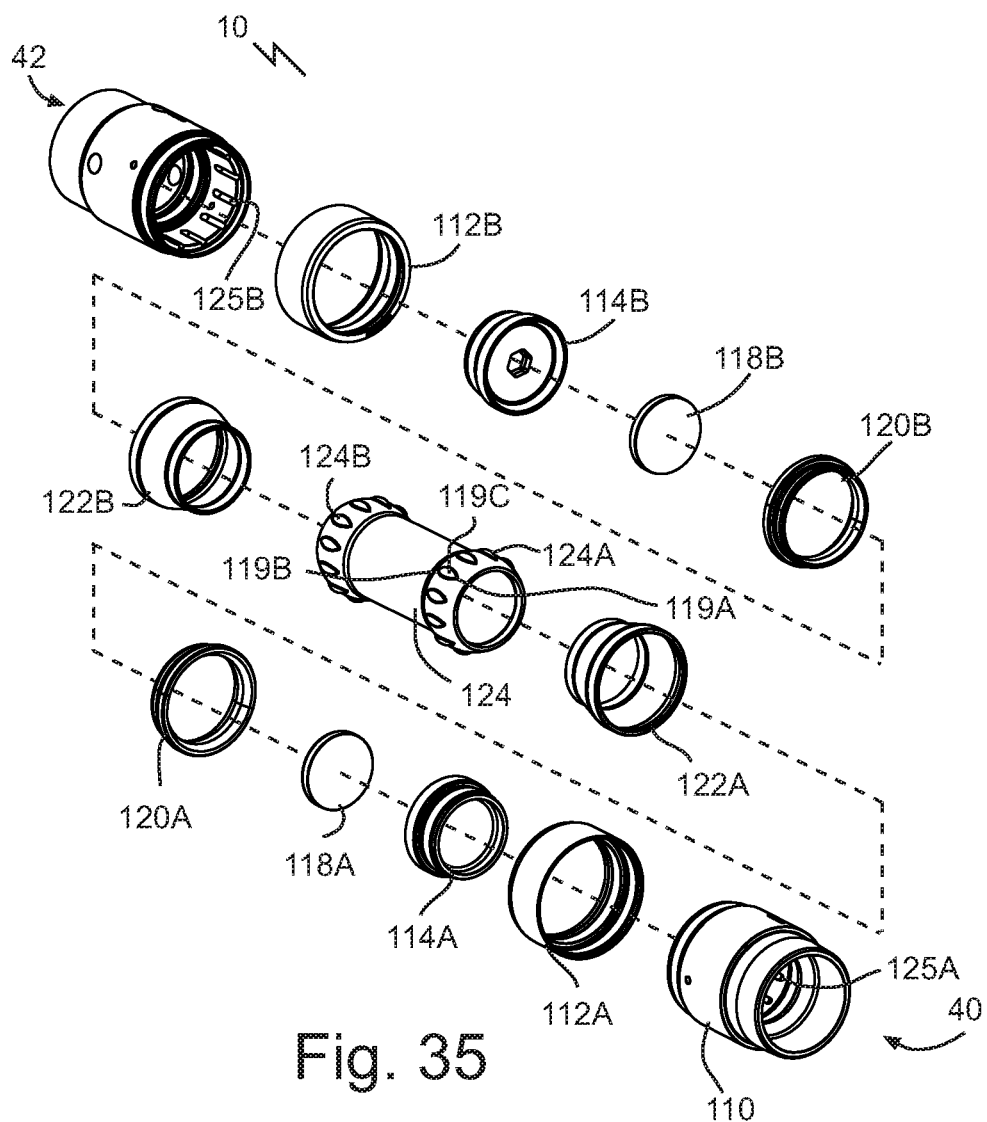
FIG. 35 is an exploded perspective view of a further embodiment of a casing reamer shoe with a progressive cavity power section.

Referring to FIGS. 34A, 34B and 35, a further embodiment of a reamer tool 10 is illustrated. In the example shown, a drive shaft 124 is used in a form that combines ideas from the splines of the embodiment of FIG. 19A, with the pinless design of FIG. 31. In the example the spline sets 124A-125A and 124B-125B mate directly in a gear to gear fashion. Referring to FIGS. 34A-B and 35, the spline-spline connection may be structured to permit radial translation and pivoting between parts, similar to the type of movement permitted by the beveled drive pins 116A. The splines 124A may be tapered with decreasing distance from a central portion 119C to each axial end 119A and 119B of each spline 124A, 124B. The shape used permits the drive shaft 124 to tip axially forward and backward, while still retaining a meshing connection with the splines. Such allows the shaft 124 and adapter 110 to translate radially and pivot relative to one another. Boots 122A and 122B may also be used.

Referring to FIGS. 19A-B, the drive shaft 124 may be a hollow shaft sleeve as shown. A hollow interior 131, defined by the hollow shaft sleeve, may be closed, for example by end caps 118A, B secured within respective drive caps 114A, 114B. A hollow drive shaft may reduce the weight of the tool 10, and also may assist in drilling out the tool 10 when sacrificed at the bottom of a casing string. The inner diameter 133 may be selected to be commensurate with an inner diameter 173A of the casing 172 being run with tool 10.

Referring to FIGS. 19A-B, in use a casing string 173 may be positioned downhole in a well. Fluid may be pumped through the casing string 173 and into an uphole portion 160A of interior passageway 160. Fluid may pass drive shaft 124 around an annulus defined between the drive shaft 124 and the stator adapter 108, by moving through radial ports 135 in drive adapter 144, passing around the shaft 124, and entering the PC motor 15. The fluid flow through motor 15 causes the stator 32 or rotor 36 (in this case the stator 32) to rotate, and the universal joint 79 acts to convert eccentric motion of the rotor 36, relative to the stator 32, into concentric motion, thus reducing vibration, which may deleteriously affect reaming operation. Fluid passing through motor 15 in a downhole direction then moves into bore 160B and out the ports 72 in the nose 48 as previously discussed above. Referring to FIGS. 19A and 22B, uphole and downhole facing surfaces 137 and 139, respectively, may be structured, for example striated as shown, to improve drillability. In the example shown an surface 137 defines a striated uphole entry to bearing shaft 132, to permit a drill bit to be able to grip and drill through the shaft 132 and the interior contents of the tool 10.

Referring to FIGS. 19A-B and 20, the rotor 36 may form a hollow helically lobed sleeve as shown. The rotor 36 may define a hollow interior 36C, which may be closed against fluid passage, for example via one or more walls. In the example shown opposed axial ends 36A and 36B of the hollow helically lobed sleeve are blocked by respective end walls, namely provided by rotor adapter 110 and rotor plug 104. An uphole facing surface of the wall may be striated. A casing 172 may be connected, for example directly as shown, or indirectly through intermediary parts or tools, to the downhole reamer tool 10. An inner diameter 36D of the hollow helically lobed sleeve of rotor 36 may be sized to be commensurate with, for example equal to, an inner diameter 173A of the casing 172. In some cases nominal deviations between diameters 36D and 173A may be present. For example the diameter 36D may be larger than the diameter 173A, or smaller, for example equal to the drift ID of the casing. A smaller diameter 36D may be acceptable at the bottom of the well, if no further sections will be drilled, or if only a limited number of sections are to be drilled and the diameter 36D still permits sufficient play for such sections and casing to pass through. If the diameter 36D is too small, milling tools may be required to mill out the excess diameter, and such milling tools may require an extra trip in and out of the well to position and retrieve such tools.

Referring to FIG. 28, once the casing string is landed in the desired position, the casing 172 may be cemented in place. To accomplish such cement may be pumped down the internal bore of the casing 172, to the casing reamer tool 10, out the outlet ports 72 in the tool 10, and up the annulus defined between the well and the casing string 173. The tool 10 may be structured as a guide or float shoe, and may have a one-way valve to prevent backflow of cement. Upon setting of the cement, casing reamer tool may be drilled out by running a drill bit 181 at the end of a drill string 185 to the tool 10, and operating the drill bit 181 to drill out an axial passage in the tool 10. Once drilled out, the drill bit 181 continues on downhole to create and extend the well bore by adding a new section of well bore.

Figure 18:
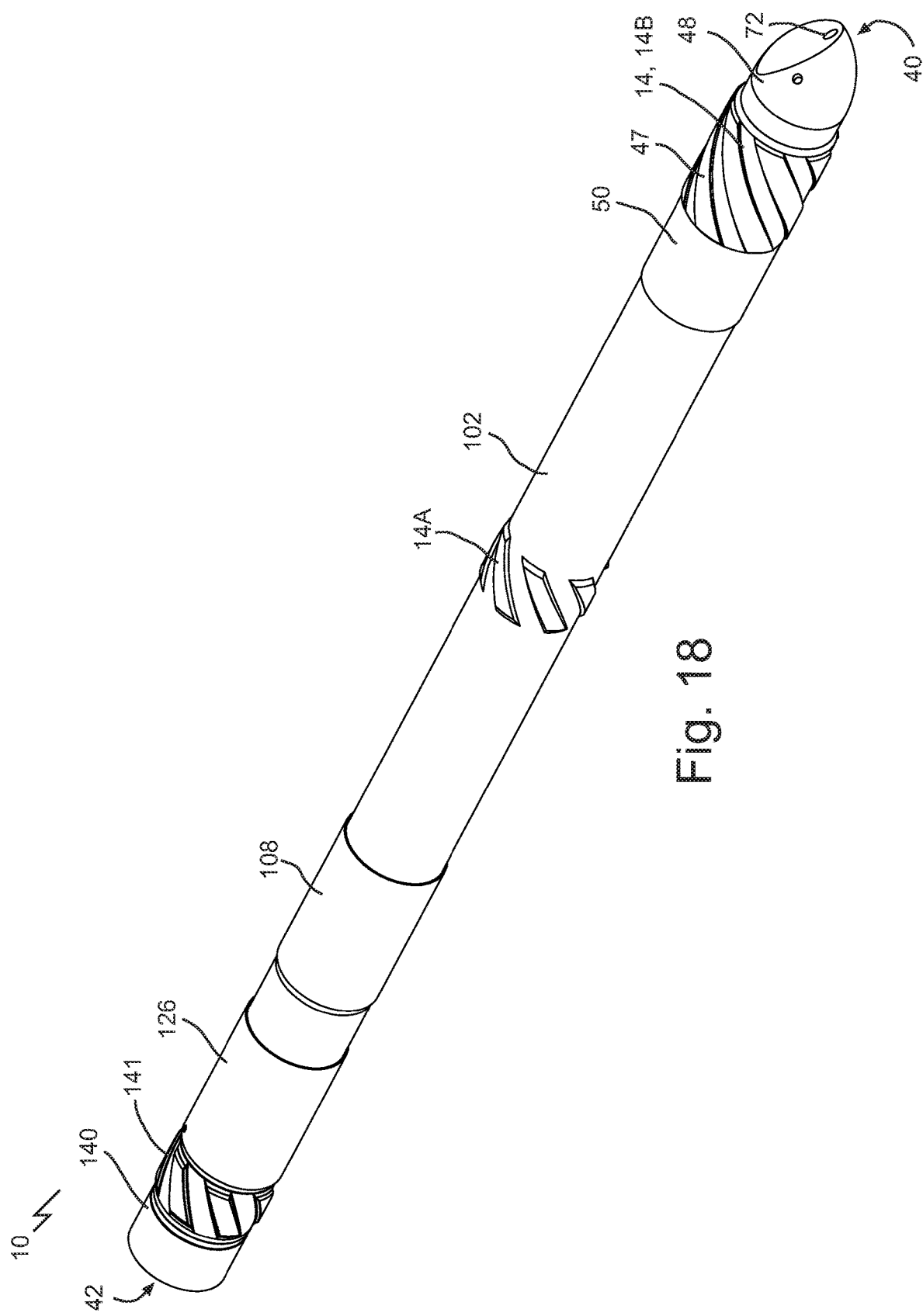
FIG. 18 is a perspective view of a further embodiment of a casing reamer shoe with a progressive cavity power section.

Referring to FIGS. 21-23, a modification of the embodiment of FIG. 18 is illustrated. Referring to FIGS. 22A and 22B, in the example shown, fluid is pumped into a portion 160A of the interior passageway 160, passing into the motor 15, and causing the rotor 36 to rotate, turn the drive shaft 124, and turn the reamer part 14 and nose 48. Fluid then continues down the internal annulus of the tool 10 between the drive shaft 124 and a static sleeve 142, passing through radial ports 143 in drive adapter 144 and entering a bore 160B of bearing shaft 132, exiting the nose 48 via fluid ports 72. Once the casing is landed the casing may be cemented in place and the tool 10 may be drilled through and the wellbore continued in a downhole direction.

Referring to FIGS. 24, 24A, 24B, 25, 26, and 27, a further embodiment of a downhole reamer tool 10, such as a casing reamer shoe as shown, is illustrated. In the example shown fluid enters through the uphole end 42 into the portion 160A of interior passageway 160. The fluid passes through radial ports 135 into the motor 15. Upper and lower bearing assemblies 223 and 225 may be used. The reaming tool 10 may agitate a drill string or casing string by generating a shock-wave due to the rotation of the tool. This extends the reach of the casing 50 by creating agitation. In some extended reach wells (e.g. horizontal wells that are longer than the vertical section of the well) the tool 10 may run the casing 50 further than normally would be possible without extra hydraulic or mechanical evacuation. The torque produced may allow the tool 10 to drill with a casing bit. The tool 10 may replace a jetting assembly in deep water operations.

Figure 36:
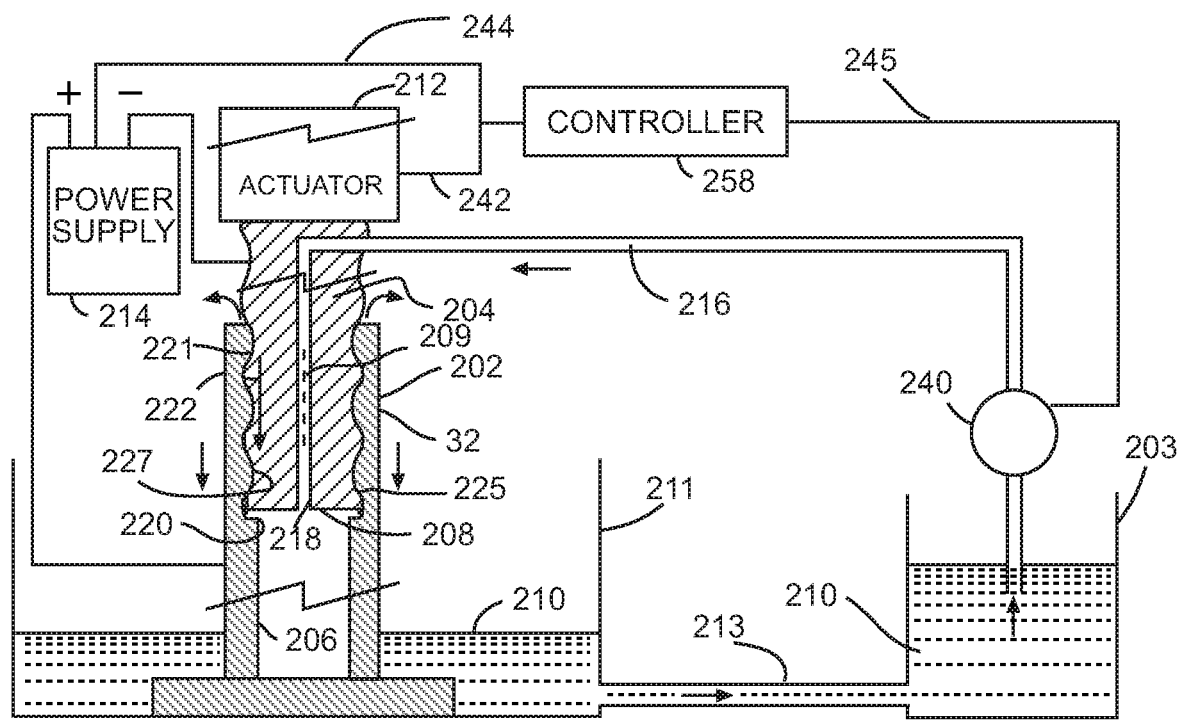
FIG. 36 is a schematic view, partially in section, of an electrochemical machining method used to form a stator.

Referring to FIGS. 36 and 39A-C, an electrochemical machining (ECM) method and resulting downhole tool 10 are illustrated. Referring to FIG. 36, in a first stage the stator is formed by ECM. Electrochemical machining (ECM) is a method of removing metal by an electrochemical process. It may be used for working extremely hard materials or materials that are difficult to machine using conventional methods. ECM may be used to cut small or odd-shaped angles, intricate contours or cavities in hard and exotic metals, such as titanium aluminides, and high nickel, cobalt, and rhenium alloys. Both external and internal geometries can be machined.

ECM may be characterized as "reverse electroplating" in that it removes material instead of adding it. An ECM cutting tool is guided along the desired path close to the workpiece but without touching the workpiece. High metal removal rates are possible with ECM, with no thermal or mechanical stresses being transferred to the part, and mirror surface finishes can be achieved.

In the ECM process, a cathode (tool) is advanced into an anode (workpiece). A pressurized electrolyte is injected at a set temperature to the area being cut. The feed rate may be the same as the rate of liquefication of the material. The gap between the tool and the workpiece may vary, for example within 80-800 micrometers or 0.003-0.030 inches, or other suitable distances smaller or greater. As electrons cross the gap, material from the workpiece is dissolved and the tool forms the desired shape in the workpiece according to the shape of the cutting tool. The electrolytic fluid carries away the metal hydroxide formed in the process.

Referring to FIG. 36, the stator 32 may be made via ECM. A power supply 214 may be connected to a metal block or tube 202, which forms a workpiece, and a shaping tool such as cutting tool 204, for example to pass current between the metal tube 202 and the shaping tool 204. The power supply 214 may thus establish an electrical field across gap 221 defined by the outer sidewall 225 of the cutting tool 204 and an inner sidewall 227 of the workpiece or tube 202. The metal tube 202 may form an anode. The shaping tool 204 may form a cathode.

The shaping tool 204 may have a tool head 208 positioned adjacent a surface 220 of the shaping tool 204, for example defining a gap between the tool head 208 and the surface 220, with surface 220 being eroded and retreating as the tool head 208 advances. An electrolyte 210 or other suitable conductive fluid may be injected and continually flowed through the gap 221 between the tool head 208 and the surface 220. The electrolyte 210 may be supplied to the shaping tool 204 from a suitable reservoir 203 via one or more of a pump 240 and a fluid line 216, for example that extends through the interior of the shaping tool 204. The electrolyte 210 may exit the shaping tool 204 via a nozzle 218, for example defined within the tool head 208 of the shaping tool 204, and upon exit the electrolyte comes into contact with the tube 202. Once the electrolyte passes the gap 221 and absorbs metal from the tube 202, the now-metal-carrying electrolyte may flow into a further reservoir 211, where the fluid may be recycled back into the supply reservoir 203, for example via a recovery line 213. The fluid may be filtered or treated prior to re-entering reservoir 203. In some cases spent fluid is discarded. A cooling circuit may be provided to manage temperature changes in the electrolyte fluid during the process.

During the ECM process the shaping tool 204 may be rotated and advanced around and along, respectively, an axis 209 of the metal tube 202, for example in a direction 222, via a suitable actuator 212 such as a linear actuator or hydraulic arm. Extension of the shaping tool 204 towards the surface 220 may cause release or removal of material from the metal tube 202.

Outer sidewall 225 of the cutting tool 204 may have a suitable shape such as a helically lobed profile as shown. Extension and rotation of the shaping tool 204 into the tube 202 advances the surface 220 and erodes material in the interior of the metal tube 202 to form helical lobes that are contoured into an inner surface 206 of the metal tube 202. The cutting tool 204 may rotate about the axis 209 such that the inner sidewall 227 of the workpiece or tube 202 takes on a shape that is the inverse of the helically lobed profile of the outer sidewall 225 of the cutting tool 204. Movement, for example advancement, extension, retraction, and/or rotation, of the shaping tool 204 may follow a preset path or pattern determined by a controller 258. The rotation and advancement of the tool 204 may follow the profile lines of the helical lobes of the tool 204, to ensure that the tube 202 takes on the same helically lobed profile. The controller 258 and the actuator 212 may be connected to one or more of the power supply 214, actuator 212, and pump 240 via respective control lines 244, 242, and 245. In some cases variations of ECM may be used, such as electrical discharge machining (EDM), or other processes that involve selective erosion of the interior surfaces of the workpiece to achieve the desired interior shape.

Referring to FIGS. 38 and 39A-C, a drilling motor tool 10 is illustrated. The tool 10 may be formed by ECM or another suitable method. ECM may permit a suitable stator 32 to be formed from a single integral block of material such as tube 202 (FIG. 36). A single integral block of material may be initially a suitable unbroken shape such as a cylinder, although the block could have a solid or hollow core, and could be other than cylindrically shaped, such as shaped like a rectangular box. Further machining after ECM may be carried out to finalize the shape of the stator 32. ECM may permit extended lengths of integral stator sections to be made, for example stator sections may be made with an axial length 219 (FIG. 38) of at least fifty and in some cases fifty, eighty, one hundred fifty, and three hundred inches or more, defined between axial ends 32A and 32B of the stator. The resulting stator may have no break lines or transition points such as weld lines or abutting ends of adjacent sections connected by connectors such as dowels. Instead, the stator may have a continuous unbroken profile from axial end to axial end. The axial ends 32A and 32B may refer in some cases to the start and end points of the helically lobed profile. By contrast conventional computer numerical control (CNC) methods using a lathe and mill may only be able to create a stator section of thirty six inches or less. The length of a tool 10 produced by ECM may be limited by the axial length of the cutting tool 202, with such axial length capable of being tailored to achieve the desired stator length, and hence in theory any length of stator 32 may be created. In other cases the rotor, or both the rotor and the stator, may be formed using ECM. In cases where the rotor is formed by ECM, the inner sidewall of the cutting tool may be shaped with a helically lobed profile, so that the cutting tool rotates about the axis such that the sidewall of the workpiece takes on a shape that is the inverse of the helically lobed profile of the inner sidewall of the cutting tool.

Figure 38:
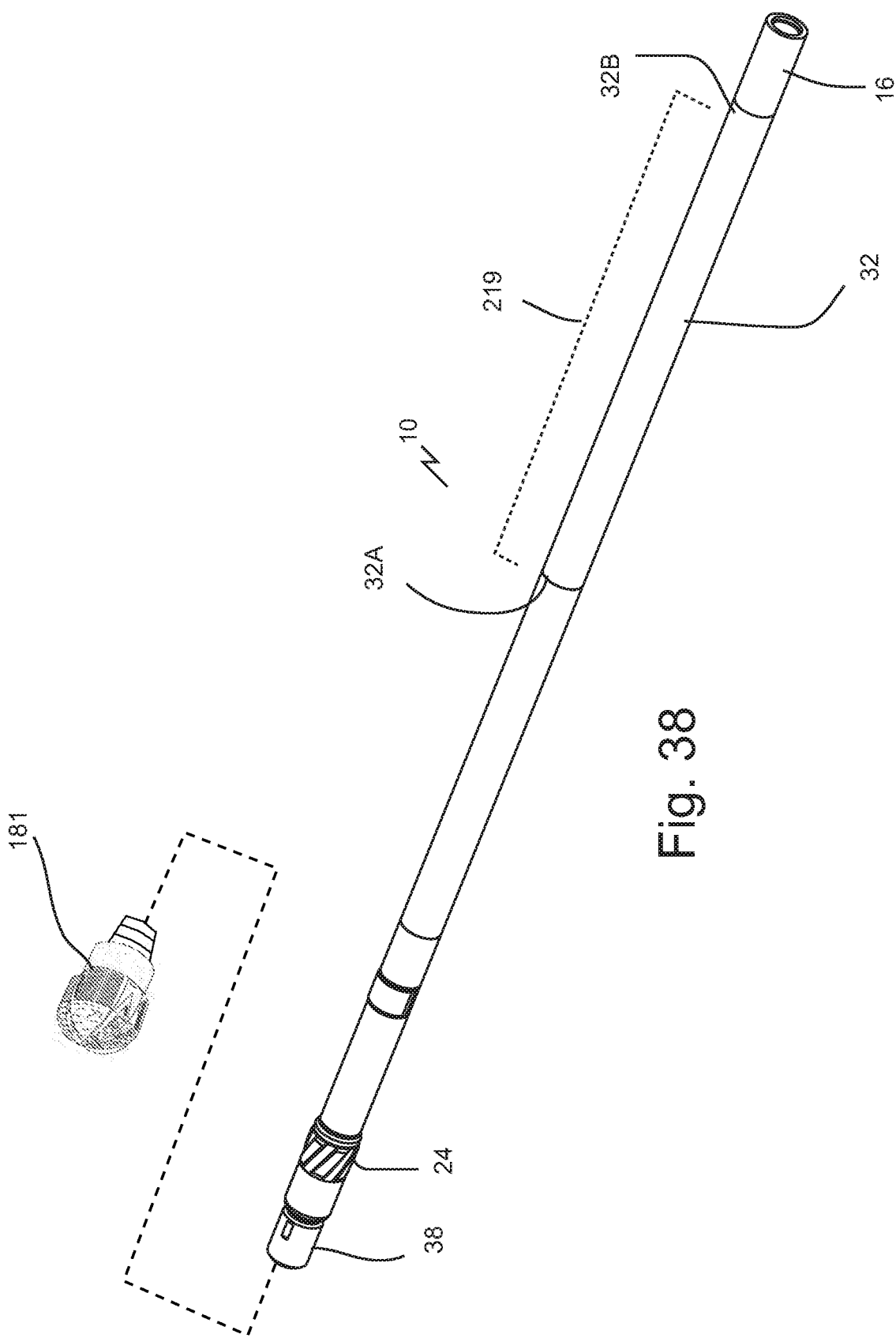
FIG. 38 is a perspective exploded view of a drilling motor and a drill bit.

In some cases the resulting stator formed may be connected with adjacent stators as sections to form a larger stator. In the example shown the entire motor 15 is formed by a single stator 32, in which a corresponding rotor 36 is inserted to assemble the motor 15. Rotor contacting surfaces of the stator, and stator contacting surfaces of the rotor, may be rigid, for example metal, for further example the same type of metal or different metals as one another. In other cases an elastomeric coating such as rubber may be placed, for example lined with corresponding helically lobed shape, on the inner sidewall 227 of the stator 32. Referring to FIGS. 28 and 38, once formed and assembled, the tool 10 may be used in a downhole operation by positioning the tool 10 in a well bore 176, and pumping fluid to operate the progressive cavity section to rotate the rotor relative to the stator. In the example shown the tool 10 may be connected to or incorporate a drill bit 181, such that the rotor 36 is connected to rotate the drill bit 181 under fluid pressure to drill the well.

Referring to FIGS. 39A-C, the tool 10 assembled may incorporate various suitable features, such as uphole and downhole tubing connectors 39 and 37, respectively, bearings 128, reamers 24, a drive shaft 94, and top and bottom subs 16 and 38, respectively.

Figure 37:
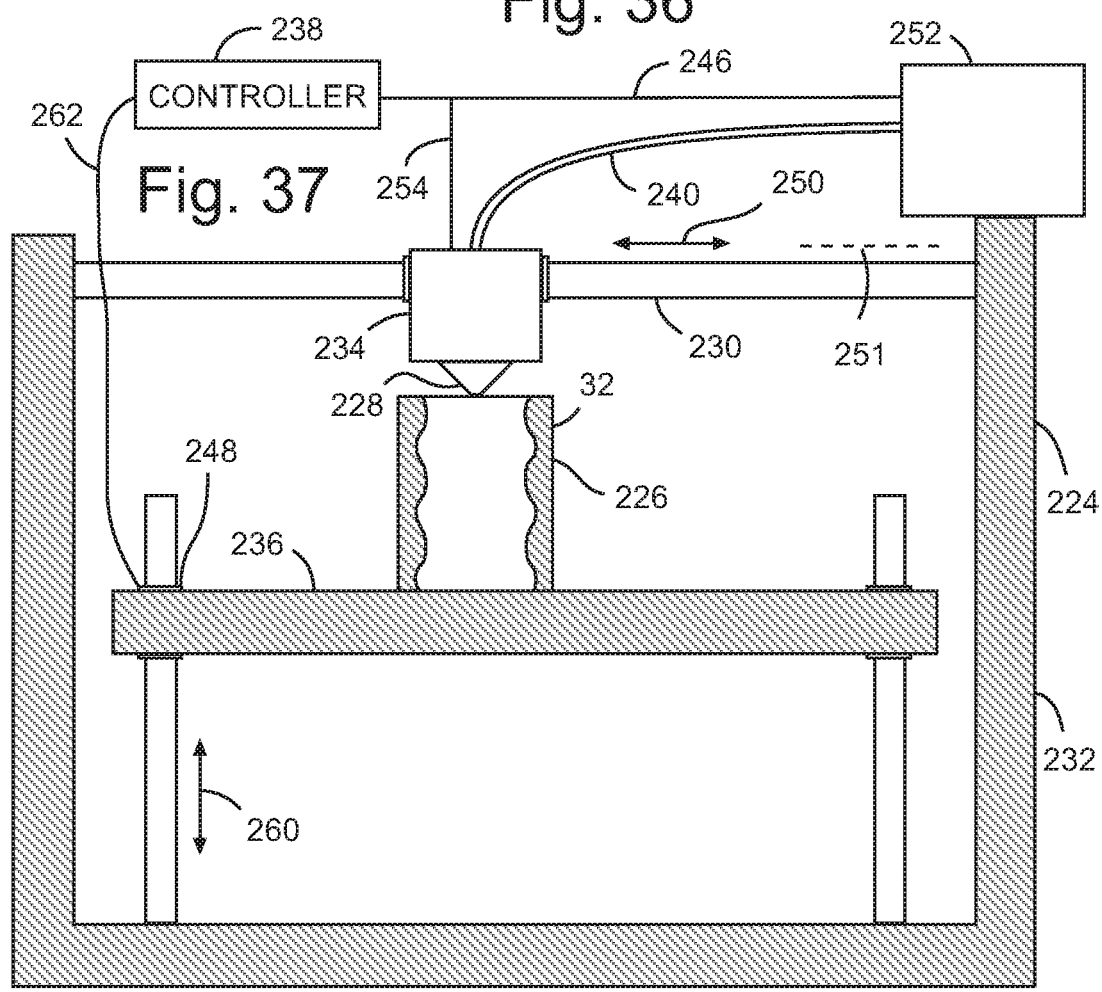
FIG. 37 is a schematic view, partially in section, of a three dimensional printing method used to form a stator.

Methods may be used other than ECM to form a stator 32 out of a single integral block of material. Referring to FIG. 37, for example, three-dimensional printing may be used. Three-dimensional (3D) printing, also known as a form of additive manufacturing (AM), refers to processes used to create a three-dimensional object in which layers of material are formed under computer control to create an object. Objects may be of almost any shape or geometry and may be produced using digital model data from a 3D model or another electronic data source such as an Additive Manufacturing File (AMF) file. Stereolithography (STL) is one of the most common file types that 3D printers can read. Thus, unlike material removed from a stock in a conventional machining process, 3D printing or AM builds a three-dimensional object from computer-aided design (CAD) model or AMF file by successively adding material layer by layer.

In some cases the stator 32 may be formed as a single piece. For example the stator 32 may be formed as a single piece by three dimensional printing. Layers of metal may be added until the desired shape is achieved. The resulting stator may be used in a rubberless, rigid contact surface application as described elsewhere in this document. A hollow rotor sleeve may be inserted into the stator to form a progressive cavity power section. In other cases a single piece stator may be made by other suitable methods, such as electrochemical machining, or one piece CNC machining.

Referring to FIG. 37, the stator 32 may be made via a 3D printer 224. The 3D printer 224 may comprise a structural frame 232 upon which actuators and workpieces are mounted. Frame 232 may comprise a set of guide rails 230 mounted to the structural frame 232, a printing head 234 mounted to the guide rails 230, for example to slide in opposed directions along arrows 250 and in directions into and out of the page to provide freedom of movement in a plane 251, which in the example shown is a horizontal plane. A nozzle 228 may be mounted to the printing head 234. Printing material 226 may be supplied from a reservoir 252 to the printing head 234 and ejected onto a substrate such as platform 236 via the nozzle 228, for example to form the stator 32. The platform 236 may be raised and lowered via an actuator 248 such as in opposed directions 260, for example to facilitate addition of the printing material 226 to the platform 236. Actuators that do not require rails may be used, for example robotic arms may be used as actuators. The printing head 234, the actuator 248, and the container 252 may be connected to a controller 238 via respective control lines 254, 262, and 246. Once completed and cured, a rotor may be inserted into the stator 32 to assemble the tool 10.

Referring to FIGS. 2A, 2B, and 3, stators 32 may be made by other suitable methods such as using dowels 34. A progressive cavity section may be produced with a stator 32 and a rotor 36, in which the stator is formed by plural axial stator sections, such as sections 32'-32''' connected end to end. Adjacent axial stator sections, of the plural axial stator sections, may be connected by dowels 36 as before. Dowels may refer to pegs as shown in FIG. 3 that are separate and independent to sections 32'-32''', or dowels may refer to pegs that are integral with one of the stator sections and extend out into engagement with an adjacent section in use. Adhesive and other techniques may be used as described elsewhere in this document. Dowels may be used to construct any suitable downhole tool incorporating a progressive cavity section.

The techniques, methods, and processes described here may be used to make and use various downhole tools, from drilling motors, to reamers, to rotary steerables, stimulation tools, pulsation tools, and others.

The stator 32, rotor 36, or both, may be subjected to various surface treatments to improve performance, for example to increase physical properties. Such treatments may include varying the coefficient of friction, surface hardness, metal porosity, and residual surface stresses. Processes may include heat treatments such as laser hardening, nitriding, carborizing, or boronzing, to modify surface hardness. Teflon, or ceramic coating, or polishing, may be used or carried out to reduce friction. Surface coating processes such as a chrome overlay, carbide overlay, physical vapor deposition, chemical vapor deposition, or high velocity oxygen fuel (HVOF) processes may be used.

The tool 10 may be used in a drilling application. In such cases the tool 10 may be ran with a drilling rig outfitted to drill with casing. The nose 48 of the tool 10 may be of similar construction as a typical drill bit, for example with cutting structures impregnated into a metal matrix. After drilling the well, and after the casing has been cemented in place, the tool 10 may be drilled out. In some cases the nose 48 may need to be milled out by a milling tool due to the hardness of material of the nose 48. Milling may require an extra run to bring the milling tool down the well, to the nose 48 and back up the well again, to change out the milling bit into a drill bit. In some cases a casing while drilling application may be carried out while drilling a vertical well, although the embodiments here are not limited to vertical wells. To drill a directional or horizontal well the tool 10 may have an adjustable housing, and may use a directional measurement (MWD—measuring while drilling) system. In some cases a non-magnetic environment may be needed be needed with certain MWD technology. In other cases a gyro may be used with a drilling application.

The reamer tool 10 may be considered to be a mandrel assembly, with an inner mandrel and an outer mandrel. The tool 10 may be coupled to the bottom end of the casing in a variety of manners, including but not limited to mating threads, press fits, snap-fits, friction fitting, adhesives, bolts, and the like and combinations thereof. The tool 10 may grip a shoe, which is the operating component that interfaces with the interior of the hole to be reamed and abrades away material, thereby reaming the hole. The shoe may include protrusions that, when the shoe spins, impact with non-smooth regions of the interior of the hole and thereby abrade the same making such regions more smooth and increasing the effective interior diameter of the same so that the casing can follow behind without getting stuck. After the drilling is completed for a particular section of a hole, the operator may put casing down the hole to create a smooth interior bore through which additional work may be completed.

However, the hole is generally not perfect and often includes defects that can stop the casing from going all the way down. Accordingly, it is desirable to put a reaming tool, the operating tip of which is usually called a shoe, towards the bottom to ream out the hole as the casing slides down. In one non-limiting embodiment, there is a reaming system, device, and/or mandrel assembly that is, advantageously, a low cost system that attaches to or includes one of a great variety of shoes (e.g. float shoe, reamer shoe, guide shoe) from a variety of manufacturers. The tool 10 may include an internal/central axle that rotates inside a housing and/or includes a pin-down connection (e.g. pin to pin, box-pin) to couple to a shoe so it can connect to any tool/shoe. The internal axle spins when fluid is pumped through the mandrel assembly and spins a sub that is connected to the shoe which therefore also spins. The internal axle and/or other centrally positioned parts may be of an aluminum, bronze, brass, and/or zinc alloy (or other material that may be drilled through rather easily, since the mandrel assembly is generally left at a bottom of the hole when the casing is finished being installed).

Additionally, although the figures illustrate an outer mandrel with a certain number of spiral lobes on an interior thereof, a different number of lobes and/or lobes of different slopes, curvatures, sizes, shapes and the like may be present. Finally, it is envisioned that the components of the device may be constructed of a variety of materials, including but not limited to metals (both drillable and not), plastics, ceramics, composites and the like and combinations thereof. Parts may be made up of more than one part connected together, for example a housing may be made of plural sleeves of material threaded or press fitted together to form one unit. Blades include helical blades. A magnet tool may be used in an uphole direction of the casing brush or other embodiments of tool 10 to assist in collectively large metallic debris.

Parts or components of tool 10 may be connected to one another and other parts of a tubing string by any suitable method, including mating threads, press fits, snap-fits, friction fitting, adhesives, bolts, bearings, and the like and combinations thereof. Points of dynamic contact may be coated with one or more of an anti-corrosion agent and a slip agent. Tools 10 may be used in suitable applications, such as deep water or deep well applications, as well as conventional wells. In some cases stators or rotors may be made with forty inches of axial length or more.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A downhole tool comprising:
   a progressive cavity section with a stator and a rotor;
   in which the stator is formed from a single integral block of material, and the stator has a length of at least fifty inches defined between axial ends of the stator;
   in which rotor contacting surfaces of the stator, and stator contacting surfaces of the rotor, are rigid and do not flex when in use at downhole temperatures;
   in which the stator contacting surfaces and the rotor contacting surfaces are made of metal;
   in which the stator is formed by electrochemical machining (ECM) to structure the rotor contacting surfaces of the stator to achieve a sufficiently narrow clearance or negative interference fit with the rotor to form an efficient pumping seal without seizing the progressive cavity section in use; and
   in which the rotor contacting surfaces of the stator have been heat treated for increased surface hardness.

2. The downhole tool of claim 1 in which the progressive cavity section is connected to rotate a reamer part of a casing reamer shoe.

3. The downhole tool of claim 1 in which the progressive cavity section is connected to rotate a drill bit.

4. The downhole tool of claim 1 in which the stator has a length of at least eighty inches defined between axial ends of the stator.

5. The downhole tool of claim 4 in which the stator has a length of at least one hundred and fifty inches defined between axial ends of the stator.

6. The downhole tool of claim 5 in which the stator has a length of at least three hundred inches defined between axial ends of the stator.

7. The downhole tool of claim 1 in which the rotor is formed by electrochemical machining (ECM).

8. A method comprising:
positioning the downhole tool of claim 1 in a well; and
pumping fluid to operate the progressive cavity section to rotate the rotor relative to the stator.

9. The downhole tool of claim 1 in which the stator contacting surfaces of the rotor have been heat treated for increased surface hardness.

10. The downhole tool of claim 1 in which the rotor contacting surfaces of the stator and the stator contacting surfaces of the rotor have been heat treated with nitriding for increased surface hardness.

11. A method comprising:
forming a stator from a single integral block of material, in which the stator has a length of at least fifty inches defined between axial ends of the stator;
assembling a downhole tool by inserting a rotor into the stator;
in which rotor contacting surfaces of the stator, and stator contacting surfaces of the rotor, are rigid and do not flex when in use at downhole temperatures;
in which the stator contacting surfaces and the rotor contacting surfaces are made of metal;
in which the stator is formed by electrochemical machining (ECM) to structure the rotor contacting surfaces of the stator to achieve a sufficiently narrow clearance or negative interference fit with the rotor to form an efficient pumping seal without seizing the progressive cavity section in use; and
in which forming comprises heat treating the rotor contacting surfaces of the stator to increase surface hardness.

12. The method of claim 11 in which the stator and the rotor within the downhole tool form a progressive cavity power section connected to rotate a reamer part of a casing reamer shoe.

13. The method of claim 11 in which the stator and the rotor within the downhole tool form a progressive cavity power section connected to rotate a drill bit.

14. The method of claim 11 in which the stator has a length of at least eighty inches defined between axial ends of the stator.

15. The method of claim 14 in which the stator has a length of at least one hundred and fifty inches defined between axial ends of the stator.

16. The method of claim 15 in which the stator has a length of at least three hundred inches defined between axial ends of the stator.

17. The method of claim 11 in which the rotor is formed by electrochemical machining (ECM).

18. The method of claim 11 in which the stator contacting surfaces of the rotor have been heat treated to increase surface hardness.

19. The method of claim 11 in which the rotor contacting surfaces of the stator and the stator contacting surfaces of the rotor have been heat treated with nitriding to increase surface hardness.

\* \* \* \* \*